United States Patent
Kuroda et al.

(10) Patent No.: US 6,385,343 B1
(45) Date of Patent: May 7, 2002

(54) IMAGE DECODING DEVICE AND IMAGE ENCODING DEVICE

(75) Inventors: Shinichi Kuroda; Shunichi Sekiguchi; Kohtaro Asai; Fuminobu Ogawa; Yoshimi Isu; Hirofumi Nishikawa; Yoshihisa Yamada; Yuri Hasegawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/605,665

(22) Filed: Jun. 26, 2000

Related U.S. Application Data

(63) Continuation of application No. PCT/JP99/03854, filed on Jul. 16, 1999.

(30) Foreign Application Priority Data

Nov. 4, 1998 (JP) .......................................... 10-312872

(51) Int. Cl.[7] ................................................ G06K 9/36
(52) U.S. Cl. ................................................. 382/233
(58) Field of Search ............................... 382/232, 236, 382/238, 240, 242, 248, 250; 358/432, 433; 348/384, 394, 395, 400, 404, 407–416, 420, 421, 425, 430, 431, 699

(56) References Cited

U.S. PATENT DOCUMENTS

| | | | | |
|---|---|---|---|---|
| 4,792,851 A | * | 12/1988 | Mochizuki | .................. 382/159 |
| 5,642,437 A | * | 6/1997 | Laczko, Sr. et al. | ......... 382/246 |
| 5,854,799 A | * | 12/1998 | Okada et al. | ............... 371/37.1 |
| 5,963,596 A | * | 10/1999 | Benbassat et al. | ........... 375/243 |
| 6,067,383 A | * | 5/2000 | Taniguchi et al. | ........... 382/240 |
| 6,091,777 A | * | 7/2000 | Guetz et al. | ................. 375/240 |

FOREIGN PATENT DOCUMENTS

| | | |
|---|---|---|
| JP | A-6382079 | 4/1988 |
| JP | A-63100889 | 5/1988 |
| JP | A-63109680 | 5/1988 |
| JP | A-63111790 | 5/1988 |
| JP | A-63111791 | 5/1988 |
| JP | A338185 | 2/1991 |
| JP | A-6105297 | 4/1994 |
| JP | A-7236137 | 9/1995 |
| JP | A-7264077 | 10/1995 |
| JP | A-92007432 | 7/1997 |
| JP | A-1032576 | 2/1998 |
| JP | A-10116204 | 5/1998 |

* cited by examiner

*Primary Examiner*—Jose L. Couso

(57) ABSTRACT

An image decoding device is provided which performs expansion processing and reverse orthogonal conversion in fixed block units with respect to image compression data. The image decoding device is provided with an error block detection means (error block detection section 4) which receives a threshold value and an image signal in frequency domains, which determines whether or not an error is contained in block data based on the threshold value and the image signal in the frequency domain and which outputs a detection state in the block data.

37 Claims, 60 Drawing Sheets

FIG.6

(a) INTER ENCODED MODE, MAXIMUM VALUE TABLE FOR LUMINANCE COMPONENT

| 400 | 50 | 50 | 40 | 40 | 30 | 30 | 20 |
| --- | --- | --- | --- | --- | --- | --- | --- |
| 50 | 50 | 40 | 40 | 30 | 30 | 20 | 20 |
| 50 | 40 | 40 | 30 | 30 | 20 | 20 | 10 |
| 40 | 40 | 30 | 30 | 20 | 20 | 20 | 10 |
| 40 | 30 | 30 | 20 | 20 | 20 | 10 | 10 |
| 30 | 30 | 20 | 20 | 20 | 10 | 10 | 10 |
| 30 | 20 | 20 | 20 | 10 | 10 | 10 | 10 |
| 20 | 20 | 20 | 10 | 10 | 10 | 10 | 10 |

(b) INTER ENCODED MODE, MINIMUM VALUE TABLE FOR LUMINANCE COMPONENT

| -400 | -50 | -50 | -40 | -40 | -30 | -30 | -20 |
| --- | --- | --- | --- | --- | --- | --- | --- |
| -50 | -50 | -40 | -40 | -30 | -30 | -20 | -20 |
| -50 | -40 | -40 | -30 | -30 | -20 | -20 | -10 |
| -40 | -40 | -30 | -30 | -20 | -20 | -20 | -10 |
| -40 | -30 | -30 | -20 | -20 | -20 | -10 | -10 |
| -30 | -30 | -20 | -20 | -20 | -10 | -10 | -10 |
| -30 | -20 | -20 | -20 | -10 | -10 | -10 | -10 |
| -20 | -20 | -20 | -10 | -10 | -10 | -10 | -10 |

(c) INTER ENCODED MODE, MAXIMUM VALUE TABLE FOR COLOR DIFFERENCE COMPONENT

| 200 | 40 | 30 | 20 | 20 | 10 | 10 | 5 |
| --- | --- | --- | --- | --- | --- | --- | --- |
| 40 | 30 | 20 | 20 | 10 | 10 | 5 | 5 |
| 30 | 20 | 20 | 10 | 10 | 5 | 5 | 0 |
| 20 | 20 | 10 | 10 | 5 | 5 | 0 | 0 |
| 20 | 10 | 10 | 5 | 5 | 0 | 0 | 0 |
| 10 | 10 | 5 | 5 | 0 | 0 | 0 | 0 |
| 10 | 5 | 5 | 0 | 0 | 0 | 0 | 0 |
| 5 | 5 | 0 | 0 | 0 | 0 | 0 | 0 |

(d) INTER ENCODED MODE, MINIMUM VALUE TABLE FOR COLOR DIFFERENCE COMPONENT

| -200 | -40 | -30 | -20 | -20 | -10 | -10 | -5 |
| --- | --- | --- | --- | --- | --- | --- | --- |
| -40 | -30 | -20 | -20 | -10 | -10 | -5 | -5 |
| -30 | -20 | -20 | -10 | -10 | -5 | -5 | 0 |
| -20 | -20 | -10 | -10 | -5 | -5 | 0 | 0 |
| -20 | -10 | -10 | -5 | -5 | 0 | 0 | 0 |
| -10 | -10 | -5 | -5 | 0 | 0 | 0 | 0 |
| -10 | -5 | -5 | 0 | 0 | 0 | 0 | 0 |
| -5 | -5 | 0 | 0 | 0 | 0 | 0 | 0 |

FIG.7

(a) INTRA ENCODED MODE, MAXIMUM VALUE TABLE FOR LUMINANCE COMPONENT

| 250 | 30 | 30 | 30 | 20 | 20 | 20 | 20 |
|---|---|---|---|---|---|---|---|
| 30 | 30 | 30 | 20 | 20 | 20 | 10 | 10 |
| 30 | 30 | 20 | 20 | 20 | 10 | 10 | 10 |
| 30 | 20 | 20 | 20 | 10 | 10 | 10 | 10 |
| 20 | 20 | 20 | 10 | 10 | 10 | 10 | 10 |
| 20 | 20 | 10 | 10 | 10 | 10 | 10 | 10 |
| 20 | 10 | 10 | 10 | 10 | 10 | 10 | 10 |
| 10 | 10 | 10 | 10 | 10 | 10 | 10 | 10 |

(b) INTRA ENCODED MODE, MINIMUM VALUE TABLE FOR LUMINANCE COMPONENT

| 20 | -30 | -30 | -30 | -20 | -20 | -20 | -20 |
|---|---|---|---|---|---|---|---|
| -30 | -30 | -30 | -20 | -20 | -20 | -10 | -10 |
| -30 | -30 | -20 | -20 | -20 | -10 | -10 | -10 |
| -30 | -20 | -20 | -20 | -10 | -10 | -10 | -10 |
| -20 | -20 | -20 | -10 | -10 | -10 | -10 | -10 |
| -20 | -20 | -10 | -10 | -10 | -10 | -10 | -10 |
| -20 | -10 | -10 | -10 | -10 | -10 | -10 | -10 |
| -10 | -10 | -10 | -10 | -10 | -10 | -10 | -10 |

(c) INTRA ENCODED MODE, MAXIMUM VALUE TABLE FOR COLOR DIFFERENCE COMPONENT

| 200 | 20 | 15 | 15 | 10 | 10 | 5 | 5 |
|---|---|---|---|---|---|---|---|
| 20 | 20 | 15 | 15 | 10 | 10 | 5 | 5 |
| 15 | 15 | 10 | 10 | 5 | 5 | 0 | 0 |
| 15 | 15 | 10 | 10 | 5 | 5 | 0 | 0 |
| 10 | 10 | 5 | 5 | 0 | 0 | 0 | 0 |
| 10 | 10 | 5 | 5 | 0 | 0 | 0 | 0 |
| 5 | 5 | 0 | 0 | 0 | 0 | 0 | 0 |
| 5 | 5 | 0 | 0 | 0 | 0 | 0 | 0 |

(d) INTRA ENCODED MODE, MINIMUM VALUE TABLE FOR COLOR DIFFERENCE COMPONENT

| 100 | -20 | -15 | -15 | -10 | -10 | -5 | -5 |
|---|---|---|---|---|---|---|---|
| -20 | -20 | -15 | -15 | -10 | -10 | -5 | -5 |
| -15 | -15 | -10 | -10 | -5 | -5 | 0 | 0 |
| -15 | -15 | -10 | -10 | -5 | -5 | 0 | 0 |
| -10 | -10 | -5 | -5 | 0 | 0 | 0 | 0 |
| -10 | -10 | -5 | -5 | 0 | 0 | 0 | 0 |
| -5 | -5 | 0 | 0 | 0 | 0 | 0 | 0 |
| -5 | -5 | 0 | 0 | 0 | 0 | 0 | 0 |

| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

AN EXAMPLE OF A QUANTIZATION INDEX COLUMN OF A BLOCK UNIT CORRECTLY DECODED

FIG.10

| | | | | | | | |
|---|---|---|---|---|---|---|---|
| 0 | 0 | 0 | 0 | 0 | 1 | 1 | 0 |
| 0 | 0 | 0 | 1 | 1 | 1 | 0 | -1 |
| 0 | -1 | 1 | 0 | 1 | 0 | 1 | 0 |
| 0 | -1 | 0 | 2 | 0 | 1 | -70 | 0 |
| -1 | 0 | -2 | 1 | 0 | 0 | 0 | 0 |
| 0 | 0 | 0 | 0 | 0 | 0 | 0 | 0 |
| 0 | -63 | -4 | 0 | 0 | 0 | 0 | 0 |
| 0 | 1 | 0 | 0 | 0 | 0 | 0 | 0 |

AN EXAMPLE OF A QUANTIZATION INDEX COLUMN OF A BLOCK UNIT NOT CORRECTLY DECODED DUE TO AN ERROR

FIG.15

| QUANTIZATION STEP SIZE | WEIGHTED COEFFICIENT |
|---|---|
| LESS THAN 8 | 1.1 |
| GREATER THAN OR EQUAL TO 8 AND LESS THAN 16 | 1.0 |
| GREATER THAN OR EQUAL TO 16 AND LESS THAN 24 | 0.9 |
| GREATER THAN OR EQUAL TO 24 | 0.8 |

FIG.12

(a) INTRA ENCODED MODE, MAXIMUM VALUE TABLE FOR LUMINANCE COMPONENT

| 2000 | 500 | 500 | 500 | 500 | 300 | 300 | 300 | 300 |
| --- | --- | --- | --- | --- | --- | --- | --- | --- |
| 500 | 500 | 500 | 500 | 300 | 300 | 300 | 300 | 200 |
| 500 | 500 | 500 | 300 | 300 | 300 | 300 | 200 | 200 |
| 500 | 500 | 300 | 300 | 300 | 300 | 200 | 200 | 200 |
| 300 | 300 | 300 | 300 | 300 | 200 | 200 | 200 | 100 |
| 300 | 300 | 300 | 300 | 200 | 200 | 200 | 100 | 100 |
| 300 | 300 | 300 | 200 | 200 | 200 | 100 | 100 | 100 |
| 300 | 300 | 200 | 200 | 200 | 100 | 100 | 100 | 100 |

(b) INTRA ENCODED MODE, MINIMUM VALUE TABLE FOR LUMINANCE COMPONENT

| -200 | -500 | -500 | -500 | -500 | -300 | -300 | -300 | -300 |
| --- | --- | --- | --- | --- | --- | --- | --- | --- |
| -500 | -500 | -500 | -500 | -300 | -300 | -300 | -300 | -200 |
| -500 | -500 | -500 | -300 | -300 | -300 | -300 | -200 | -200 |
| -500 | -500 | -300 | -300 | -300 | -300 | -200 | -200 | -200 |
| -300 | -300 | -300 | -300 | -300 | -200 | -200 | -200 | -100 |
| -300 | -300 | -300 | -300 | -200 | -200 | -200 | -100 | -100 |
| -300 | -300 | -300 | -200 | -200 | -200 | -100 | -100 | -100 |
| -300 | -300 | -200 | -200 | -200 | -100 | -100 | -100 | -100 |

(c) INTRA ENCODED MODE, MAXIMUM VALUE TABLE FOR COLOR DIFFERENCE COMPONENT

| 1300 | 150 | 150 | 100 | 100 | 50 | 50 | 20 | 20 |
| --- | --- | --- | --- | --- | --- | --- | --- | --- |
| 150 | 150 | 100 | 100 | 50 | 50 | 20 | 20 | 0 |
| 150 | 100 | 100 | 50 | 50 | 20 | 20 | 0 | 0 |
| 100 | 100 | 50 | 50 | 20 | 20 | 0 | 0 | 0 |
| 100 | 50 | 50 | 20 | 20 | 0 | 0 | 0 | 0 |
| 50 | 50 | 20 | 20 | 0 | 0 | 0 | 0 | 0 |
| 50 | 20 | 20 | 0 | 0 | 0 | 0 | 0 | 0 |
| 20 | 20 | 0 | 0 | 0 | 0 | 0 | 0 | 0 |

(d) INTRA ENCODED MODE, MINIMUM VALUE TABLE FOR COLOR DIFFERENCE COMPONENT

| 800 | -150 | -150 | -100 | -100 | -50 | -50 | -20 | -20 |
| --- | --- | --- | --- | --- | --- | --- | --- | --- |
| -150 | -150 | -100 | -100 | -50 | -50 | -20 | -20 | 0 |
| -150 | -100 | -100 | -50 | -50 | -20 | -20 | 0 | 0 |
| -100 | -100 | -50 | -50 | -20 | -20 | 0 | 0 | 0 |
| -100 | -50 | -50 | -20 | -20 | 0 | 0 | 0 | 0 |
| -50 | -50 | -20 | -20 | 0 | 0 | 0 | 0 | 0 |
| -50 | -20 | -20 | 0 | 0 | 0 | 0 | 0 | 0 |
| -20 | -20 | 0 | 0 | 0 | 0 | 0 | 0 | 0 |

FIG.13

(a) INTER ENCODED MODE, MAXIMUM VALUE TABLE FOR LUMINANCE COMPONENT

| 200 | 50 | 50 | 40 | 40 | 30 | 30 | 20 |
|---|---|---|---|---|---|---|---|
| 50 | 50 | 40 | 40 | 30 | 30 | 20 | 20 |
| 50 | 40 | 40 | 30 | 30 | 20 | 20 | 20 |
| 40 | 40 | 30 | 30 | 20 | 20 | 20 | 10 |
| 40 | 30 | 30 | 20 | 20 | 20 | 10 | 10 |
| 30 | 30 | 20 | 20 | 20 | 10 | 10 | 10 |
| 30 | 20 | 20 | 20 | 10 | 10 | 10 | 10 |
| 20 | 20 | 20 | 10 | 10 | 10 | 10 | 10 |

(b) INTER ENCODED MODE, MINIMUM VALUE TABLE FOR LUMINANCE COMPONENT

| -200 | -50 | -50 | -40 | -40 | -30 | -30 | -20 |
|---|---|---|---|---|---|---|---|
| -50 | -50 | -40 | -40 | -30 | -30 | -20 | -20 |
| -50 | -40 | -40 | -30 | -30 | -20 | -20 | -20 |
| -40 | -40 | -30 | -30 | -20 | -20 | -20 | -10 |
| -40 | -30 | -30 | -20 | -20 | -20 | -10 | -10 |
| -30 | -30 | -20 | -20 | -20 | -10 | -10 | -10 |
| -30 | -20 | -20 | -20 | -10 | -10 | -10 | -10 |
| -20 | -20 | -20 | -10 | -10 | -10 | -10 | -10 |

(c) INTER ENCODED MODE, MAXIMUM VALUE TABLE FOR COLOR DIFFERENCE COMPONENT

| 200 | 40 | 30 | 20 | 20 | 10 | 10 | 5 |
|---|---|---|---|---|---|---|---|
| 40 | 30 | 20 | 20 | 10 | 10 | 5 | 5 |
| 30 | 20 | 20 | 10 | 10 | 5 | 5 | 0 |
| 20 | 20 | 10 | 10 | 5 | 5 | 0 | 0 |
| 20 | 10 | 10 | 5 | 5 | 0 | 0 | 0 |
| 10 | 10 | 5 | 5 | 0 | 0 | 0 | 0 |
| 10 | 5 | 5 | 0 | 0 | 0 | 0 | 0 |
| 5 | 5 | 0 | 0 | 0 | 0 | 0 | 0 |

(d) INTER ENCODED MODE, MINIMUM VALUE TABLE FOR COLOR DIFFERENCE COMPONENT

| -200 | -40 | -30 | -20 | -20 | -10 | -10 | -5 |
|---|---|---|---|---|---|---|---|
| -40 | -30 | -20 | -20 | -10 | -10 | -5 | -5 |
| -30 | -20 | -20 | -10 | -10 | -5 | -5 | 0 |
| -20 | -20 | -10 | -10 | -5 | -5 | 0 | 0 |
| -20 | -10 | -10 | -5 | -5 | 0 | 0 | 0 |
| -10 | -10 | -5 | -5 | 0 | 0 | 0 | 0 |
| -10 | -5 | -5 | 0 | 0 | 0 | 0 | 0 |
| -5 | -5 | 0 | 0 | 0 | 0 | 0 | 0 |

| | | | | | | | |
|---|---|---|---|---|---|---|---|
| 160 | 32 | 24 | 16 | 16 | 8 | 8 | 4 |
| 32 | 24 | 16 | 16 | 8 | 8 | 4 | 4 |
| 24 | 16 | 16 | 8 | 8 | 4 | 4 | 0 |
| 16 | 16 | 8 | 8 | 4 | 4 | 0 | 0 |
| 16 | 8 | 8 | 4 | 4 | 0 | 0 | 0 |
| 8 | 8 | 4 | 4 | 0 | 0 | 0 | 0 |
| 8 | 4 | 4 | 0 | 0 | 0 | 0 | 0 |
| 4 | 4 | 0 | 0 | 0 | 0 | 0 | 0 |

(b)

| | | | | | | | |
|---|---|---|---|---|---|---|---|
| -160 | -32 | -24 | -16 | -16 | -8 | -8 | -4 |
| -32 | -24 | -16 | -16 | -8 | -8 | -4 | -4 |
| -24 | -16 | -16 | -8 | -8 | -4 | -4 | 0 |
| -16 | -16 | -8 | -8 | -4 | -4 | 0 | 0 |
| -16 | -8 | -8 | -4 | -4 | 0 | 0 | 0 |
| -8 | -8 | -4 | -4 | 0 | 0 | 0 | 0 |
| -8 | -4 | -4 | 0 | 0 | 0 | 0 | 0 |
| -4 | -4 | 0 | 0 | 0 | 0 | 0 | 0 |

| | | | | | | | |
|---|---|---|---|---|---|---|---|
| 132 | 33 | 8 | 0 | 1 | 0 | 0 | 0 |
| 32 | 0 | 0 | 0 | 0 | 11 | 0 | 0 |
| 8 | 0 | 3 | 0 | 0 | 0 | 0 | 0 |
| 4 | 0 | 0 | 0 | 0 | 0 | 0 | 0 |
| 3 | 2 | 0 | 0 | 0 | 0 | 0 | 0 |
| 0 | 2 | 0 | 0 | 0 | 0 | 0 | 0 |
| 0 | 0 | 0 | 0 | 0 | 0 | 0 | 0 |
| -6 | 0 | 0 | 0 | 0 | 0 | 0 | 0 |

FIG.21

| | | | | | | | |
|---|---|---|---|---|---|---|---|
| 132 | 33 | 8 | 0 | 1 | 0 | 0 | 0 |
| 32 | 0 | 0 | 0 | 0 | 10 | 0 | 0 |
| 8 | 0 | 3 | 0 | 0 | 0 | 0 | 0 |
| 4 | 0 | 0 | 0 | 0 | 0 | 0 | 0 |
| 3 | 2 | 0 | 0 | 0 | 0 | 0 | 0 |
| 0 | 2 | 0 | 0 | 0 | 0 | 0 | 0 |
| 0 | 0 | 0 | 0 | 0 | 0 | 0 | 0 |
| -5 | 0 | 0 | 0 | 0 | 0 | 0 | 0 |

FIG.22

HORIZONTAL DIRECTION →

PERPENDICULAR DIRECTION ↓

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG.25

| 132 | 32 | 8 | 0 | 1 | 0 | 0 | 0 |
| --- | --- | --- | --- | --- | --- | --- | --- |
| 32  | 0  | 0 | 0 | 0 | 8 | 0 | 0 |
| 8   | 0  | 3 | 0 | 0 | 0 | 0 | 0 |
| 4   | 0  | 0 | 0 | 0 | 0 | 0 | 0 |
| 3   | 2  | 0 | 0 | 0 | 0 | 0 | 0 |
| 0   | 2  | 0 | 0 | 0 | 0 | 0 | 0 |
| 0   | 0  | 0 | 0 | 0 | 0 | 0 | 0 |
| -4  | 0  | 0 | 0 | 0 | 0 | 0 | 0 |

FIG.28

| (ENCODED MODE, SIGNAL COMPONENT) | VALID COEFFICIENT THRESHOLD VALUE |
| --- | --- |
| INTRA ENCODED MODE, LUMINANCE COMPONENT | 54 |
| INTRA ENCODED MODE, COLOR DIFFERENCE COMPONENT | 28 |
| INTER ENCODED MODE, LUMINANCE COMPONENT | 36 |
| INTER ENCODED MODE, COLOR DIFFERENCE COMPONENT | 21 |

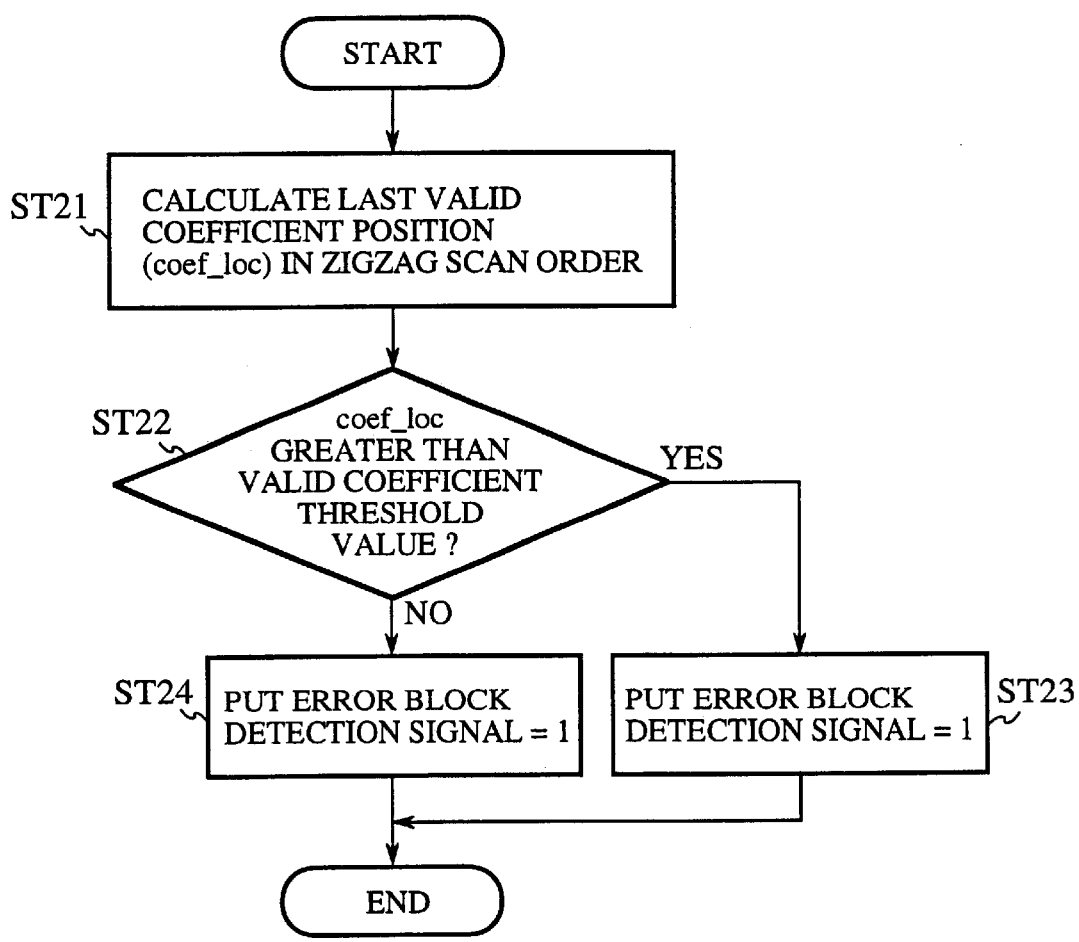

FIG.31

| | | | | | | | |
|---|---|---|---|---|---|---|---|
| 147 | 1 | 0 | 0 | 0 | 0 | 0 | 0 |
| 3 | -2 | 0 | 0 | 0 | 0 | 0 | 0 |
| 0 | 1 | 0 | 0 | 0 | 0 | 0 | 0 |
| -1 | 0 | 0 | 0 | 1 | 0 | 0 | 0 |
| 3 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.34

| QUANTIZATION STEP SIZE | WEIGHTED COEFFICIENT |
|---|---|
| LESS THAN 8 | 1.1 |
| GREATER THAN OR EQUAL TO 8 AND LESS THAN 16 | 1.0 |
| GREATER THAN OR EQUAL TO 16 AND LESS THAN 24 | 0.9 |
| GREATER THAN OR EQUAL TO 24 | 0.8 |

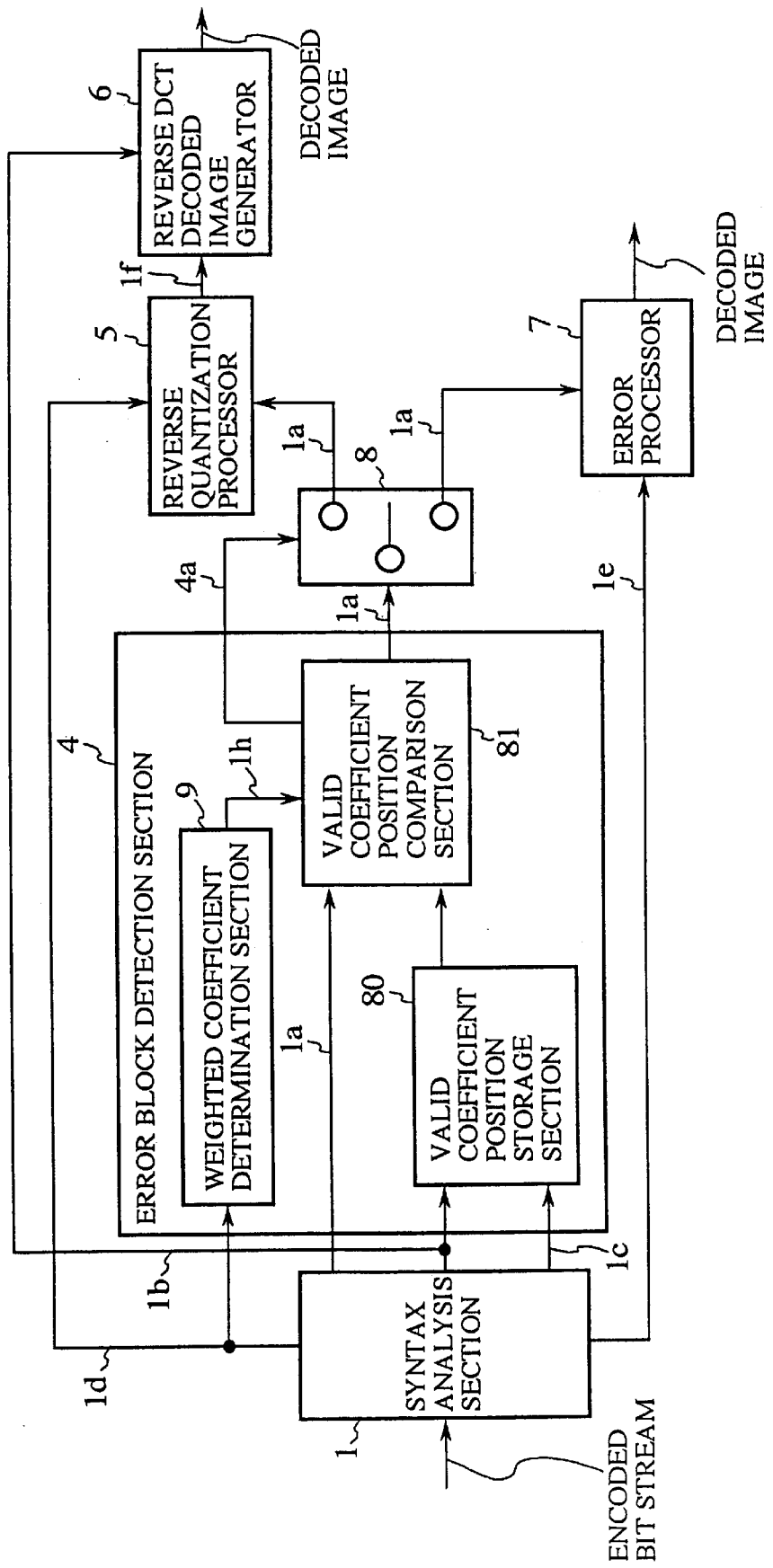

FIG.35

| (ENCODED MODE, SIGNAL COMPONENT) | VALID COEFFICIENT THRESHOLD VALUE | | | |
|---|---|---|---|---|
| | QUANTIZATION STEP SIZE LESS THAN 8 | QUANTIZATION STEP SIZE GREATER THAN OR EQUAL TO 8 AND LESS THAN 16 | QUANTIZATION STEP SIZE GREATER THAN OR EQUAL TO 16 AND LESS THAN 24 | QUANTIZATION STEP SIZE GREATER THAN OR EQUAL TO 24 |
| INTRA ENCODED MODE, LUMINANCE COMPONENT | 59 | 54 | 49 | 43 |
| INTRA ENCODED MODE, COLOR DIFFERENCE COMPONENT | 31 | 28 | 25 | 22 |
| INTER ENCODED MODE, LUMINANCE COMPONENT | 39 | 36 | 32 | 29 |
| INTER ENCODED MODE, COLOR DIFFERENCE COMPONENT | 23 | 21 | 19 | 17 |

| 0 | 3  | 0 | 0 | 0 | 0 | 0 | 0 |
|---|----|---|---|---|---|---|---|
| 6 | 0  | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |
| 0 | -1 | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |

| 0 | 3 | 0 | 0 | 0 | 0 | 0 | 0 |
|---|---|---|---|---|---|---|---|
| 6 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

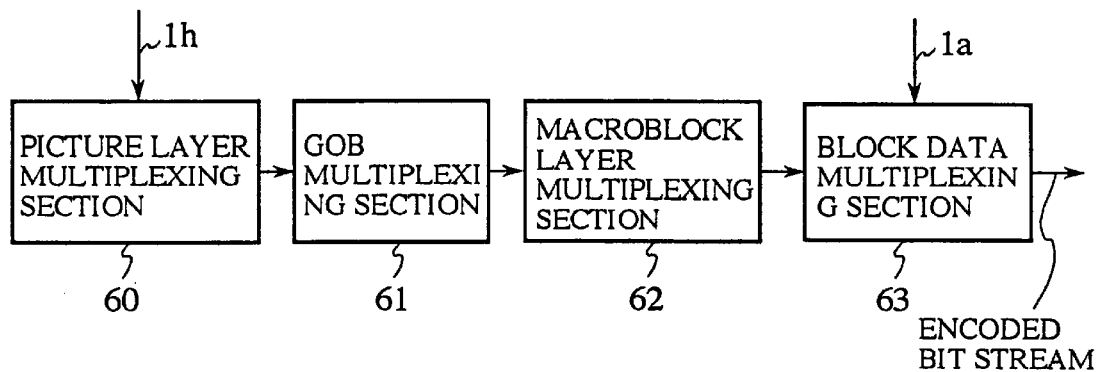

| PSC | PICTURE LAYER INFORMATION | GBSC | WEIGHTED COEFFICIENT INFORMATION | GOB LAYER INFORMATION | MB LAYER INFORMATION | BLOCK DATA INFORMATION |

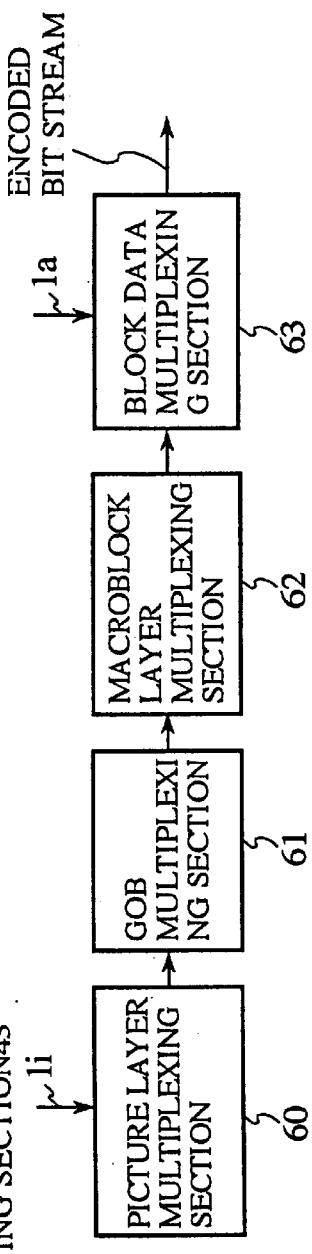

| PSC | PICTURE LAYER INFORMATION | COEFFICIENT DISTRIBUTION LIMITING OPERATION CONTROL INFORMATION | GBSC | GOB LAYER INFORMATION | MB LAYER INFORMATION | BLOCK DATA INFORMATION |

PACKET HEADER
ERROR DETECTION ENCODING (CRC OR THE LIKE)

IMAGE DECODING DEVICE AND IMAGE ENCODING DEVICE

CROSS-REFERENCE TO THE RELATED APPLICATION

This Application is a continuation of International Application No. PCT/JP99/03854, whose International filing date is Jul. 16, 1999, the disclosures of which Application are incorporated by reference herein.

BACKGROUND OF THE INVENTION

1. Field of the Invention

The present invention relates to a mounting technique for an image decoding device and image encoding device complying to various international standards for moving image compression and expansion. In particular, the present invention relates to an image decoding device and image encoding device which increases resistance to bit error generated in encoded bit streams.

2. Description of the Related Art

The ITU-T (International Telecommunication Union-Telecommunication Sector) Recommendation H.263 is known as a means of encoding and decoding image signals. H.263 divides the encoding and decoding of moving image data into a plurality of hierarchies.

FIG. 1 shows the structure of video data hierarchies in H.263. The layer in an uppermost position is called a picture layer. The picture layer is comprised from a plurality of GOB (Group of Blocks) layers. A macroblock layer exists in a lower layer of the GOB layers and a block layer exists in a lower layer of the macroblock layer.

FIG. 2 shows the structure of a macroblock. One macroblock is comprised of six blocks (8 pixels×8 lines) with block numbers 1~6 as shown in FIG. 2. Block numbers 1~4 are blocks for luminance components. Block numbers 5, 6 are color difference component blocks.

FIG. 3 shows an example of a conventional encoded bit stream. Binary digit strings which are respectively called picture start codes (PSC), and GOB start codes (GBSC) are added to the header of picture layer information and GOB layer information. These start codes (SC) are unique words (bit streams with only one interpretation) and have the function of showing the start of picture layer information and GOB layer information.

A GOB number or the like which is a number of the relevant GOB is contained in the GOB layer information. Layer information such as quantization step size, encoded mode which shows intra-encoded or inter-encoded is contained in the macro block (MB) layer information. Thereafter the block data information is stored.

Intra-encoded is an encoded mode which encodes only picture data itself of encoded images without using other pictures. Inter-encoded is an encoded mode which encodes picture information of encoded images using information of other pictures with a time frame.

FIG. 4 is a block diagram showing the structure of a conventional image decoding device using H.263. An encoded bit stream which is encoded is input into a syntax analysis section 1. Each layer of information of picture layer, GOB layer and macroblock layer is analyzed and decoded on the basis of the H.263 syntax. Thus block data information is analyzed.

At this time, when layer information and block data information not matching a fixed syntax is analyzed, an error syntax detection signal 1e to that effect is output to the error processor 7. The obtained quantization step size 1d is output to a reverse quantization processor 5 and the encoded mode 1b is output to a reverse DCT/decoding image generator 6.

When analyzed block data information is information determined by the H.263 decoding method, the syntax analysis section 1 determines that errors are not contained in the input encoded bit stream due to the influence of errors contained in an encoded bit stream even if the block data information to be analyzed is different block data information. Thus a quantization index column 1a for a decoded block unit is output to the reverse quantization processor 5. The quantization index column 1a is comprised of columns of quantization indexes. A quantization index is a quantization DCT coefficient.

A reverse quantization process applied to the quantization index column 1a of the block unit is provided in the reverse quantization processor 5 using a quantization step size Id input from the syntax analysis section 1. A DCT coefficient column 1f of a block unit is output to the reverse DCT/decoding image generator 6.

A reverse DCT process is provided with respect to the DCT coefficient column 1f of the block unit in the reverse DCT/decoding generator 6, a decoded image is generated based on the input encoded mode 1b and the generated decoded image is output.

The error processor 7 generates and outputs a decoded image by error suppression based on a fixed method on receipt of an error syntax detection signal 1e which shows layer information or block data information from the syntax analysis section 1 which does not match a fixed syntax.

However in a conventional image signal decoding device as shown above, the problem has arisen that error detection can not be performed since the image decoding device analyzes and performs decoding without recognizing the generation of errors in the encoded bit stream. This is the result of the block data information being block data information which is adapted to a fixed syntax which is predetermined on the encoded and decoded sides such as in the case of an H.263 video method or the like. This is the case even if the block data information which is different from the block data information which is to be analyzed is analyzed by an encoded bit stream due to the influence of errors contained in the encoded bit stream.

SUMMARY OF THE INVENTION

The present invention is proposed to solve the above problems and has the object of providing an image decoding device which can perform error detection even when block data information is adapted to a fixed syntax and such block data information, which differs from the block data information which should be analyzed, is analyzed by encoded bit stream.

The invention has a further object of obtaining an image encoding device generating an encoded bit stream which can effectively detect errors contained in an encoded bit stream in the image decoding device.

An image decoding device according to claim 1, which receives a signal containing image compression data through a transmission circuit and performs an expansion process with respect to image compression data, comprises a monitoring means which receives compression data, monitors the state of the transmission circuit and outputs a control signal to control an error block detection means based on a monitor result, and an error block detection means which determines whether an error is contained in received image data and which outputs an error detection state in image data. The error block detection means controls the sensitivity of error detection based on a control signal output from the monitoring means.

In such a way, under good reception conditions it is possible to avoid error detection due to the error block detection means and thus it is possible to perform overall stable decoding operations.

An image decoding device according to claim 2 performs image expansion processing and reverse orthogonal conversion on fixed block units with respect to image compression data. The image decoding device comprises an error block detection means which receives a threshold value and image signal in a frequency domain, determines whether or not a block data error is contained therein based on the threshold value and the image signal in a frequency domain and outputs an error detection state in block data.

In such a way, it is possible to detect even error blocks adapted to a fixed syntax and it is possible to generate a decoded image with little influence of errors contained in encoded bit streams.

An image encoding device according to claim 3 divides image data into block units, performs orthogonal conversion and performs compression coding on each block unit. The image encoding device comprises an encoded data value limiting means which receives a threshold value and an image signal in a frequency domain and which outputs an image signal with an added limit in a frequency domain based on a predetermined threshold value and an image signal in a frequency domain.

In such a way, it is possible to perform efficient detection of errors contained in encoded bit streams in the image decoding device. It is possible to generate an encoded bit stream which can generate a decoded image with little influence of errors contained in encoded bit streams.

An image decoding device according to claim 4 is characterized in that the error block detection means receives a threshold value defining a range of values of an image signal value in a frequency domain and an image signal in a frequency domain. The error block detection means performs error detection on block data based on whether an image signal value in a frequency domain is contained in the range of values or not and outputs an error detection state.

In such a way, it is possible to detect error blocks matching a fixed syntax and it is possible to generate a decoded image with little influence of errors contained in encoded bit streams.

An image decoding device according to claim 5 is characterized in that the error block detection means receives a threshold value variably defining a range of values of an image signal value in a frequency domain, which performs error detection on block data based on whether an image signal value in a frequency domain is contained in the range of variable values and which outputs an error detection state.

In such a way, it is possible to detect error blocks matching a fixed syntax and it is possible to generate a decoded image with little influence of errors contained in encoded bit streams.

An image encoding device according to claim 6 is characterized in that the encoded data value limiting means receives a threshold value defining a range of values of image signal values in a frequency domain and an image signal in a frequency domain. The encoded data value limiting means replaces an image signal value in the converted frequency domain with a value contained in the range of values based on whether an image signal value in the converted frequency domain is contained in the range of values and outputs encoded data.

In such a way, it is possible to perform effective detection of errors contained in an encoded bit stream in the image decoding device and it is possible to generate an encoded bit stream which can generate a decoded image with little influence of errors contained in encoded bit streams.

An image encoding device according to claim 7 is characterized in that the encoded data value limiting means receives a threshold value variably defining a range of values of an image signal value in a frequency domain and an image signal in a frequency domain. The encoded data value limiting means replaces an image signal value in the converted frequency domain to a value contained in the range of values based on whether an image signal value in the converted frequency domain is contained in the range of values and outputs encoded data.

In such a way, it is possible to perform effective detection of errors contained in an encoded bit stream in the image decoding device and it is possible to generate an encoded bit stream which can generate a decoded image with little influence of errors contained in encoded bit streams.

An image decoding device according to claim 8 is characterized in that the error block detection means receives a threshold value defining a range of frequencies of an image signal list in a frequency domain and an image signal in a frequency domain, and performs error detection in block data and outputs an error detection state based on whether or not a non-zero coefficient which corresponds to the highest frequency component of the coefficients contained in the image signal list in the frequency domains is contained in the frequency range given by the threshold value.

In such a way, it is possible to perform effective detection of errors contained in an encoded bit stream in the image decoding device and it is possible to generate a decoded image with little influence of errors contained in encoded bit streams.

An image decoding device according to claim 9 is characterized in that the error block detection means receives a threshold value variably defining a range of frequencies of an image signal list in a frequency domain, and performs error detection in block data and outputs an error detection state based on whether or not a non-zero coefficient which corresponds to the highest frequency component of the coefficients contained in the image signal list in the frequency domains is contained in the variable frequency range given by the threshold value.

In such a way, it is possible to perform effective detection of an error block matching a fixed syntax and it is possible to generate a decoded image with little influence of errors contained in encoded bit streams.

An image encoding device according to claim 10 is characterized in that the encoded data value limiting means receives a threshold value defining a range of frequencies of an image signal list in a frequency domain and an image signal in a frequency domain, and outputs encoded data which makes coefficient values, which correspond to frequencies above the threshold value, take a value of zero based on whether or not a non-zero coefficient which corresponds to the highest frequency component of the coefficients contained in the image signal list in the frequency domains is contained in the frequency range given by the threshold value.

In such a way, it is possible to perform effective detection of errors contained in an encoded bit stream in the image decoding device and it is possible to generate an encoded bit stream which can generate a decoded image with little influence of errors contained in encoded bit streams.

An image encoding device according to claim 11 is characterized in that the encoded data value limiting means receives a threshold value variably defining a range of frequencies of an image signal list in a frequency domain and an image signal in a frequency domain, and outputs encoded data which makes coefficient values, which correspond to frequencies above the threshold value, take a value of zero based on whether or not a non-zero coefficient which corresponds to the highest frequency component of the coefficients contained in the image signal list in the frequency domains is contained in the frequency range variably given by the threshold value.

In such a way, it is possible to perform effective detection of errors contained in an encoded bit stream in the image decoding device and it is possible to generate an encoded bit stream which can generate a decoded image with little influence of errors contained in the encoded bit stream.

An image decoding device according to claim 12 is characterized in that a block column detection means is provided which is given an error detection state output by the error block detection means, which counts the number of blocks determined to contain errors in the block data of the error detection states by a block column unit which is comprised by a plurality of blocks, which performs error detection of data in block columns based on that count number and a preset threshold value and which outputs an error detection state of data in block columns.

In such a way, it is possible to suppress the possibility of performing error determination which determines that an error is contained in a block which does not actually contain an error. Furthermore it is possible to generate a decoded image with little influence of errors contained in the encoded bit stream.

An image encoding device according to claim 13 is provided with a multiplexing means which receives threshold value control information which updates the threshold value and which multiplexes and outputs such threshold value control information to the encoded bit stream.

In such a way, it is possible to perform effective detection of errors contained in an encoded bit stream in the image decoding device and it is possible to generate an encoded bit stream which can generate an decoded image with little influence of errors contained in the encoded bit stream.

An image decoding device according to claim 14 is provided with an analyzing means which decodes and analyzes threshold value control information with an input encoded bit stream. An error block detection means inputs threshold value control information decoded and analyzed in the analyzing means, updates the threshold value based on the threshold value control information and performs error detection in the block data and outputs an error detection state based on the updated threshold value and the image signal in the frequency domain.

In such a way, it is possible to perform detection of an error block matching a fixed syntax and it is possible to generate an encoded bit stream with little influence of errors contained in encoded bit streams.

An image encoding device according to claim 15 is characterized in that a multiplexing means is provided which receives threshold value information used when the encoded data value limiting means limits the image signal distribution in the frequency domain and which multiplexes and outputs such threshold value information to the encoded bit stream. The encoded data value control means outputs encoded data in which the image signal distribution in the frequency domain is limited based on the threshold value information.

In such a way, it is possible to perform effective detection of errors contained in an encoded bit stream in the image decoding device and it is possible to generate an encoded bit stream which can generate an decoded image with little influence of errors contained in the encoded bit stream.

An image decoding device according to claim 16 is characterized in that an analyzing means which decodes and analyzes threshold value information used when limiting the image signal distribution in the frequency domain by the encoded bit stream. The error block detection means performs error detection in the block data and outputs an error detection state based on the threshold value information decoded and analyzed by the analyzing means.

In such a way, it is possible to perform detection of an error block matching a fixed syntax and it is possible to generate a decoded image with little influence of errors contained in encoded bit streams.

An image encoding device according to claim 17 is characterized in that a multiplexing means is provided which multiplexes and outputs limiting operation control information showing whether or not the encoded data value limiting means will perform a limiting operation. The encoded data value control means performs a limiting operation based on the limiting operation control information.

In such a way, it is possible to perform effective detection of errors contained in an encoded bit stream in the image decoding device and it is possible to generate an encoded bit stream which can generate an decoded image with little influence of errors contained in the encoded bit stream.

An image decoding device according to claim 18 is characterized in that an analyzing means is provided which analyzes limiting operation control information by the encoded bit stream. The error block detection means performs error detection on the block data and outputs an error detection state based on the limiting operation control information analyzed by the analyzing means.

In such a way, it is possible to perform effective detection of an error block matching a fixed syntax and it is possible to generate a decoded image with little influence of errors contained in encoded bit streams.

An image decoding device according to claim 19 is provided with a monitoring means which monitors the strength of a received signal of encoded data as a transmission state and outputs a threshold value control signal for controlling a threshold value when the error block detection means performs error detection in block data based on a monitoring result. The error block detection means controls a threshold value when performing error block detection based on the threshold value control signal from the monitoring means.

In this way, it is possible to avoid the performance of error detection by the error block detection means when reception conditions are good and thus it is possible to perform overall stable decoding operations.

An image decoding device according to claim 20 is characterized in that the monitoring means monitors the generation of bit errors when receiving an encoded signal as a transmission state and outputs an activation control signal which activates or does not activate the error block detection means based on a bit error generation state.

The error block detection means performs detection operations of error blocks based on the activation control signal from the monitoring means.

In this way, it is possible to avoid the performance of error detection by the error block detection means when reception conditions are good and thus it is possible to perform overall stable decoding operations.

An image decoding device according to claim 21 is provided with a monitoring means which inputs a media packet column detects bit errors in the packet based on error detection encoding added to the packet unit, counts the number of bit errors in a media packet unit, and outputs an activation control signal to activate or not activate the error block detection means or not based on a shift in the count value. The error block detection means performs an error block detection operation based on the activation control signal from the monitoring means.

In this way, it is possible to avoid the performance of error detection by the error block detection means when reception conditions are good and thus it is possible to perform overall stable decoding operations.

BRIEF DESCRIPTION OF THE DRAWINGS

FIG. 6 shows a maximum value table/minimum value table when inter-encoded mode has a maximum value/minimum value table storage section in a first embodiment of the present invention.

FIG. 7 shows a maximum value table/minimum value table when intra-encoded mode has a maximum value/minimum value table storage section in a first embodiment of the present invention.

FIG. 9 shows an example of a quantization index column of a decoded block unit.

FIG. 10 shows an example of a quantization index column of a block unit when the quantization index column shown in FIG. 9 is not correctly decoded due to an error.

FIG. 12 shows a maximum value table/minimum value table for inter-encoded mode stored in a maximum value/minimum value table storage section when the image decoding device is comprised as shown in FIG. 11.

FIG. 13 shows a maximum value table/minimum value table for intra-encoded mode stored in a maximum value/minimum value table storage section when the image decoding device is comprised as shown in FIG. 11.

FIG. 15 shows a corresponding table of quantization step size and weighted coefficient stored in a weighted coefficient determination section in a second embodiment of the present invention.

FIG. 16 shows an example of a maximum value table and a minimum value table regenerated by the weighted coefficient shown in FIG. 15.

FIG. 21 shows a quantization index column when controlling the quantization index column shown in FIG. 20 by the maximum value/minimum value control section according to a third embodiment of the present invention.

FIG. 22 shows the sequence of zigzag scanning in a third embodiment of the present invention.

FIG. 25 shows a quantization index column when controlling the quantization index column shown in FIG. 20 by the maximum value/minimum value control section according to a fourth embodiment of the present invention.

FIG. 28 shows the storage capacity of a valid coefficient position storage section according to a fifth embodiment of the present invention.

FIG. 29 is a flowchart of the processing of a valid coefficient position comparative section according to a fifth embodiment of the present invention.

FIG. 30 shows inter encoded mode and shows an example of a quantization index column for color difference component in order to describe the operation of a valid coefficient position comparative section according to a fifth embodiment of the present invention.

FIG. 31 shows an example of decoding under the influence of an error contained in the quantization index column shown in FIG. 30.

FIG. 33 is a block diagram showing an image decoding device according to a sixth embodiment of the present invention.

FIG. 34 shows a corresponding table of quantization step size and weighted coefficient stored in a weighted coefficient determination section in a sixth embodiment of the present invention.

FIG. 35 shows an example of a valid coefficient threshold value regenerated using a weighted coefficient and a valid coefficient threshold value in a valid coefficient position comparative section in a sixth embodiment of the present invention.

FIG. 50 is a block diagram showing a syntax multiplexing section according to a tenth embodiment of the present invention.

FIG. 51 shows the relationship between a weighted coefficient and an encoding language corresponding to a weighted coefficient according to a tenth embodiment of the present invention.

FIG. 52 shows an example of an encoded bit stream output from the syntax multiplexing section shown in FIG. 50.

FIG. 63 is a block diagram of a syntax multiplexing section according to a twelfth embodiment of the present invention.

FIG. 64 shows the relationship between a valid coefficient threshold value and an encoding language corresponding to each valid coefficient threshold value according to a twelfth embodiment of the present invention.

FIG. 65 shows an example of an encoded bit stream output from the syntax multiplexing section according to a twelfth embodiment of the present invention.

DETAILED DESCRIPTION OF THE PREFERRED EMBODIMENTS

In order to describe the present invention in greater detail, the present invention will be described with reference to the accompanying figures.

Embodiment 1

An example of an image decoding device provided with an error block detection section will be described with respect to a first embodiment of the present invention. The error block detection section detects an error generated by an encoded bit stream generated by H.263 video compression encoding in a block unit on the basis of whether a value of an image signal converted to a frequency domain is contained in a range set by a maximum value and a minimum value which are preset threshold values.

Figure 5:
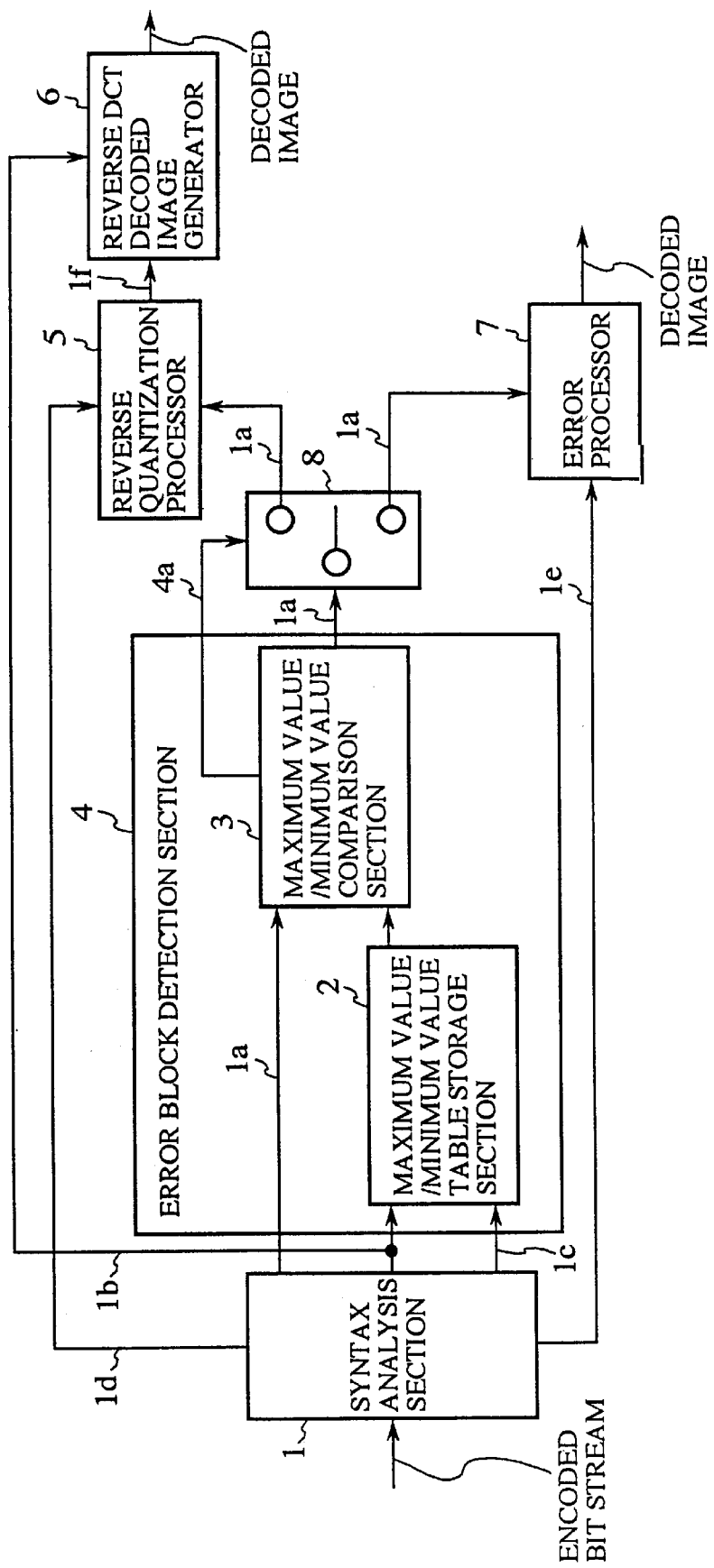
FIG. 5 is a block view of an image decoding device according to a first embodiment of the present invention.

FIG. 5 is a block diagram of an image decoding device according to a first embodiment of the present invention. In the figure, reference numeral 1 is a syntax analysis section, 1a is a quantization index column, 1b is an encoded mode, 1c is a block number, 1d is a quantization step size, 1e is an error syntax detection signal, 1f is a DCT coefficient column, 2 is a maximum value/minimum value table storage section, 3 is a maximum value/minimum value comparison section, 4a is an error block detection signal, 4 is an error block detection section comprised by a maximum value/minimum value table storage section 2 and a maximum value/minimum value comparison section 3 (error block detection means), 5 is a reverse quantization processor, 6 is a reverse DCT/decoding image generator, 7 is an error processor, 8 is a switching section.

The operation of the invention will be described below.

An encoded bit stream encoded and multiplexed by an image encoding device (not shown) is input into a syntax analysis section 1 and analysis and decoding of the image data and all layer information such as picture layer, GOB layer, macroblock layer is performed by H.263 syntax.

As a result, the quantization index column 1a of the obtained block unit (8 pixels×8 lines) is output to the maximum value/minimum value comparison section 3.

An encoded mode (intra encoded mode/inter encoded mode) is output to the maximum value/minimum value table storage section 2 and the reverse DCT/decoded image generator 6. A block number 1c which represents block position information is output to the maximum value/minimum value table storage section 2. A quantization step size 1d is output to the reverse quantization processor 5.

At this time, when image data or layer information not matching H.263 syntax is analyzed, an error syntax detection signal 1e is output to the error processor 7 to that effect.

FIG. 6 shows a maximum value table/minimum value table when inter-encoded mode has a maximum value/minimum value table storage section 2. FIG. 7 shows a maximum value table/minimum value table when intra-encoded mode has a maximum value table/minimum value table storage section 2.

The maximum value/minimum value table storage section 2 pre-stores four types of information in each encoded mode as shown respectively for example in FIGS. 6(a)~(d), FIGS. 7(a)~(d). These four types are a table showing maximum values (hereafter maximum value table) and a table showing minimum values (hereafter minimum value table) based on an encoded mode (intra encoded mode/inter encoded mode), and signal component (luminance component/color difference component).

Each table as shown in FIGS. 6(a)~(d) and FIGS. 7(a)~(d) has pre-set maximum and minimum values with respect to respective quantization index columns 1a of a block unit (8 pixels×8 lines).

The maximum value/minimum value table storage section 2 selects a maximum value table and a minimum value table from the four types of maximum value tables and four types of minimum value tables based on a block encoded mode 1b and a signal component obtained from the block number 1c and outputs the result to the maximum value/minimum value comparison section 3.

Figure 1:
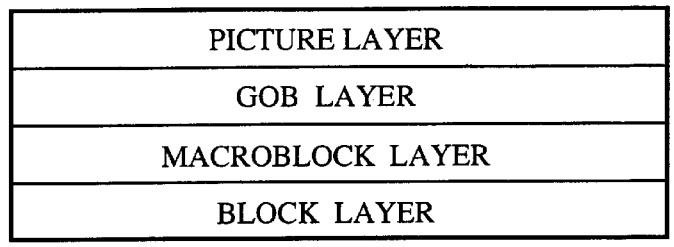
FIG. 1 shows the structure of a video data hierarchy in H.263.
Figure 2:
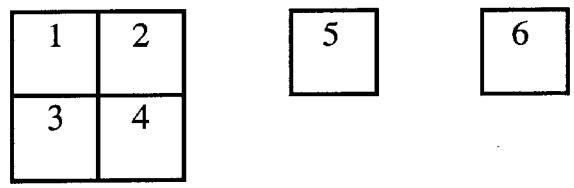
FIG. 2 shows the structure of a macroblock.
Figure 3:
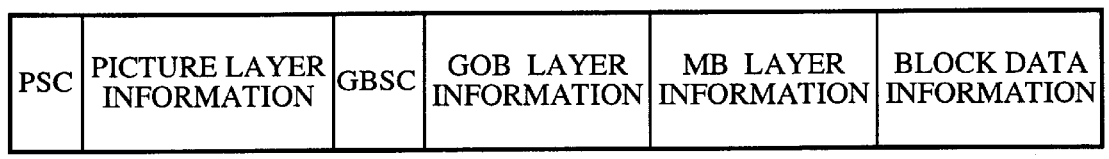
FIG. 3 shows an example of a conventional encoded bit stream.
Figure 4:
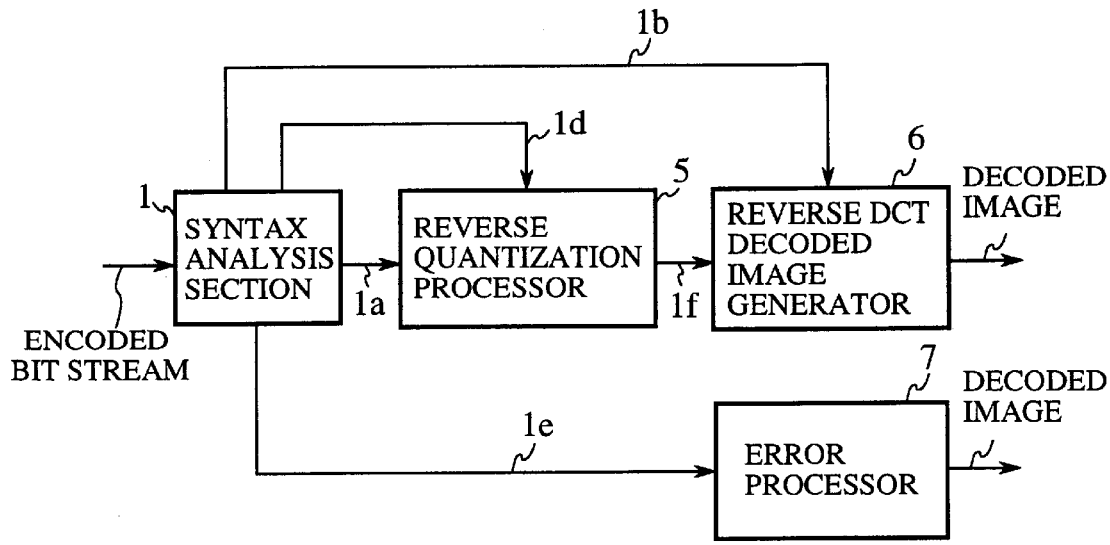
FIG. 4 is a block diagram of the structure of a conventional image decoding device using H.263.

For example when the encoded mode is "inter" and the block number 1b which represents block position information is 5, the maximum value/minimum value table storage section 2 selects a maximum value table and a minimum value table for color difference components and inter encoded as shown in FIGS. 6(c) and (d) (refer to FIG. 2). The selected maximum value table and minimum value table are output to the maximum value/minimum value table comparison section 3.

Figures 8, 9:
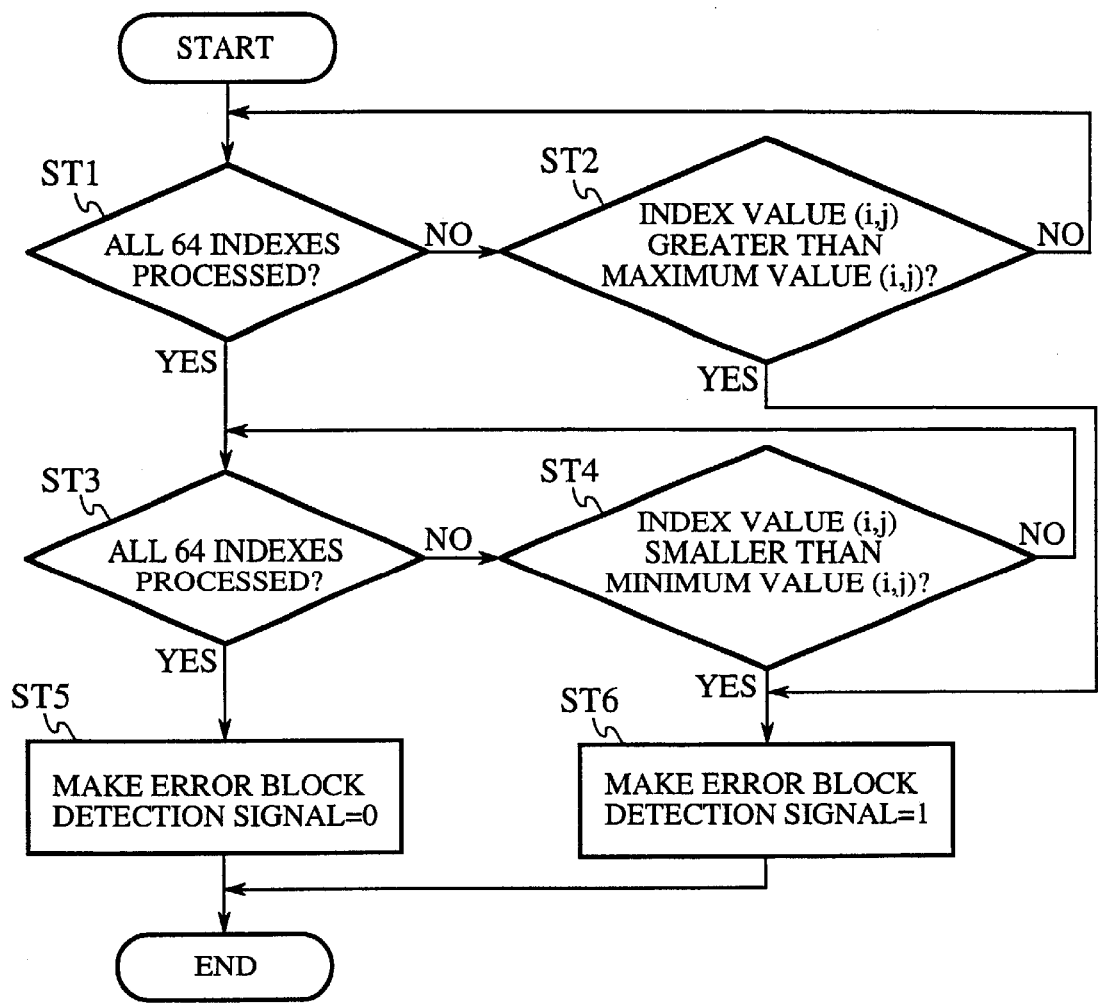
FIG. 8 is a flowchart showing the process performed in a maximum value/minimum value comparison section in a first embodiment of the present invention.
FIG. 9 is an example of inter encoded mode and shows an example of a quantization index column for color difference components. More precisely.

FIG. 8 is a flowchart showing the processing performed in the maximum value/minimum value table comparison section 3.

Firstly the maximum value/minimum value table comparison section 3 performs a comparison to determine whether or not a value of an i th row and j th column (i=1, 2, ... 8, j=1, 2, ... 8) (hereafter index value (i, j)) contained in the quantization index column 1a of a block unit exceeds a maximum value (hereafter maximum value (i, j)) shown in the i th row and j th column of the maximum value table (step ST1 "No, step ST2).

When as a result of the comparison in step ST2, the index value (i, j) exceeds the maximum value (i, j) (step ST2 "Yes"), the value "1" is output as an error block detection signal 4a and the operation is completed.

In the step ST2, when the comparison process of the index value (i, j) and the maximum value (i, j) is completed with respect to all 64 index numbers and the index value (i, j) does not exceed maximum value (i, j) (step ST1 "Yes"), the comparison is performed in the same way to determine whether or not the index value (i, j) of the quantization index column 1a is less than the maximum value (hereafter maximum value (i, j)) shown by the i th row and j th column of the minimum value table (step ST 3 "No", step ST4).

When as a result of the comparison in step ST4, the index value (i, j) is lower than the minimum value (i, j) (step ST4, "Yes"), the value "1" is output as an error block detection signal 4a and the operation is terminated.

When the comparison process of the index value (i, j) and the minimum value (i, j) is completed with respect to all 64 index numbers (step ST3, "Yes"), the value "0" is output as an error block detection signal 4a (step ST5).

An actual example of the process of the maximum value/minimum value comparison section 3 will be described below.

FIG. 9 is an example of inter encoded mode and shows an example of a quantization index column of color difference components. More precisely, FIG. 9 shows an example of a quantization index column of a decoded block unit. However the situation is assumed in which a quantization index column Ia as shown in FIG. 10 is decoded under the influence of errors contained in the encoded bit stream.

That is to say, it is assumed that although the quantization bit stream 1a should be decoded as shown in FIG. 9, a correct decoding process is not performed due to errors existing in the encoded bit stream and a quantization index column 1a is obtained as shown in FIG. 10.

In this case, the maximum value table and the minimum value table selected by the maximum value/minimum value table storage section 2 is adapted for inter encoded and color difference components as shown in FIGS. 6(c) and (d).

When the value of the maximum value table and the minimum value table as shown in FIGS. 6(c) and (d) selected by the maximum value/minimum value table storage section 2 is compared with the value of the quantization index column 1a of the block unit shown in FIG. 10, the value "1" is output to the switching section 8 as an error block detection signal 4a since the value (=−70) of the $4^{th}$ row $7^{th}$ column and the value (=−63) of the $7^{th}$ row $2^{th}$ column in the quantization index column 1a of the block unit shown in FIG. 10 are respectively lower than the minimum value shown by the $4^{th}$ row $7^{th}$ column and $7^{th}$ row $2^{th}$ column of the minimum value table as shown in FIG. 6(d).

In FIG. 5, a quantization index column 1a of a block unit output by the maximum value/minimum value comparison section 3 is output to the switching section 8.

The switching section 8 switches the output based on an error block detection signal 4a. That is to say, when the error block detection signal 4a is "0", since an error block is shown not to be present, a quantization index column 1a of a block unit is output to the reverse quantization processor 5. On the other hand, when the error block detection signal 4a is "1", since an error block is shown to be present, a quantization index column 1a of block unit is output to the error processor 7.

The reverse quantization processor 5 performs a reserve quantization process with respect to the quantization index column 1a of the block unit using a quantization step size 1d input from the syntax analysis section 1. Thereafter a DCT coefficient column 1f of the block unit is output to the reverse DCT/decoding image generator 6.

The reverse DCT/decoding image generator 6 performs a reverse DCT process with respect to the DCT coefficient column 1f of the block unit and generates and outputs a decoded image matching the encoded mode input by the syntax analysis section 1.

Since there is an error block, the error processor 7 performs a suppression of error positions based on a fixed method and outputs the generated decoded image when a quantization index column 1a is input from the block unit by the switching section 8.

An example of suppression errors using an image decoded immediately before the block generated by the error will be described below as an method of suppression error positions.

For example it is assumed that an error is detected in block data in the fourth macroblock contained in the second GOB of the image. In such a case, block data exists after the macroblock generated by the error and contained in the second GOB, that is to say, a macroblock in a position from a macroblock containing an error-generated block to a macroblock contained up to the analysis of the next unique word.

Such block data is adapted to be replaced by block data contained in the immediately previous decoded image at the same position as the above block data.

Thus according to embodiment 1, it is possible to perform rapid detection of an error block in an encoded bit stream by an error block detection section 4. It is also possible to suppress rapidly errors generated in an encoded bit stream by the error processor 7. Thus it is possible to reduce deterioration in image quality at error generated positions.

That is to say, when error detection is delayed, data contained from an error-generated block to a block in which error suppression is performed is data which is entirely different from the data which should be decoded as a result of errors and results in conspicuous image deterioration. However it is possible to prevent such conspicuous image quality deterioration by the error processor 7 and the error block detection section 4.

As shown above, according to embodiment 1, an image decoding device has a table showing maximum and minimum values which are threshold values corresponding to 64 index values contained in blocks. Since it is determined whether errors are contained in encoded bit streams of data to be decoded by using the maximum and minimum values contained in the table, it is possible to perform rapid detection of error blocks matching a fixed syntax. It is also possible to generate decoded images with little influence of errors contained in the encoded bit stream.

Discussion in embodiment 1 centered on a H.263 video decoding method. However it is possible to obtain the same advantage even when another decoding method which decodes encoded data which is compressed by conversion to a frequency domain such as orthogonal conversion. This process may be applied in the same way to an image decoding device in other embodiments of the present invention to be described hereafter.

Figure 11:
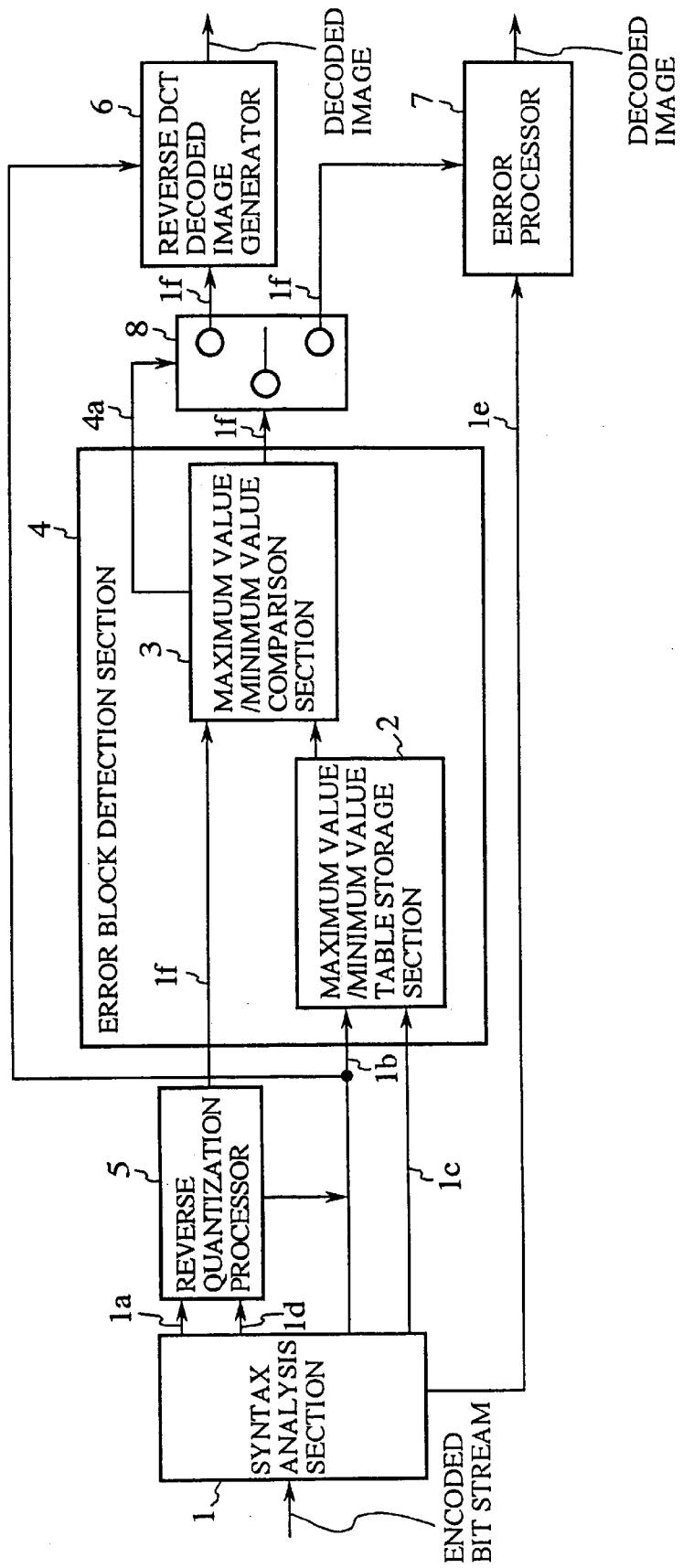
FIG. 11 is a block diagram showing another structure of an image decoding device according to a first embodiment of the present invention.

In embodiment 1, an image decoding device as shown in FIG. 5 was described. However the image decoding device may be comprised as shown in FIG. 11 and adapted so that the DCT coefficient column 1f of a block unit output from the reverse quantization processor 5 may be input into the error block detection section 4.

In this case, the quantization index column 1a of the block unit output from the syntax analysis section 1 is such that the DCT coefficient column 1f of the block unit is input into the maximum value/minimum value comparison section 3 of the error block detection section 4 after an reverse quantization process is performed in the reverse processor 5. At this time, the maximum value/minimum value table storage section 2 has a maximum value table and a minimum value table such as shown in FIGS. 12(a)~(d) and FIGS. 13(a)~(d).

Furthermore the DCT coefficient column 1f of the block unit is output by the switching section 8 to the reverse DCT/decoding image generator 6 when the error block detection signal 4a takes a value of "0" and is output to the error processor 7 when the error block detection signal 4a takes a value of "1".

Embodiment 2

Embodiment 2 shows another example of an error block detection section shown in embodiment 1. That is to say, the error block detection section 4 in embodiment 2 varies the maximum and minimum values which are the threshold values used in the error block detection section 4 in embodiment 1. The values are adapted by a weighted coefficient corresponding to a quantization step size 1d which is threshold value updating information. It is determined whether or not a value of an image signal converted to a frequency domain is contained in a range set by the converted maximum and minimum values of the threshold value and in this way the error block is detected.

Figure 14:
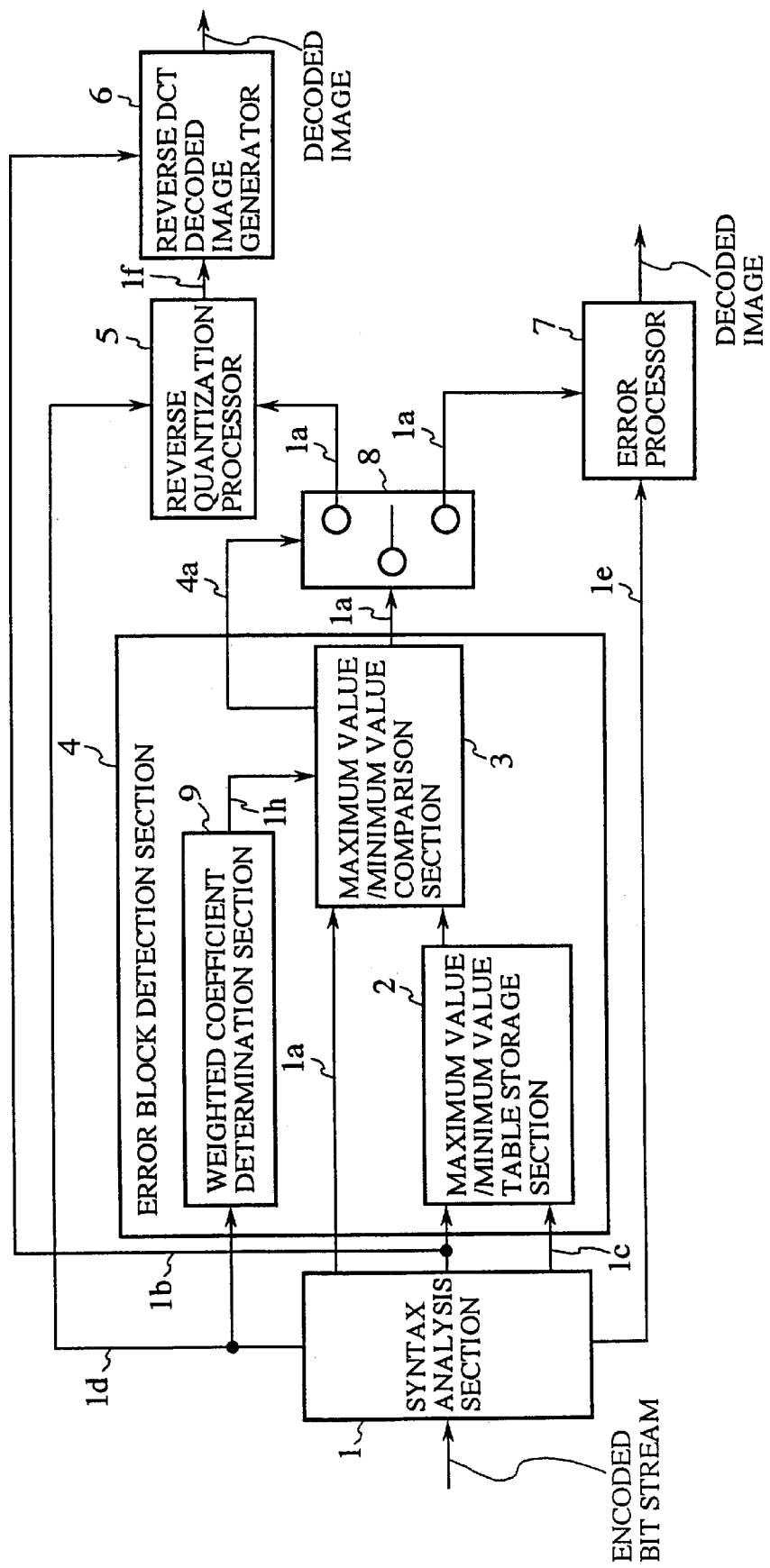
FIG. 14 is a block diagram showing the structure of an image decoding device according to a second embodiment of the present invention.

FIG. 14 is a block diagram showing an image decoding device according to embodiment 2 of the present invention. Embodiment 2 comprises a different arrangement from the structure of the image decoding device according to embodiment 1 as shown in FIG. 5. In FIG. 14, 9 is a weighted coefficient determination section which is provided in the error block detection section (error block detection means) 4. 1h is a weighted coefficient.

The operation of the invention will be described below.

In the encoded bit stream, image data and layer information such as the picture layer, GOB layers, macroblock layer in the encoded bit stream are decoded and analyzed by H.263 syntax.

As a result, the quantization index column 1a of the obtained block unit (8 pixels×8 lines) is output to the maximum value/minimum value comparison section 3. The encoded mode (intra encoded mode| inter encoded mode) 1b is output to the maximum value/minimum value table storage section 2 and the DCT/decoding image generator 6. The block number 1c which is the block position information is output to the maximum value/minimum value table storage section 2. The quantization step size 1d is output to the reverse quantization processor 5 and the weighted coefficient determination section 9.

At this time, an error syntax detection signal 1e is output to the error processor 7 when layer information or image data is analyzed which does not match the H.263 syntax.

The weighted coefficient determination section 9 has a table of quantization step size 1d and weighted coefficient 1h as shown in FIG. 15. Using the table, a weighted coefficient 1h which corresponds to the quantization step size 1d used in the reverse quantization process of the block is output to the maximum value/minimum value comparison section 3.

For example, as shown in FIG. 15, if the quantization step size 1d is less than "8", the weighted coefficient 1h takes a value of "1.1", if the quantization step 1d size is greater than or equal to "8" and less than "16", the weighted coefficient 1h takes a value of "1.0", if the quantization step size 1d greater than or equal to "16" and is less than "24", the weighted coefficient 1h takes a value of "0.9", and if the quantization step size 1d greater than or equal to "24", the weighted coefficient 1h takes a value of "0.8".

The maximum value/minimum value comparison section 3 reads 64 values in the maximum value table and the 64 values contained in the minimum value table read from in maximum value/minimum value table storage section 2. The maximum value/minimum value comparison section 3 applies a weighted coefficient 1h from the weighted coefficient determination section 9 to these values and generates a new maximum value table and minimum value table.

An example of a newly generated maximum value table and minimum value table is shown below. For example, the situation is assumed that the encoded mode is inter encoded, the block number 1b which is block position information is "5" and the weighted coefficient 1h is "0.8" (that is to say, the quantization step size is greater than or equal to 24). In this case, the newly generated maximum value table and minimum value table as shown in FIGS. 16(a), (b) is comprised inter encoded mode as shown in FIGS. 6(c) and (d), the 64 values in the maximum value table of the color difference component and the 64 values in the minimum value table respectively multiplied by 0.8.

The maximum value/minimum value comparison section 3 in the same way as embodiment 1 performs a comparison to determine whether the index value (i, j) exceeds the maximum value (i, j) shown by the ith row and jth column of the maximum value table updated by the weighted coefficient 1h and performs a comparison to determine whether the index value (i, j) is less than the minimum value (i, j) shown by the ith row and jth column of the minimum value table updated by the weighted coefficient 1h. Other operations are the same as the operations described with respect to embodiment 1 and additional description will be omitted.

As shown above according to embodiment 2, the image decoding device varies a maximum value and minimum value, which are threshold values corresponding to 64 index values contained in a block, by varying the values with a weighted coefficient 1h corresponding to a quantization step size 1d. The determination is performed as to whether or not an error is contained in the bit stream to be decoded. Thus even if an error block matches a fixed syntax, it is possible to perform rapid detection in comparison with embodiment 1 and it is possible to generate a decoded image with little influence of errors contained in the encoded bit stream.

Figure 17:
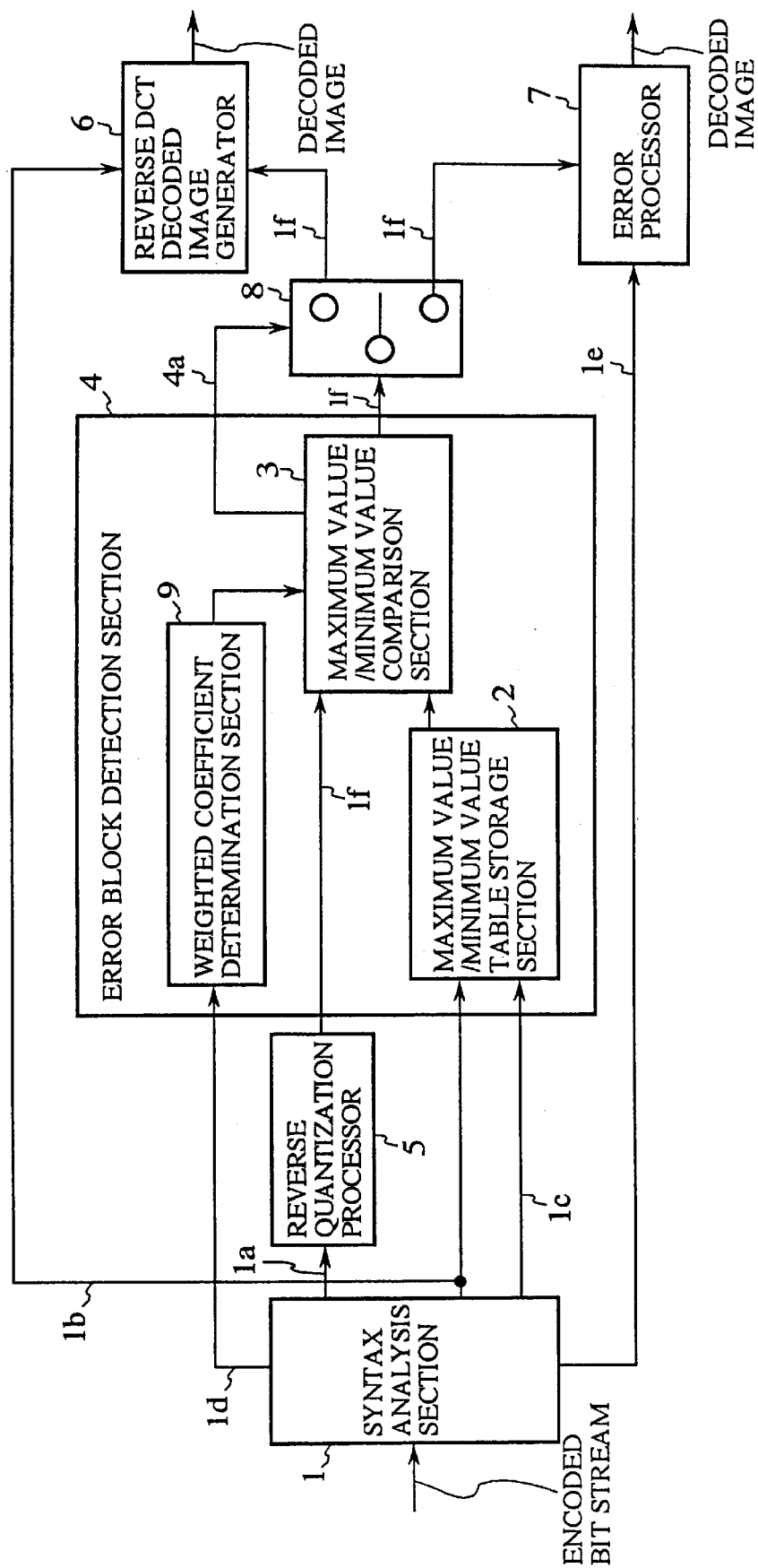
FIG. 17 is a block diagram showing another image decoding device according to a second embodiment of the present invention.

In embodiment 2, the image decoding device is comprised as shown in FIG. 14. However the device may be comprised as shown in FIG. 17 by inputting a DCT coefficient 1f of the block unit output from the reverse quantization processor 5 into the error block detection section 4.

The quantization index column 1a of the block unit output from the syntax analysis section 1 is input into the maximum value/minimum value comparison section 3 of the error block detection section 4 after the reverse quantization process is performed in the reverse quantization processor 5. The maximum value/minimum value table storage section 2 has a maximum value table and a minimum value table as shown in FIGS. 12(a)~(d) and FIGS. 13(a)~(d).

The DCT coefficient column I f of the block unit is output to the reverse DCT/decoding image generator 6 when the error block detection signal 4a is "0" and is output to the error processor 7 when the error block detection signal 4a is "1".

In embodiment 2, the image decoding device varies a maximum value and minimum value, which are threshold values used by the error block detection section 4, by varying the values with a weighted coefficient 1h corresponding to a quantization step size 1d representing threshold value updating information. However the invention is not limited in this respect and depending on encoding conditions such as quantization step size 1d, it is sufficient if threshold value updating information which can update a threshold value is adapted to generate an optimal decoded image.

Applying this above process in the same way to other embodiments of the present invention using threshold updating information, threshold value updating information other than a weighted coefficient $1h$ which corresponds to the quantization step size $1d$ is sufficient. The method of updating of the threshold value need not involve multiplication of the weighted coefficient $1h$ and may be adapted to update information by addition and subtraction or by a fixed formula.

Embodiment 3

In embodiment 3, an example will be given of an image encoding device which generates an encoded bit stream in which an error contained in the encoded bit stream can be rapidly detected in the image decoding device. The is performed by limiting the value of the image signal converted to a frequency domain in the image encoding device using maximum and minimum values which are pre-set threshold values.

Figure 18:
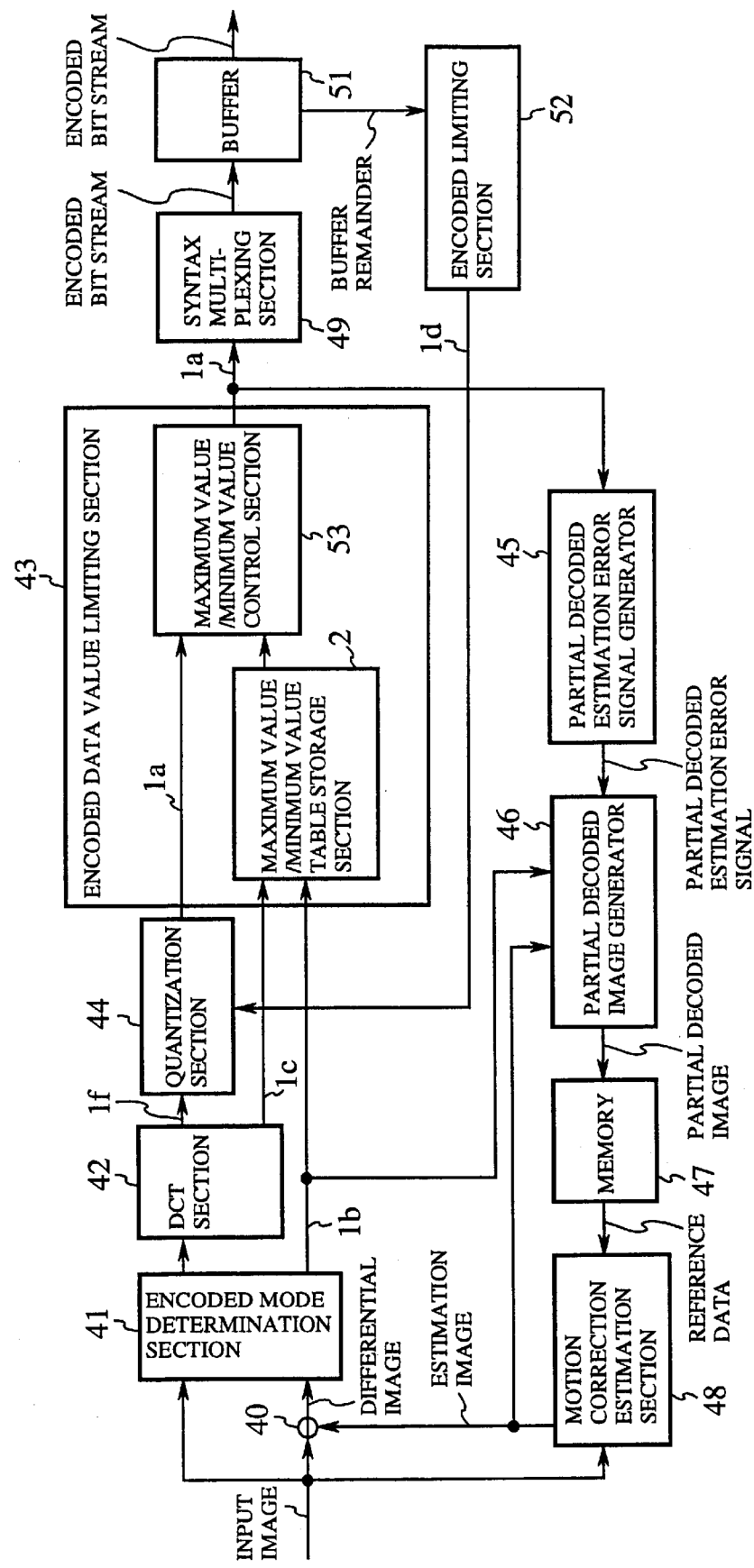
FIG. 18 is a block diagram showing an image encoding device according to a third embodiment of the present invention.

FIG. 18 is a block diagram of an image encoding device according to embodiment 3 of the present invention. In the figure, 40 is a subtracter, 41 is an encoded mode determination section, 42 is a DCT section, 43 is a encoded data value limiting section (encoded data value limiting means), 44 is a quantization section, 45 is a partial decoded estimation error signal generator, 46 is a partial decoding image generator, 47 is a memory, 48 motion correction estimation section, 49 is a syntax multiplexing section, 51 is a buffer, 52 is an encoded limiting section, 53 is a maximum value/minimum value control section. 2 is a maximum value/minimum value storage section which is the same as the maximum value/minimum value storage section 2 in embodiment 1 and the like. The encoded data value limiting section 43 is comprised by a maximum value/minimum value storage section 2 and a maximum value/minimum value control section 53.

The operation of the invention will be described below.

An input image is input into the encoded mode determination section 41, the subtracter 40 and the motion correction estimation section 48.

The motion correction estimation section 48 inputs reference data from the memory 47 and performs block matching using a region of 16 pixels and 16 lines called a macroblock as a unit. In this way, motion information is obtained. The motion correction estimation section 48 inputs reference data of a position which corresponds to the motion information from the memory 47 and generates an estimation image. The estimation image generated in the motion correction section 48 is output to the partial decoded image generator 46 and the subtracter 40. The subtracter 40 generates a differential image from the estimation image and the input image.

The encoded mode determination section 41 selects an encoded mode (inter/intra) on the macroblock unit with a fixed method determined by H.263. The selected encoded mode $1b$ is output to the maximum value/minimum value table storage section 2 and the partial decoding image generator 46.

The DCT section 42 separates the image data of the input macroblock unit into block units and performs DCT processing on the block unit. The DCT coefficient column $1f$ of the block unit is output to the quantization section 44 and the block number $1c$ is output to the maximum value/minimum value table storage section 2.

The quantization section 44 uses a quantization step size $1d$ input from the encoding limiting section 52, performs quantization processing with a fixed method determined by H.263 and outputs the quantization index column $1a$ of the block unit to the maximum value/minimum value control section 53.

The maximum value/minimum value storage section 2 in the same way as embodiment 1 pre-stores four types of maximum value tables and minimum value tables in respective encoded modes as shown in FIGS. 6($a$)~($d$) and FIGS. 7($a$)~($d$). In each block, respective maximum value tables and minimum value tables are selected from the four types of maximum value tables and minimum value tables respectively shown in FIGS. 6($a$)~($d$) and FIGS. 7($a$)~($d$) based on a signal component obtained from the block number $1c$ and the encoded mode $1b$. The result is output to the maximum value/minimum value control section 53.

Figures 19, 20:
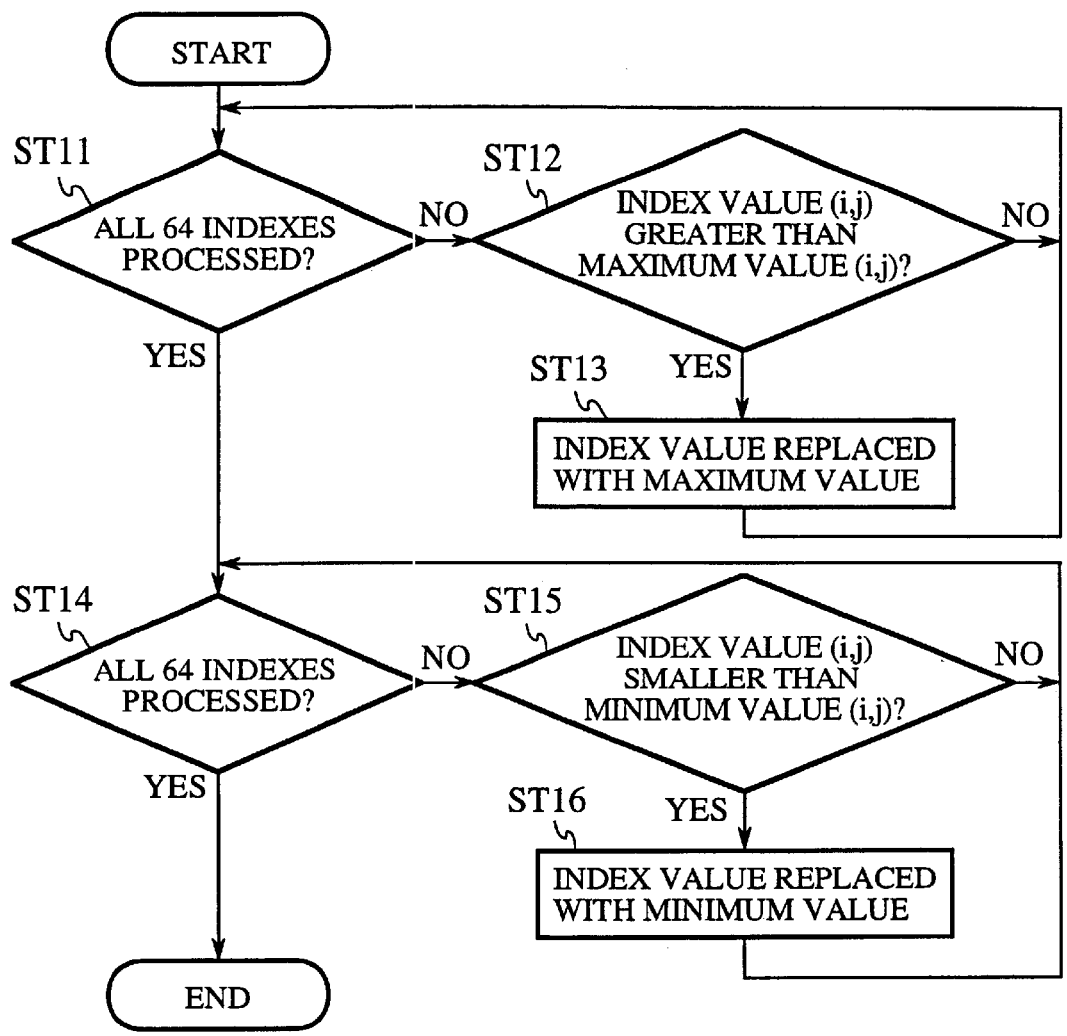
FIG. 19 is a flowchart showing the processing of the maximum value/minimum value control section according to a third embodiment of the present invention.
FIG. 20 shows inter encoded mode and shows an example of a quantization index column for color difference components in order to describe a maximum value/minimum value control section according to a third embodiment of the present invention.

FIG. 19 is a flowchart of the process of the maximum value/minimum value control section 53.

The maximum value/minimum value control section. 53 performs a comparison to determine whether an index value (hereafter index value (i, j)) of the ith row and jth column (i=1, 2, ... 8, j=1, 2, ... 8) which is contained in the quantization index column $1a$ of the block unit is greater than a maximum value (i, j). (step ST11 "No", step ST12).

When the result of the comparison shows that the index value (i, j) is greater than a maximum value (i, j), the index value (i, j) is switched to the maximum value (i, j). In other cases, (step ST12 "No"), the index value (i, j) continues to be used.

When the comparison process of step ST12 is completed with respect to all 64 indexes (step ST11 "Yes"), the comparison is performed as to whether or not the index value (i, j) is lower than a minimum value (i, j) (step ST14, "No", Step ST15).

When the result of the comparison is that the index value (i, j) is less than a minimum value (i, j) (Step ST15 "Yes"), the index value (i, j) is switched to the minimum value (i, j) (step ST16).

On the other hand, in other cases (step ST15, "No"), the index value (i, j) continues to be used.

When the comparison process of step ST15 is completed with respect to all 64 indexes (step ST14 "Yes"), the routine is completed.

An actual example of the processing of the maximum value/minimum value control section 53 will be described below.

FIG. 20 shows an example of a quantization index column $1a$ of a color difference component, inter encoded mode. In this case, the selected maximum value table and minimum value table are those for color difference and inter encoded mode as shown in FIGS. 6($c$) and ($d$).

When the comparison of the 64 maximum values contained in the maximum value table and the 64 index values contained in the quantization index column $1a$ is performed, it is shown that the index value (=11) of the $2^{nd}$ row $6^{th}$ column is greater than the $2^{nd}$ row $6^{th}$ column value (=10) in the maximum value table.

In the same way, when the comparison of the 64 minimum values contained in the minimum value table and the 64 index values contained in the quantization index column $1a$ is performed, it is shown that the index value (=−6) of the $8^{th}$ row $1^{st}$ column is greater than the $8^{th}$ row $1^{st}$ column value (=−5) in the minimum value table.

Thus the quantization index column $1a$ output from the maximum value/minimum value control section 53 becomes the quantization index column 1a shown in FIG. 21 in which the value of the $8^{th}$ row $1^{st}$ column becomes "−5" and the value of the $2^{nd}$ row $6^{th}$ column becomes "10" from the quantization index column 1a shown in FIG. 20.

In such a way, the quantization index column 1a of the block unit processed by the maximum value/minimum value control section 53 is output to the syntax multiplexing unit 49 and the partial decoding estimation error signal generator 45.

The partial decoding estimation error signal generator 45 performs a reverse DCT process and reverse quantization process on the quantization index column 1a of the input block unit and generates a partial decoding estimation error signal. The result is output to the partial decoding image generator 46.

The partial decoding image generator 46 operates based on the encoded mode 1b using a macroblock as a unit. That is to say, when the encoded mode 1b is intra, the input partial decoding estimation error signal is read into the memory 47 as a partial decoded image. When the encoded mode is inter, the partial decoding estimation error signal and the estimation image are added and a partial decoded image is generated and read into the memory 47.

The syntax multiplexing section 49 performs multiplexing and encoding of each layer information, such as a picture layer, GOB layer and macroblock layer, the encoded bit stream according to H.263 syntax. The quantization index column 1a of the block unit which is a two dimensional coefficient column is sequenced transformed to a one dimensional index column by zigzag scanning order. Variable length encoding is performed on the sequenced one dimensional index column, the resulting variable length encoding language is multiplexed to an encoded bit stream and the encoded bit stream is output to the buffer 51.

FIG. 22 shows the sequence of a zigzag scan. The zigzag scan is a scanning method which converts a two dimensional signal into a one dimensional signal by scanning in a zigzag towards a coefficient in the lower right from a coefficient in the upper left of the block.

The buffer 51 in FIG. 18 momentarily stores an input encoded bit stream from the syntax multiplexing section 49 and transmits the encoded bit stream depending on the condition of the transmission pathway from the stored encoded bit stream. The buffer remainder which is the capacity of the encoded bit stream stored in the buffer 51 is output to the encoded control section 52.

The encoded control section 52 performs control of the quantization step size 1d based on the buffer remainder and outputs the updated quantization step size 1d to the quantization section 44.

As shown above with respect to embodiment 3, the image encoding device has a maximum value and a minimum value which are threshold values corresponding to the 64 index values contained in a block. When an index value which is greater than a maximum value exists, or when an index value which is lower than a minimum value exists, the index value which is generated by the process of encoding is replaced by a maximum value or a minimum value which are threshold values. Thus if this process is combined with an image decoding device according to embodiment 1 or the like, it is possible to perform effective detection of errors generated in a transmission pathway contained in encoded bit streams and to generate an encoded bit stream which can generate a decoded image with little influence of errors contained in the encoded bit stream.

In embodiment 3, the description was based on an H.263 encoding method. However even when another encoding method is used which performs orthogonal conversion, it is possible to obtain the same effect. This method may be applied hereafter in the same way to an image encoding device in other embodiments of the present invention.

Figure 23:
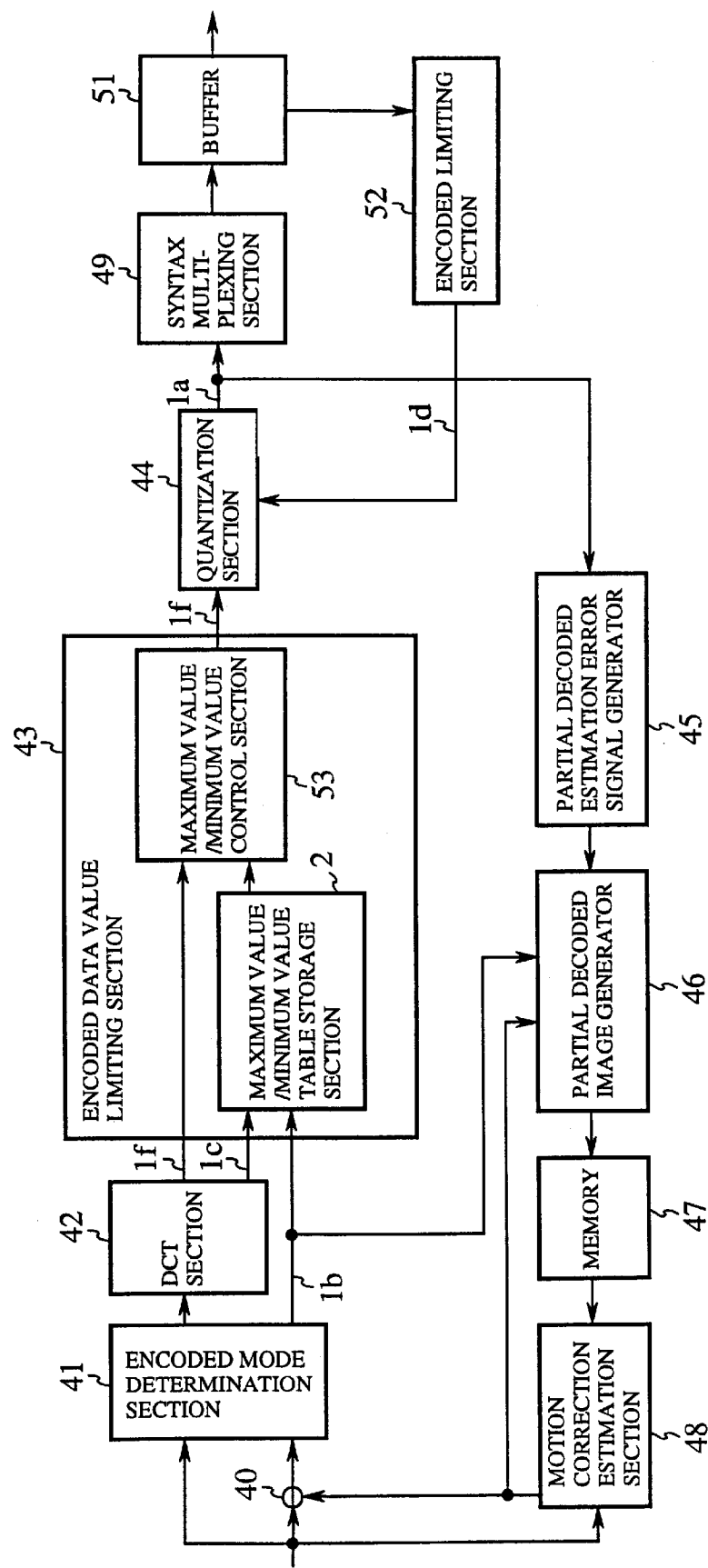
FIG. 23 is a block diagram showing another arrangement of an image encoding device according to a third embodiment of the present invention.

In embodiment 3, an image encoding device is comprised as shown in FIG. 18 and a quantization index column 1a of a block unit is input into the encoded data value control section 43. However as shown in FIG. 23, the DCT coefficient column 1f of the block unit output from the DCT section 42 may be input into the encoded data value control section 43. In this case, the DCT coefficient column 1f of the block unit output from the DCT section 42 is input directly into the maximum value/minimum value control section 53. The maximum value/minimum value table storage section 2 has maximum value tables and minimum value tables as shown in FIGS. 12(a)–(d) and FIGS. 13(a)–(d).

The DCT coefficient column 1f of the block unit output from the maximum value/minimum value control section 53 is output to the quantization section 44. After a quantization process is performed, the quantization index column 1a is output to the syntax multiplexing section 49.

Embodiment 4

In embodiment 4, another arrangement of the encoded data value limiting section 43 shown in embodiment 3 is given. That is to say, in embodiment 4, the encoded data value limiting section 43 varies a maximum value and minimum value, which are pre-set threshold values, by adapting the values with a quantization step size 1d. Thus the value of an image signal converted to a frequency domain is limited by use of converted maximum and minimum values. Therefore the image encoding device can generate an encoded bit stream which can detect errors contained in an encoded bit stream rapidly.

Figure 24:
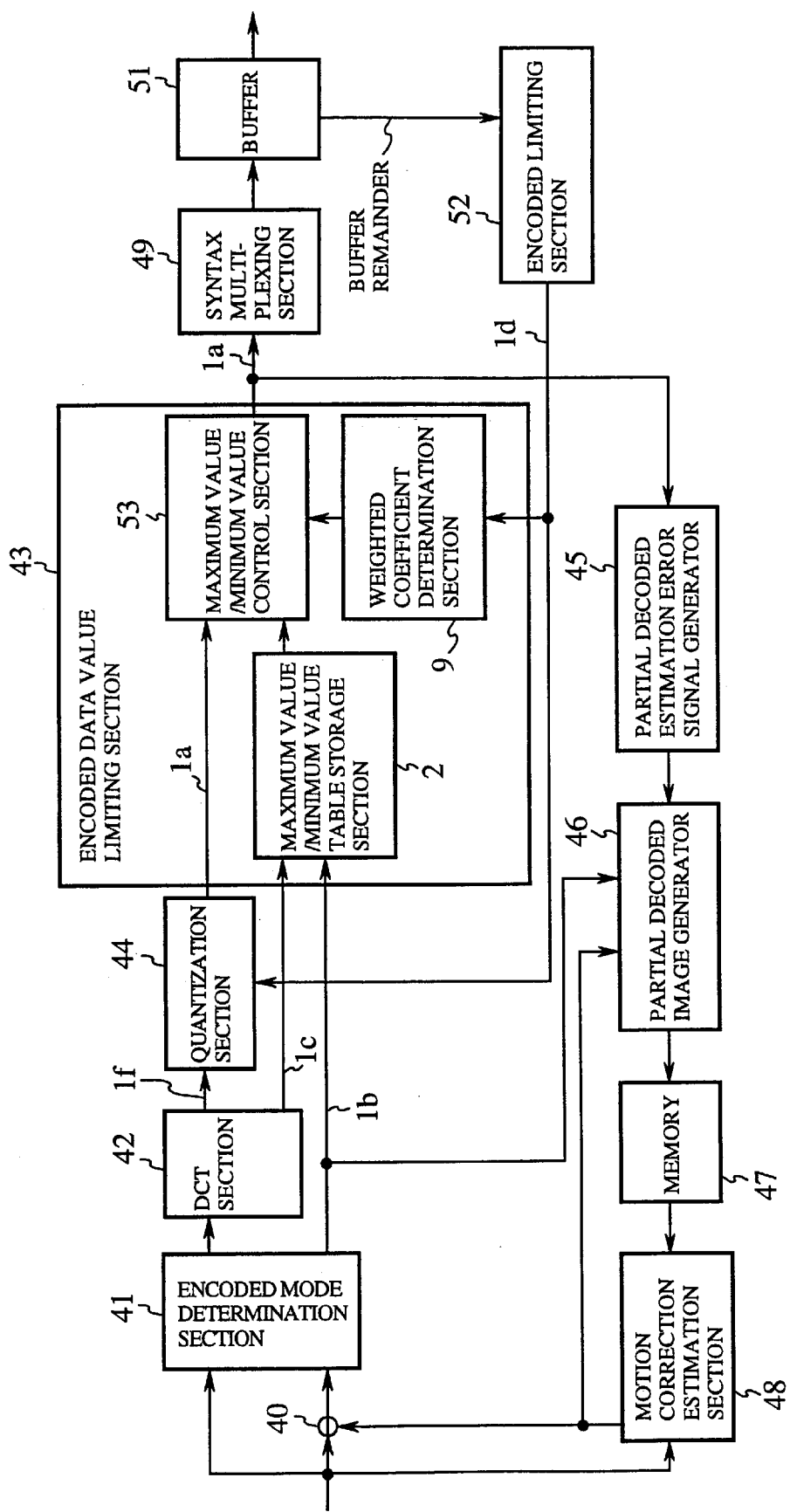
FIG. 24 is a block diagram showing an arrangement of an image encoding device according to a fourth embodiment of the present invention.

FIG. 24 is a block diagram of an image encoding device according to a fourth embodiment of the present invention. In embodiment 4, an arrangement which differs from the image encoding device shown in FIG. 18 will be described. In FIG. 24, 9 is a weighted coefficient determination section provided in the encoded data value limiting section (encoded data value limiting means) 43.

The operation of the invention will be described below.

The encoding control section 52 performs control of the quantization step size 1d based on a buffer remainder and outputs the updated quantization step size 1d to the weighted coefficient determination section 9 of the quantization section 44 and the encoded data value limiting section 43.

The weighted coefficient determination section 9 has a table of quantization step sizes 1d and weighted coefficients 1h as shown in FIG. 15 described with reference to embodiment 2. The table is used to determine a weighted coefficient 1h which corresponds to a quantization step size 1d used in the reverse quantization process of the block. The determined weighted coefficient 1h is output to the maximum value/minimum value control section 53.

For example, if the quantization step size is less than "8", the weighted coefficient 1h takes a value of "1.1", if the quantization step size 1d is greater than or equal to "8" and less than "16", the weighted coefficient 1h takes a value of "1.0", if the quantization step size 1d is greater than or equal to "16" and less than "24", the weighted coefficient 1h takes a value of "0.9", and if the quantization step size 1d is greater than or equal to "24", the weighted coefficient 1h takes a value of "0.8".

The maximum value/minimum value control section 53 applies a weighted coefficient 1h to the 64 values in the maximum value table and the 64 values contained in the minimum value table selected and read from the maximum value/minimum value table storage section 2 and generates an updated maximum value table and minimum value table.

The updated maximum value table and minimum value table are as shown in FIGS. 16(*a*), (*b*) described with reference to embodiment 2. For example, the situation is assumed that the encoded mode is inter encoded, the block number 1*c* of the block is "5" and the weighted coefficient 1*h* is "0.8" (that is to say, the quantization step size 1*d* is greater than or equal to 24). In this case, the updated maximum value table and minimum value table is as shown in FIGS. 16(*a*), (*b*) and, in the inter encoded mode as shown in FIGS. 6(*c*), (*d*), is comprised of 64 values in the maximum value table of the color difference component and 64 values in the minimum value table respectively multiplied by 0.8.

The maximum value/minimum value control section 53 in the same way as embodiment 3, in the order as shown in FIG. 19, performs a comparison to determine whether the index value (i, j) exceeds the maximum value (i, j) shown by the ith row and jth column of the maximum value table updated by the weighted coefficient 1*h* and performs a comparison to determine whether the index value (i, j) is less than the minimum value (i, j) shown by the ith row and jth column of the minimum value table updated by the weighted coefficient 1*h* in the same way. When an index value (i, j) exceeds the maximum value (i, j), the index value (i, j) is replaced by the maximum value (i, j) and when the an index value (i, j) is less than the minimum value (i, j), the index value (i, j) is replaced by the minimum value (i, j). Thus the value of encoded data is limited.

Other operations are the same as those described with reference to embodiment 3 and additional description will be omitted.

An actual example of the processing performed by the maximum value/minimum value control section 53 will be given below.

The situation is assumed that the encoded mode is inter, the color difference component and the weighted coefficient 1*h* is "0.8" (the quantization step size id is greater than or equal to 24), and the quantization index column 1*a* of the block unit is as shown in FIG. 20. In such a case, the generated maximum value table, and the minimum value table apply the value 0.8 to each coefficient for color difference and inter encoded mode in FIGS. 6(*c*) and (*d*) and the maximum value table and the minimum value table are as shown in FIGS. 16(*a*) and (*b*) described with reference to embodiment 2.

When the values of the maximum value table and minimum value table as shown in FIGS. 16(*a*), (*b*) are compared with each index value of the quantization index column 1*a* as shown in FIG. 20, the value (=−6) of the $8^{th}$ row $1^{st}$ column in FIG. 20 is less than the $8^{th}$ row $1^{st}$ column value (=−4) in the minimum value table shown in FIG. 16(*b*). Furthermore the value (=11) of the $2^{nd}$ row $6^{th}$ column and the value (=33) of the $1^{st}$ row $2^{nd}$ column in FIG. 20 is greater than the $2^{nd}$ row $6^{th}$ column (=8) and the $1^{st}$ row $2^{nd}$ column value (=32) in the maximum value table shown in FIG. 16(*a*).

Thus the quantization index column 1*a* output from the maximum value/minimum value control section 53 becomes the quantization index column 1*a* shown in FIG. 25 in which the index value of the $8^{th}$ row $1^{st}$ column becomes "−4" and the index value of the $2^{nd}$ row $6^{th}$ column becomes "8" of the values in the quantization index column 1*a* shown in FIG. 20.

As shown above with respect to embodiment 4, the image encoding device updates maximum values and minimum values which are threshold values corresponding to the 64 index values contained in a block. The values are updated by a quantization step size 1*d*. When an index value which is greater than an updated maximum value exists, or when an index value which is lower than an updated minimum value exists, the index value which is generated by the process of encoding is replaced using the respective threshold values. Thus if this process is combined with an image decoding device according to embodiment 2 or the like, it is possible to perform more effective detection of errors contained in encoded bit streams and to generate an encoded bit stream which can generate a decoded image with little influence of errors contained in the encoded bit stream.

Figure 26:
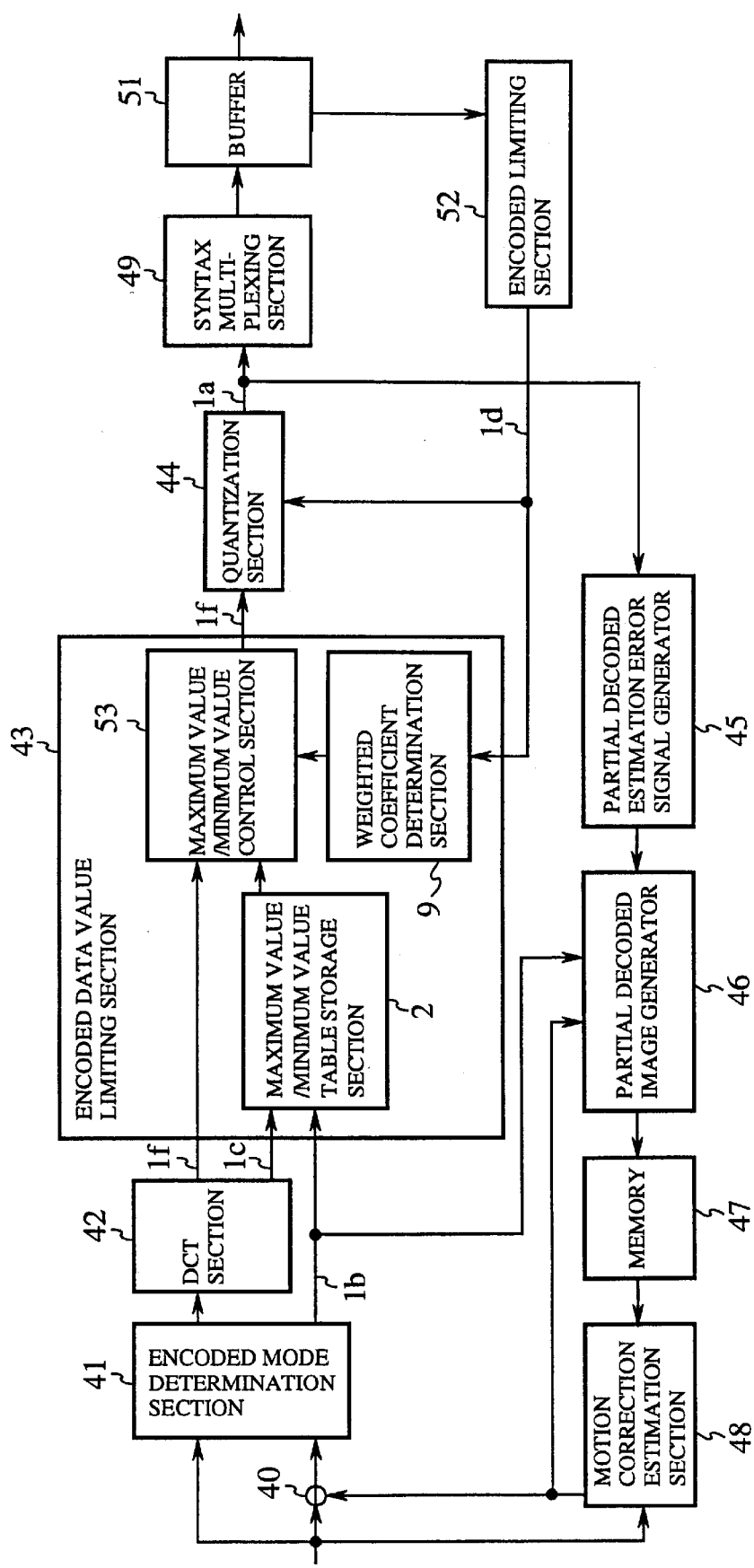
FIG. 26 is a block diagram showing another arrangement of an image encoding device according to a fourth embodiment of the present invention.

In embodiment 4, an image encoding device is comprised as shown in FIG. 24 and a quantization index column 1*a* of a block unit is input into the encoded data value control section 43. However as shown in FIG. 26, the DCT coefficient column 1*f* of the block unit output from the DCT section 42 may be input into the encoded data value limiting section 43.

In this case, the DCT coefficient column 1*f* of the block unit output from the DCT section 42 is input directly into the maximum value/minimum value control section 53 of the encoded data value limiting section 43. The maximum value/minimum value table storage section 2 has maximum value tables and minimum value tables as shown in FIGS. 12(*a*)–(*d*) and FIGS. 13(*a*)–(*d*).

The DCT coefficient column 1*f* of the block unit output from the maximum value/minimum value control section 53 is input to the quantization section 44. After a quantization process is performed in the quantization section 44, the quantization index column 1*a* is output to the syntax multiplexing section 49.

Embodiment 5

In embodiment 5, another arrangement of an error block detection section 4 shown in embodiment 1 is shown. That is to say, in embodiment 5, an example is given of an image decoding device which detects errors on a block unit which are generated in an encoded bit stream generated by H.263 video compression encoding. This is performed by the position of the last valid coefficient (a non-zero coefficient) when scanning an image signal list of a block unit in zigzag scanning order in an image signal list of a block unit in a frequency domain.

Figure 27:
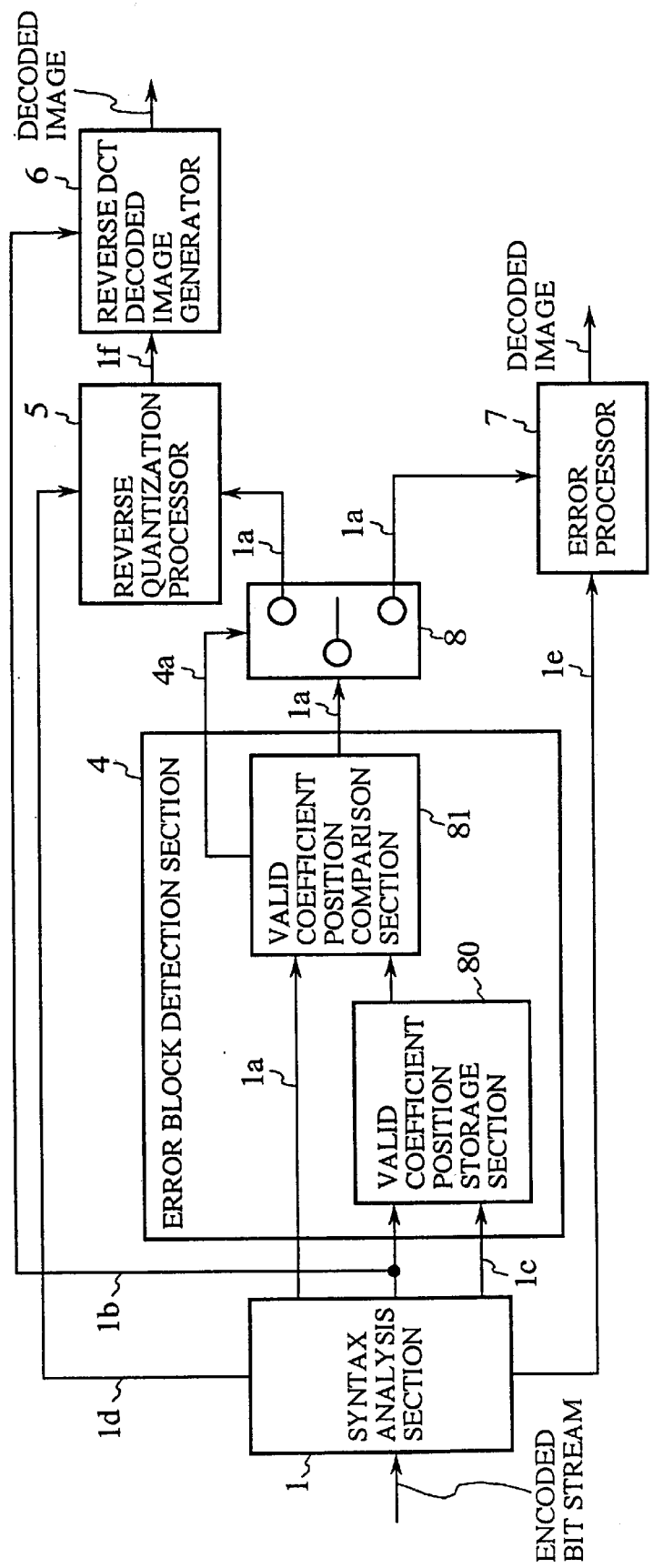
FIG. 27 is a block diagram showing an image decoding device according to a fifth embodiment of the present invention.

FIG. 27 is a block diagram of an image decoding device according to a fifth embodiment of the present invention. The structure of the image decoding device according to a fifth embodiment differs when compared with the structure of the image decoding device according to a first embodiment only in that an error block detection section (error block detection means) is provided. Thus the error block detection section 4 will be described below. In FIG. 27, 80 is a valid coefficient position storage section, 81 is a valid coefficient position comparison section.

The operation of the invention will be described below.

The encoded bit stream is input into the syntax analysis section 1 and analysis and decoding of image data and layer information such as the picture layer, GOB layer, macroblock layer is performed by H.263 syntax.

As a result, the quantization index column 1*a* of the obtained block unit (8 pixels×8 lines) is output to the valid coefficient position comparison section 81. The encoded mode (intra encoded mode/inter encoded mode) 1*b* is output to the valid coefficient position storage section 80 and the reverse DCT/decoding image generator 6. The block number 1c which is block position information is output to the valid coefficient position storage section 80. The quantization step size 1d is output to the reverse quantization processor 5.

At this time, an error syntax detection signal 1e is output to the error processor 7 when layer information or image data is analyzed which does not match the H.263 syntax.

The valid coefficient position storage section 80 as shown in FIG. 28 stores a threshold value (hereafter valid coefficient threshold value) which gives a range of frequencies of an image signal list in a frequency based on a signal component (color difference component/luminance component) and the encoded mode 1b. A corresponding valid coefficient threshold value is selected and output based on the signal component obtained from the block number 1c and the encoded mode of the block.

A threshold value which gives the range of frequencies of the image signal list in the frequency domain is precisely the value showing at what position the last existing valid coefficient is placed counted from the position of the coefficient of the linear flow component when the block is scanned with zigzag scanning order.

For example, when the encoded mode is inter, and the value of the block number 1c which is block position information is "5", the valid coefficient position storage section 80 selects the valid coefficient threshold value "21" for the color difference component and inter encoded mode based on the encoded mode 1b and the block number 1c and outputs the result to the valid coefficient position comparison section 81.

FIG. 29 is a flowchart of the process of the valid coefficient position comparison section 81.

Firstly the valid coefficient position comparison section 81 calculates a position (hereafter coef_loc) of the last valid coefficient existing in the highest frequency component in a quantization index column 1a of a block unit scanned in zigzag order (step ST21). The calculated coef_loc is then compared with a valid coefficient threshold value output from the valid coefficient position storage section 80 (step ST22).

When it is found that coef_loc is greater than the valid coefficient threshold value as a result of the comparison, (step ST22 "Yes"), a value "1" is output as an error block detection signal 4a (step ST23). On the other hand, in other cases, (step ST22 "No"), a value "0" is output as an error block detection signal 4a (step ST24).

An actual example of the process of the valid coefficient position comparison section 81 will be described below.

FIG. 30 shows an example of a quantization index column 1a for color difference and inter encoded mode. However the quantization index column 1a shown in FIG. 30 is considered to be decoded into the quantization index column 1a shown in FIG. 31 by the influence of an error contained in the encoded bit stream.

That is to say, in the encoded bit stream, the situation is assumed that after an encoding language showing the $5^{th}$ row and $1^{st}$ column index, the sequence "0001101010 . . ." (the quantization index column 1a shown in FIG. 30 analyzes this encoded bit stream) becomes the encoded bit stream "0000101010 . . ." (the quantization index column 1a shown in FIG. 31 analyzes this encoded bit stream) with an error generated in the $4^{th}$ bit.

In this case, the valid coefficient threshold value selected by the valid coefficient position storage section 80 is "21" for color difference and inter-encoded (refer to FIG. 28). On the other hand, the position of the last valid coefficient in the zigzag order in the quantization index column 1a block unit decoded by an encoded bit stream containing an error is the $4^{th}$ row $5^{th}$ column as shown in FIG. 31. This position is "32" which corresponds to the $32^{nd}$ value of FIG. 22.

Since the result of the comparison performed by the valid coefficient position comparison section 81 shows that the position "32" of the last valid coefficient in zigzag scanning order in the quantization index column 1a of the block unit decoded by; the encoded bit stream containing an error is greater than the valid coefficient threshold value "21", the value "1" is output to the switching section 8 as an error block detection signal 4a.

The switching section 8 outputs the quantization index column 1a of the block unit to the reverse quantization processor 5 when the error block detection signal 4a from the valid coefficient comparison section 81 has a value of "0". The switching section 8 outputs the quantization index column 1a of the block unit to the error processor 7 when the error block detection signal 4a has a value of "1".

Since other operations of the device are the same as those described with reference to embodiment 5, additional description will be omitted.

As shown above according to embodiment 5, the image decoding device has a valid coefficient threshold value which is a threshold value which defines a range of frequencies of an image signal column in a frequency domain. It is determined whether or not an error is contained in a bit stream of data to be decoded based on the valid coefficient threshold value and the position of the lasting existing valid coefficient existing in zigzag scanning order. Thus it is possible to perform rapid detection of an error block which matches a fixed syntax. It is also possible to generate a decoded image with little influence of errors contained in an encoded bit stream.

Figure 32:
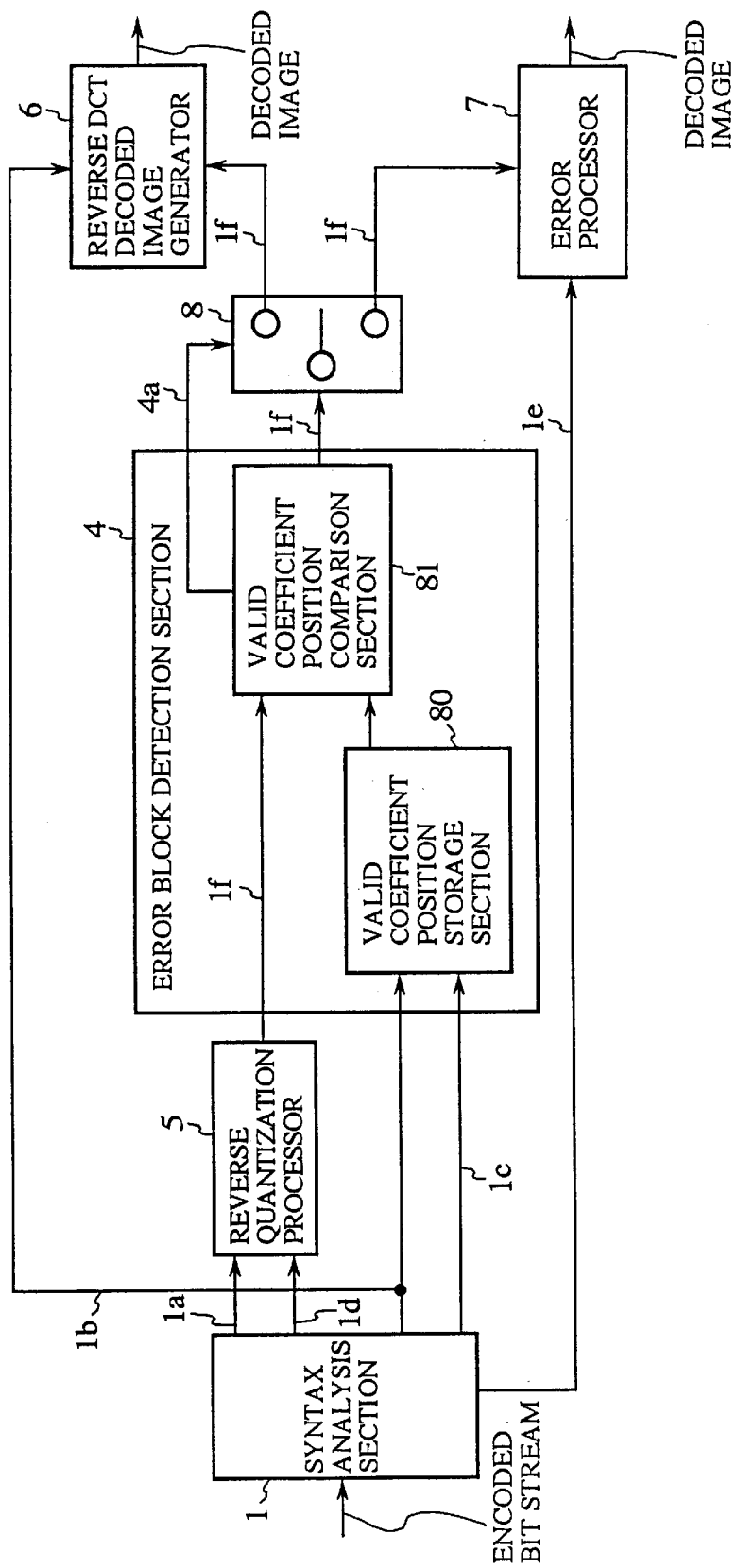
FIG. 32 is a block diagram showing another arrangement of an image decoding device according to a fifth embodiment of the present invention.

In embodiment 5, an image decoding device as shown in FIG. 27 was described. However the image decoding device may be comprised as shown in FIG. 32 and adapted so that the DCT coefficient column 1f of a block unit output from the reverse quantization processor 5 may be input into the error block detection section 4.

In this case, the quantization index column 1a of the block unit output from the syntax analysis section 1 is input into the reverse quantization processor 5 and after a reverse quantization process is performed in the reverse quantization processor 5, it is input into the valid coefficient comparison section 81 of the error block detection section 4.

Furthermore the DCT coefficient column 1f of the block unit is output by the switching section 8 to the reverse DCT/decoding image generator 6 when the error block detection signal 4a takes a value of "0" and is output to the error processor 7 when the error block detection signal 4a takes a value of "1".

Embodiment 6

Embodiment 6 comprises another arrangement of the error block detection section 4 shown with reference to embodiment 5. The error block detection section 4 in embodiment 6 converts a valid coefficient threshold value used in the error block detection section 4 of embodiment 5 by the quantization step size 1d and detects errors generated in an encoded bit stream generated by H.263 video compression encoding in a block unit. Detection is performed by the position of the last valid coefficient when scanning an image signal column of a block unit in a zigzag scanning order in an image signal column of a block unit in a frequency domain.

FIG. 33 is a block diagram of an image decoding device according to embodiment 6 of the present invention. The structure of the image decoding device according to embodiment 6 only differs from that described with reference to embodiment 5 as regards the error block detection section (error block detection means) 4. Thus the error block detection section 4 will be described. In FIG. 33, 9 is a weighted coefficient determination section provided in an error block detection section 4. 1h is a weighted coefficient.

The operation of the invention will be described below.

The encoded bit stream is input into the syntax analysis section 1 and analysis and decoding of the image data and each layer information of the picture layer, GOB layer, macroblock layer are performed according to H.263 syntax.

As a result, a quantization index column 1a of the obtained block unit (8 pixels×8 lines) is output to the valid coefficient position comparison section 81. An encoded mode 1b (intra encoded mode/inter encoded mode) is output to the valid coefficient position storage section 80 and the reverse DCT/decoding image generator 6. A block number 1c which represents block position information is output to the valid coefficient position storage section 80. A quantization step size 1d is output to the reverse quantization processor 5 and the weighted coefficient determination section 9.

At this time, when image data or layer information not matching H.263 syntax is analyzed, an error syntax detection signal 1e is output to the error processor 7 to that effect.

The weighted coefficient determination section 9 has a corresponding table of quantization step size 1d and weighted coefficients 1h as shown in FIG. 34. A weighted coefficient 1h corresponding to a quantization step size 1d used in reverse quantization processing of a block is determined using the table. The determined weighted coefficient 1h is output to the valid coefficient position comparison section 81.

For example, if the quantization step size 1d is less than "8", the weighted coefficient 1h is determined and output as the value "1.1". If the quantization step size 1d is greater than or equal to "8" and less than "16", the weighted coefficient 1h is determined and output as the value "1.0". If the quantization step size 1d is greater than or equal to 16 and less than "24", the weighted coefficient 1h is determined and output as the value "0.9". If the quantization step size 1d is greater than or equal to "24", the weighted coefficient 1h is determined and output as the value "0.8".

The valid coefficient position comparison section 81 calculates the multiple of a valid coefficient threshold value selected and output from the valid coefficient position storage section 80 and a weighted coefficient 1h from the weighted coefficient determination section 9.

FIG. 35 shows an example of a valid coefficient threshold value updated and generated using a valid coefficient threshold value and a weighted coefficient 1h in the valid coefficient position comparison section 81 of embodiment 6. Values of the valid coefficient threshold value when the quantization step size is greater than or equal to "8" and less than "16" (weighted coefficient 1h is "1.0") are used as values shown in FIG. 28 described with respect to embodiment 5.

The valid coefficient position comparison section 81 calculates a position (hereafter coef_loc) of the last valid coefficient existing in a quantization index column 1a of a block unit scanned in zigzag order. The calculated coef_loc is then compared with a valid coefficient threshold value corrected by a weighted coefficient 1h.

When it is found that coef loc is greater than the valid coefficient threshold value corrected by the weighted coefficient 1h as a result of the comparison, the valid coefficient position comparison section 81 outputs a value "1" to the switching section 8 as an error block detection signal 4a. On the other hand, in other cases, a value "0" is output as an error block detection signal 4a to the switching section 8.

The switching section 8 outputs the quantization index column 1a of the block unit to the reverse quantization processor 5 when the error block detection signal 4a has a value of "0". The switching section 8 outputs the quantization index column 1a of the block unit to the error processor 7 when the error block detection signal 4a has a value of "1".

Since other operations of the device are the same as those described with reference to embodiment 5, additional description will be omitted.

As shown above according to embodiment 6, the image decoding device varies a valid coefficient threshold value with a quantization step size 1d. In the quantization step size 1d of the unit block, it is determined whether or not an error is contained in a bit stream of data to be decoded by use of the valid coefficient threshold value varied by the quantization step size 1d and the position of the last calculated valid coefficient existing in a zigzag scanning sequence. Thus it is possible to perform rapid detection of an error block which matches a fixed syntax in comparison with the invention as described in embodiment 5. It is also possible to generate a decoded image with little influence of errors contained in an encoded bit stream.

Figure 36:
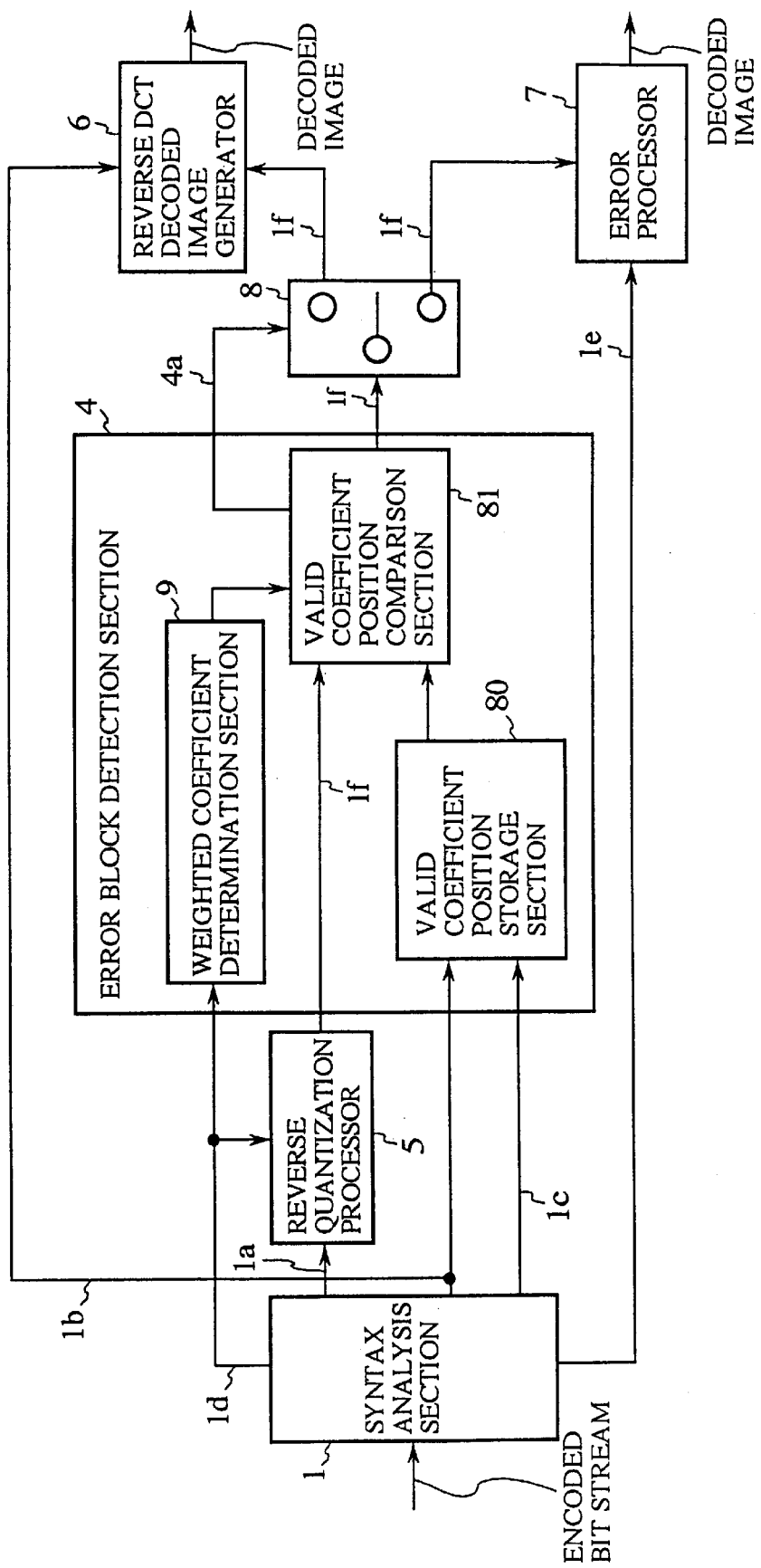
FIG. 36 is a block diagram showing another arrangement of an image decoding device according to a sixth embodiment of the present invention.

In embodiment 6, an image decoding device as shown in FIG. 33 was described. However the image decoding device may be comprised as shown in FIG. 36 and adapted so that the DCT coefficient column 1f of a block unit output from the reverse quantization processor 5 may be input into the error block detection section 4.

In this case, the quantization index column 1a of the block unit output from the syntax analysis section 1 is such that the DCT coefficient column 1f of the block unit is input into the valid coefficient comparison section 81 after a reverse quantization process is performed in the reverse quantization processor 5.

Furthermore the DCT coefficient column 1f of the block unit is output by the switching section 8 to the reverse DCT/decoding image generator 6 when the error block detection signal 4a takes a value of "0" and is output to the error processor 7 when the error block detection signal 4a takes a value of "1".

Embodiment 7

Embodiment 7 comprises another arrangement of the encoded data value limiting section 43 shown with reference to embodiment 3. The encoded data value limiting section 43 in embodiment 7 pre-sets a valid coefficient value and, with respect to coefficients contained in image signal columns in block units in frequency domains, replaces valid coefficients existing in a band exceeding the valid coefficient value in zigzag scanning order with an invalid coefficient (a coefficient with a non-zero value). Thus it is possible to generate an encoded bit stream which allows rapid detection of errors in the image decoding device.

Figure 37:
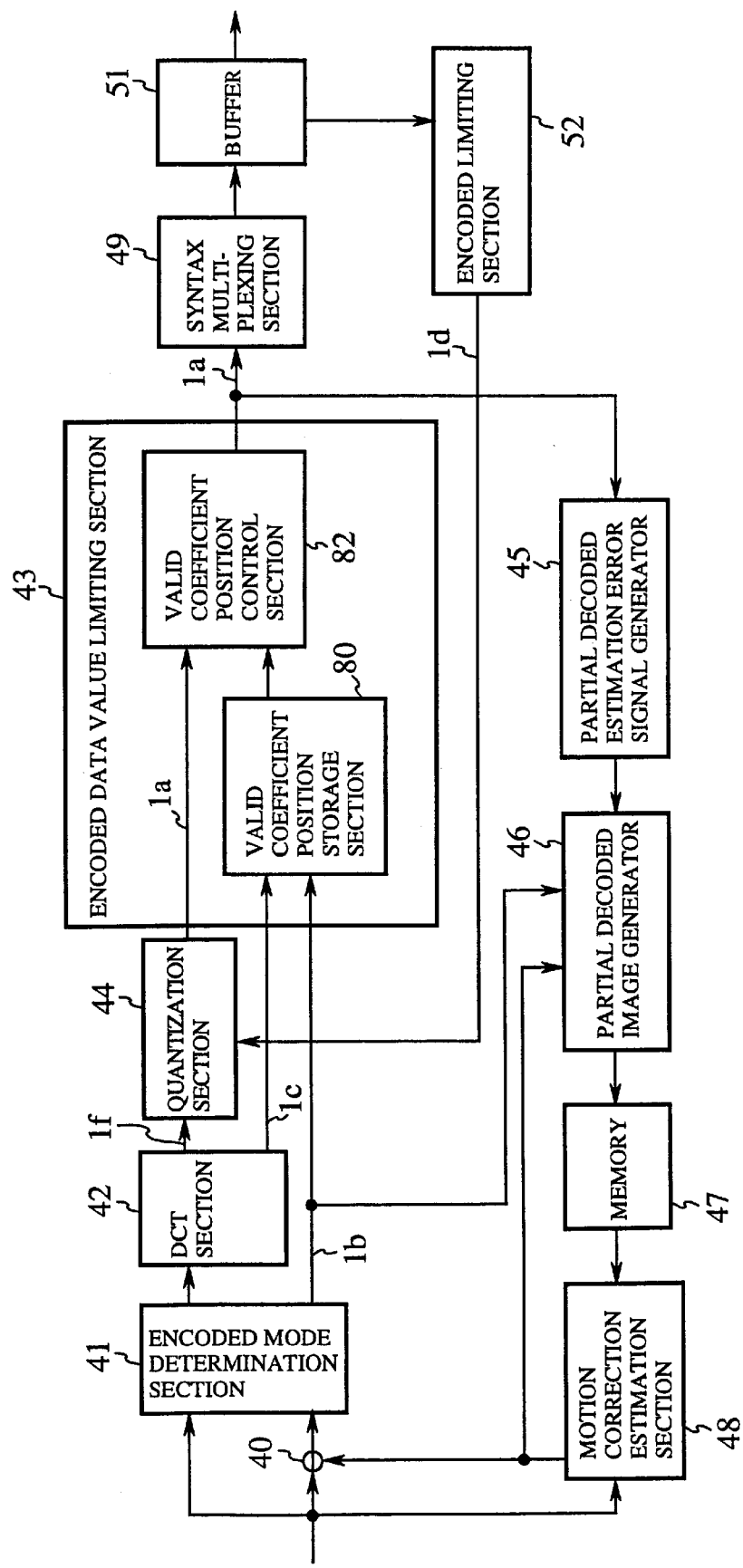
FIG. 37 is a block diagram showing an image encoding device according to a seventh embodiment of the present invention.

FIG. 37 is a block diagram of an image encoding device according to embodiment 7 of the present invention. The structure of the image decoding device according to embodiment 7 only differs from that described with reference to embodiment 3 in FIG. 18 as regards the encoded data value limiting section 43 (encoded data value limiting means). Thus the encoded data value limiting section 43 will be described. In FIG. 37, 80 is a valid coefficient position storage section and 82 is a valid coefficient position control section.

The operation of the invention will be described below.

A valid coefficient threshold value is pre-set and stored in the valid coefficient position storage section 80 based on the signal component (luminance component/color difference component) and the encoded mode 1b shown in FIG. 28 with respect to embodiment 5. A respective valid coefficient threshold value is selected by the signal component obtained by the block number 1c and the encoded mode 1b of the block.

For example, when the block number 1c which represents position information of the block takes the value "5" and the encoded mode 1b is inter, the valid coefficient position storage section 80 selects the valid coefficient threshold value "21" for inter-encoded and color difference. The selected valid coefficient threshold value "21" is output to the valid coefficient position control section 82.

Figures 38, 39, 40:
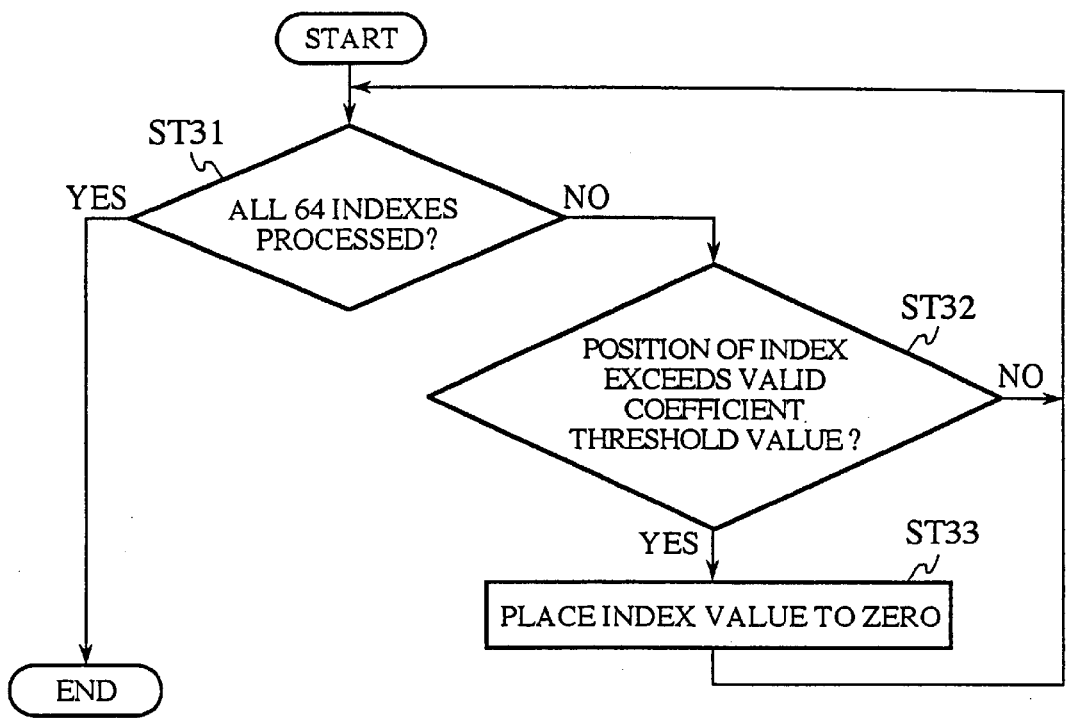
FIG. 38 shows a flowchart of the processing of a valid coefficient position control section shown in embodiment 7 of the present invention.
FIG. 39 shows an actual example of a quantization index column in order to describe the operation of a valid coefficient position control section in a seventh embodiment of the present invention.
FIG. 40 shows a quantization index column output by the valid coefficient position control section according to a seventh embodiment of the present invention.

FIG. 38 shows the processing performed by the valid coefficient position control section 82.

The valid coefficient position control section 82 scans the index contained in the quantization index column 1a in zigzag order. When the scanned index position exceeds the position shown by the valid coefficient threshold value (step ST31 "No", step ST32 "Yes"), the index value is made to take the value of zero (step ST33). In other cases, the process is terminated in this state.

The quantization index column 1a of the block unit is output to the partial decoding estimation error signal generator 45 and the index multiplexing section 49.

An actual example of processing by the valid coefficient position control section 82 will be given below.

For example, it is assumed that the quantization index column 1a shown in FIG. 39 is input into the valid coefficient position control section 82 and the valid coefficient threshold value has the value of "21". In this case, a valid coefficient exists at the $2^{nd}$, $3^{rd}$ and $23^{rd}$ position counting in zigzag scanning order on the quantization index column 1a shown in FIG. 39. Since the assumed valid coefficient threshold value has the value "21", the index existing at a position which exceeds the valid coefficient threshold value "21" is replaced with the value zero. That is to say, the index value existing at a $23^{rd}$ position on the quantization index column 1a shown in FIG. 39 takes the value zero. Thus the quantization index column 1a output by the valid coefficient position control section 82 is as shown in FIG. 40.

Since other operations of the device are the same as those described with reference to embodiment 3, additional description will be omitted.

As shown above according to embodiment 7, the image encoding device has a threshold value defining the range of frequencies of an image signal list in a frequency domain. When a valid coefficient exists in a band exceeding the threshold value in zigzag scanning order, the value of the valid coefficient generated by the process of encoding is replaced by the value zero. Thus it is possible to perform more effective detection of errors generated in a transmission pathway contained in an encoded bit stream in the image encoding device by combining the above feature with the image decoding device shown with respect to embodiment 5. Furthermore it is possible to generate an encoded bit stream which allows generation of a decoded image with little influence of errors contained in the encoded bit stream.

Figure 41:
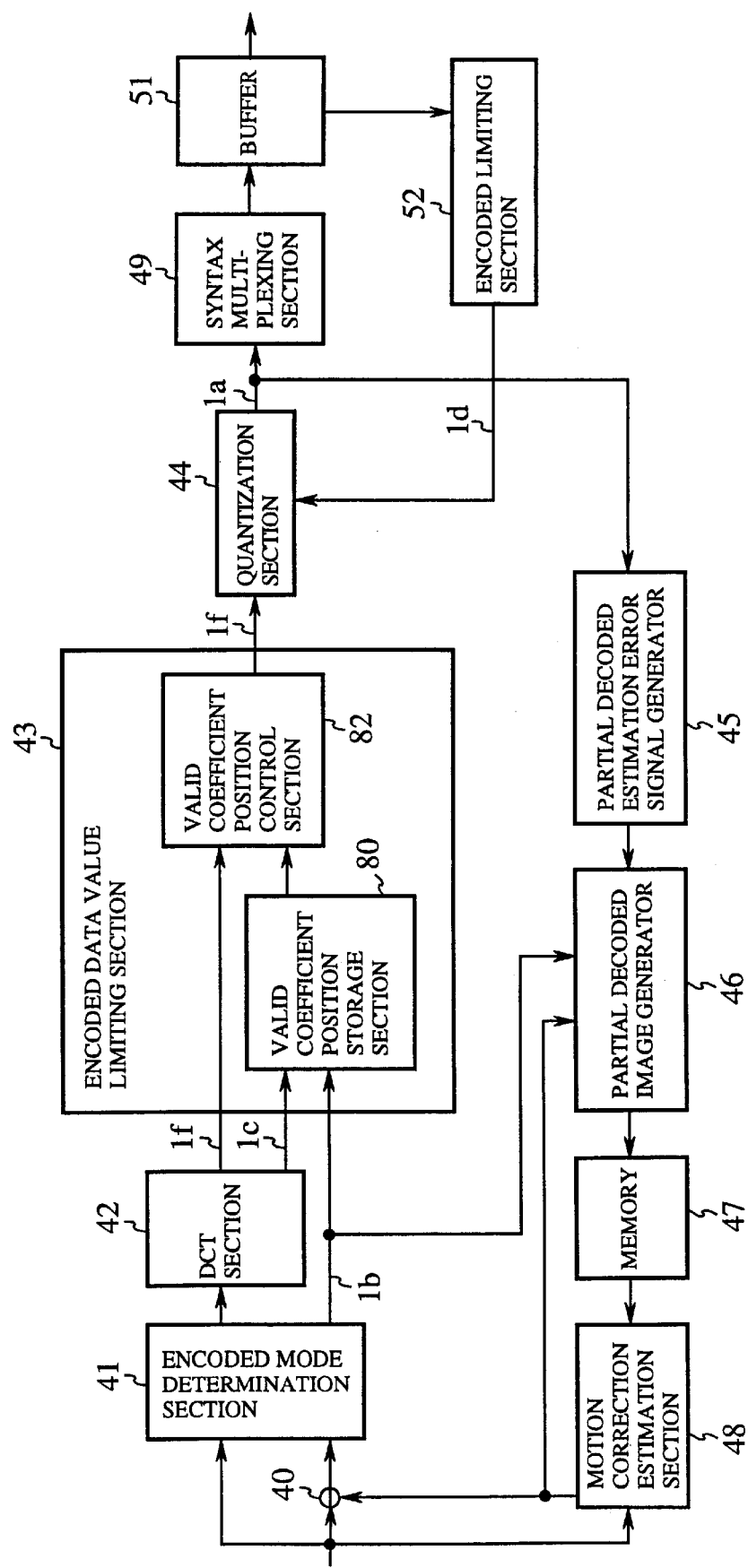
FIG. 41 is a block diagram showing another arrangement of an image encoding device according to a seventh embodiment of the present invention.

In embodiment 7, an image encoding device as shown in FIG. 37 was described in which a quantization bit stream column 1a of a block unit is input into an encoded data value limiting section 43. However the image encoding device may be comprised as shown in FIG. 41 and adapted so that the DCT coefficient column 1f of a block unit may be input into the encoded data value limiting section 43. In this case, the DCT coefficient column 1f of the block unit output from the DCT section 42 is input into the valid coefficient control section 82. The DCT coefficient column 1f of the block unit output from the valid coefficient position control section 82 is output to the quantization section 44.

Embodiment 8

Embodiment 8 comprises another arrangement of the encoded data value limiting section 43 shown with reference to embodiment 7. That is to say, in embodiment 8, a pre-set valid coefficient value is varied by a quantization step size 1d. With respect to coefficients contained in image signal columns in block units in a frequency domain, valid coefficients existing in a band exceeding the valid coefficient value in zigzag scanning order are replaced with an invalid coefficient (a coefficient with a non-zero value). Thus it is possible to generate an encoded bit stream which allows rapid detection of errors in the image decoding device.

Figure 42:
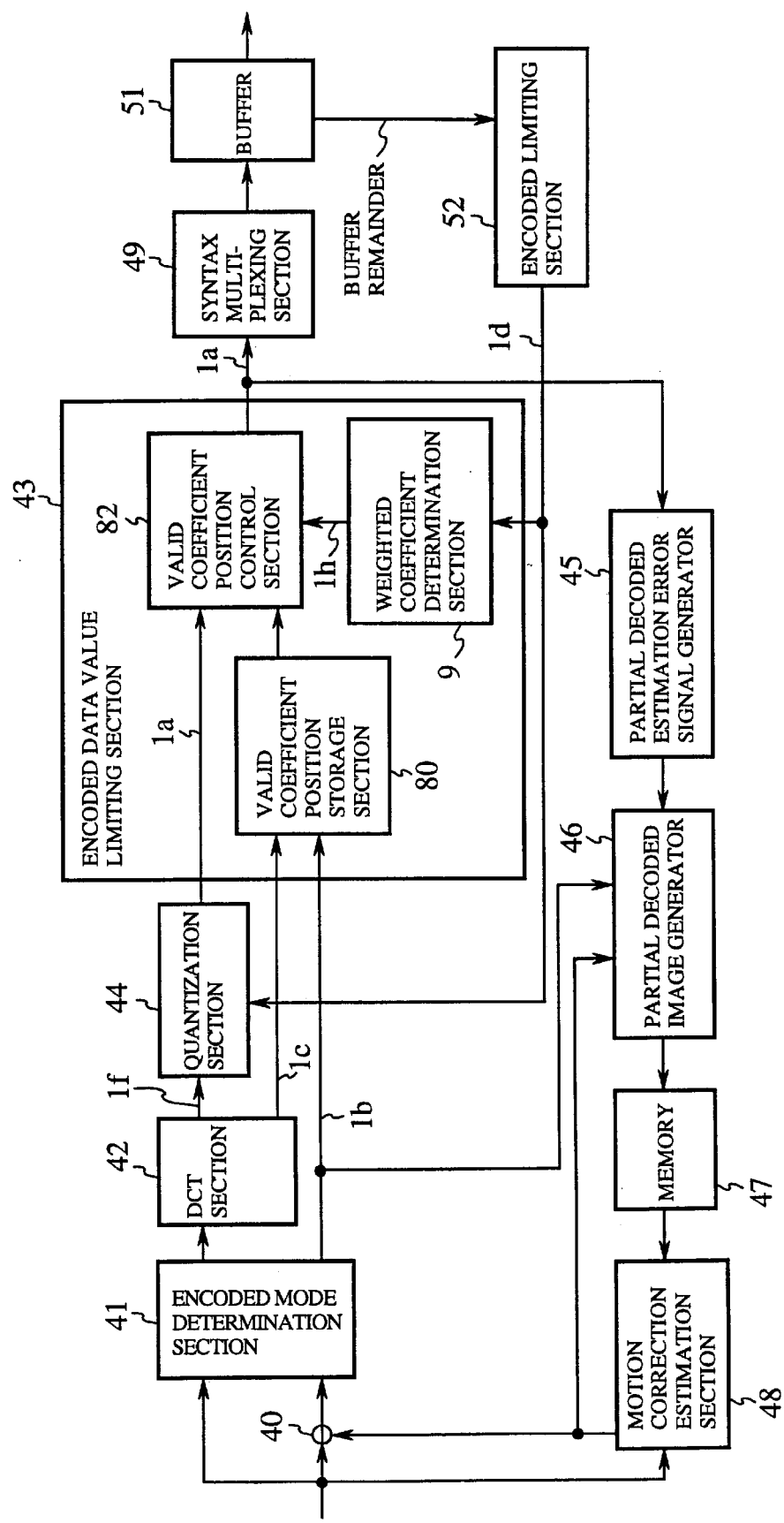
FIG. 42 is a block diagram showing an image encoding device according to an eighth embodiment of the present invention.

FIG. 42 is a block diagram of an image encoding device according to embodiment 8 of the present invention. The structure of the image encoding device according to embodiment 8 only differs from that described with reference to embodiment 7 in FIG. 37 as regards the encoded data value limiting section 43 (encoded data value limiting means). Thus the encoded data value limiting section 43 will be described below. In FIG. 42, 9 is a weighted coefficient determination section provided in the encoded data value limiting section 43 and 1h is a weighted coefficient.

The operation of the invention will be described below.

Control of the quantization step size 1d is performed in the encoded control section 52 based on a buffer remainder and the updated quantization step size 1d is output to the quantization section 44 and the weighted coefficient determination section 9.

As described with reference to embodiment 6, the weighted coefficient determination section 9 has a table of quantization step size 1d and weighted coefficients 1h as shown in FIG. 34. A weighted coefficient 1h corresponding to a quantization step size 1d used in reverse quantization processing of the block is determined using the table. The determined weighted coefficient 1h is output to the valid coefficient position control section 82.

For example, if the quantization step size 1d is less than "8", the weighted coefficient 1h is determined and output as the value "1.1". If the quantization step size 1d is greater than or equal to "8" and less than "16", the weighted coefficient 1h is determined and output as the value "1.0". If the quantization step size 1d is greater than or equal to "16" and less than "24", the weighted coefficient 1h is determined and output as the value "0.9". If the quantization step size 1d is greater than or equal to "24", the weighted coefficient 1h is determined and output as the value "0.8".

The valid coefficient position control section 82 calculates a multiple of a valid coefficient threshold value selected and output from the valid coefficient position storage section 80 and a weighted coefficient $1h$ and generates an updated valid coefficient threshold value. The updated valid coefficient threshold value generated using the weighted coefficient $1h$ and valid coefficient threshold value is as shown in FIG. 35 with respect to embodiment 6.

The valid coefficient position control section 82 scans an index contained in a quantization index column $1a$ in zigzag order. When the position of the scanned index is greater than the position shown for the updated valid coefficient threshold value, the index value is reset to the value zero and is output to the partial decoding estimation error signal generator 45 and the syntax multiplexing section 49.

Since other operations of the device are the same as those described with reference to embodiment 7, additional description will be omitted.

As shown above according to embodiment 8, the image encoding device has a threshold value which shows the position of the last valid coefficient in zigzag scanning order. The threshold value is updated by the quantization step size $1d$ and when a valid coefficient exists in a band which exceeds the updated threshold value in zigzag scanning order, the valid coefficient generated by the process of encoding is replaced by a value of zero. Thus it is possible to perform rapid detection of an error generated in a transmission pathway contained in an encoded bit stream in the image decoding device when combined with the image decoding device as shown with reference to embodiment 6. It is also possible to generate an encoded image which allows the generation of a decoded image with little influence of errors contained in an encoded bit stream.

Figure 43:
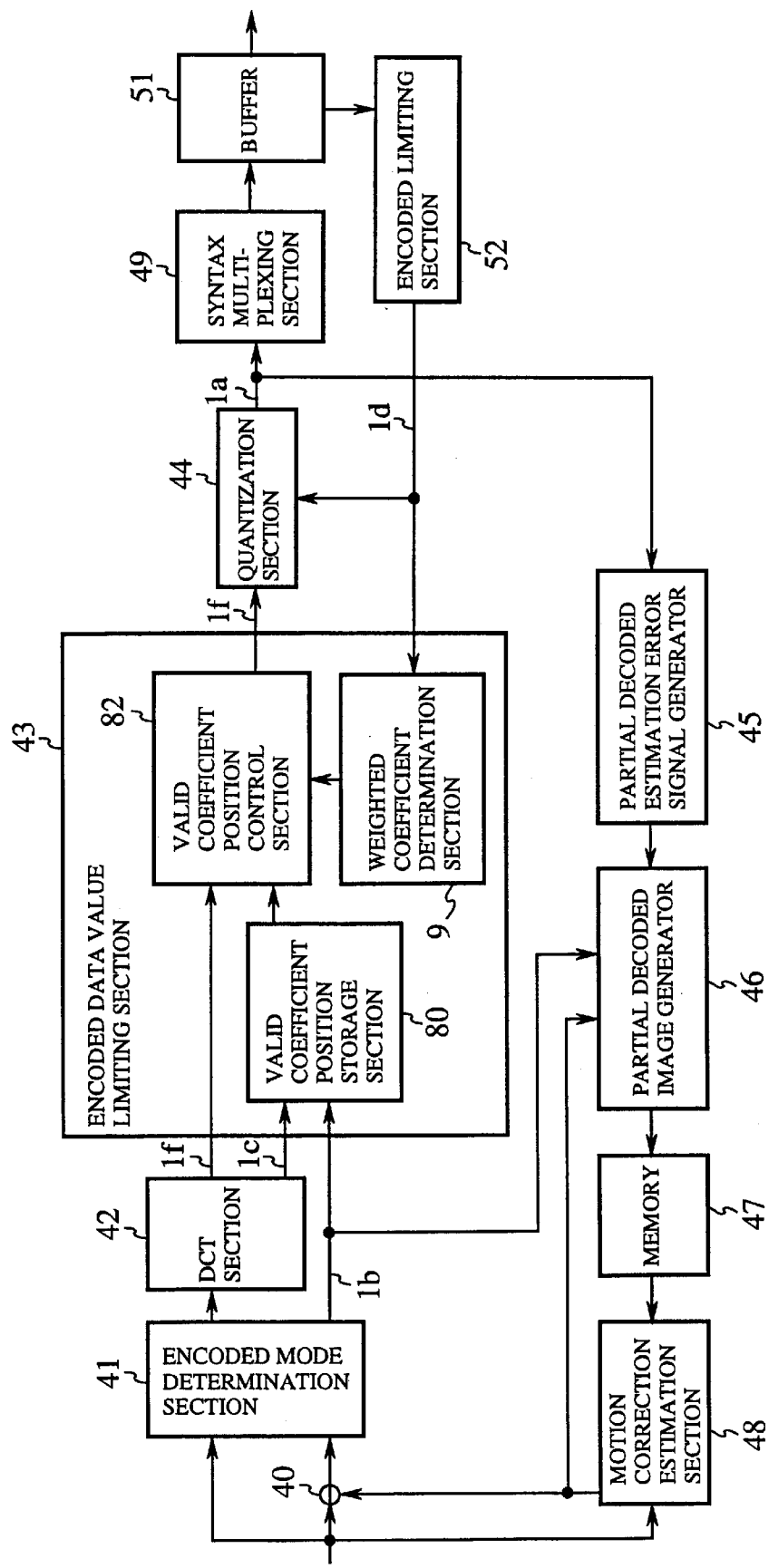
FIG. 43 is a block diagram showing another arrangement of an image encoding device according to an eighth embodiment of the present invention.

In embodiment 8, an image encoding device as shown in FIG. 42 was described in which a quantization bit stream $1a$ of the block unit is input into the encoded data value limiting section 43. However the image encoding device may be comprised as shown in FIG. 43 and adapted so that the DCT coefficient column $1f$ of a block unit may be input into the encoded data value limiting section 43.

In this case, the DCT coefficient column $1f$ of the block unit output from the valid coefficient position control section 82 is output to the quantization section 44.

Embodiment 9

Embodiment 9 comprises another arrangement of the image decoding device according to embodiment 1, embodiment 2, embodiment 5 and embodiment 6. That is to say, in embodiment 9, error detection taking a block as a unit is performed based on a threshold value and an image signal in a frequency domain. Error detection using a block column (in embodiment 9, it is assumed that GOB is an example of a unity containing at least one or more blocks) based on a threshold value which is different from the threshold value above and an error detection state taking the obtained block as a unit. Then it is determined whether or not the error is contained in the GOB.

Figure 44:
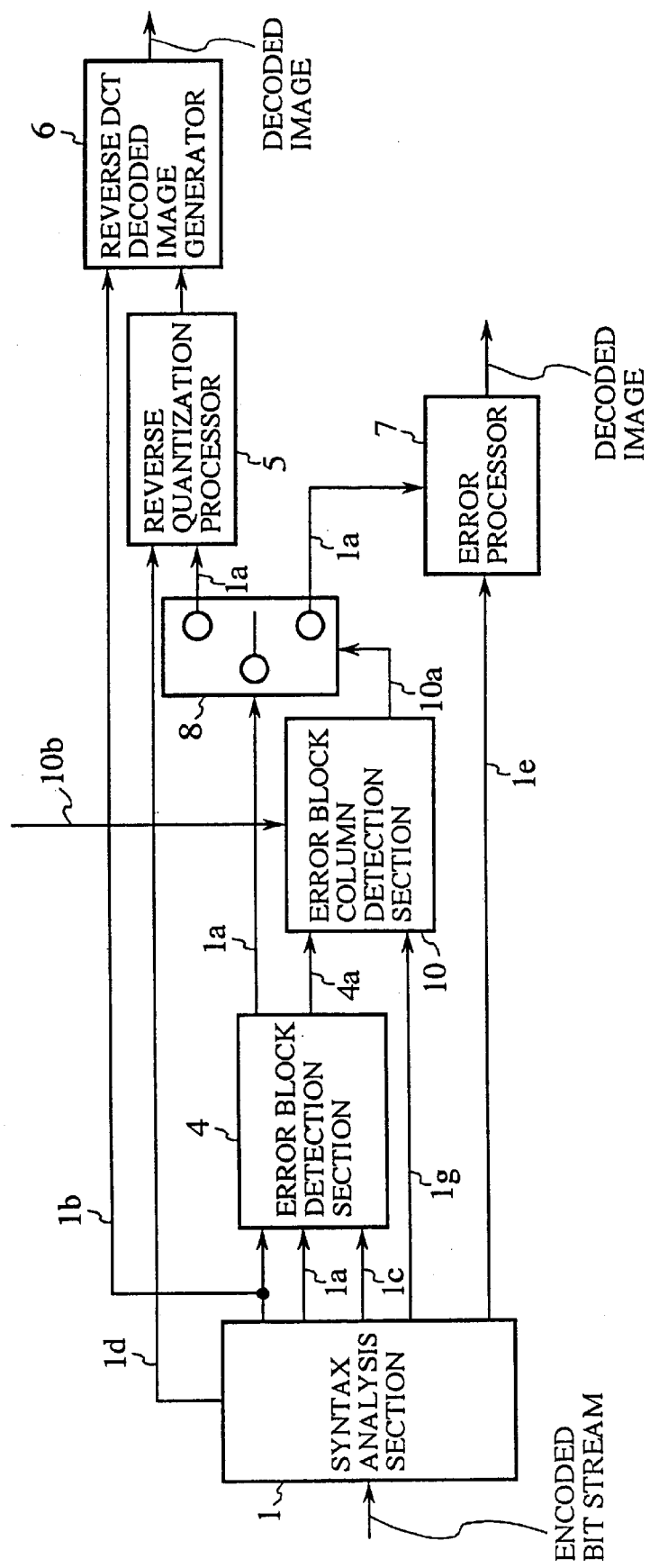
FIG. 44 is a block diagram showing an image decoding device according to a ninth embodiment of the present invention.

FIG. 44 is a block diagram of an image decoding device according to a first embodiment of the present invention. In the figure, reference numeral 10 is an error block column detection section (block column detection means), $10a$ is an error block column detection section, and $10b$ is an error determination threshold value. Other components have been described above and are denoted by the same reference numerals and thus additional description will be omitted.

The error block detection section (error block detection means) 4 may be comprised by the error block detection section 4 as shown with reference to any of embodiment 1, embodiment 2, embodiment 5 and embodiment 6.

The operation of the invention will be described below.

An encoded bit stream is input into a syntax analysis section 1 and analysis and decoding of the image data and all layer information such as picture layer, GOB layer, and macroblock layer is performed by H.263 syntax.

As a result, the quantization index column $1a$ of the obtained block unit (8 pixels×8 lines), an encoded mode (intra encoded mode/inter encoded mode) $1b$ and a block number $1c$ which represents block position information are output to the error block detection section 4. A quantization step size $1d$ is output to the reverse quantization processor 5 and the encoded mode $1b$ is output to the reverse DCT/decoding image generator 6.

At this time, when image data or layer information not matching H.263 syntax is analyzed, an error syntax detection signal $1e$ is output to the error processor 7 to that effect.

In embodiment 9, the GOB number $1g$ which shows block column units is output to the error block column detection section 10 by the syntax analysis section 1.

Figure 45:
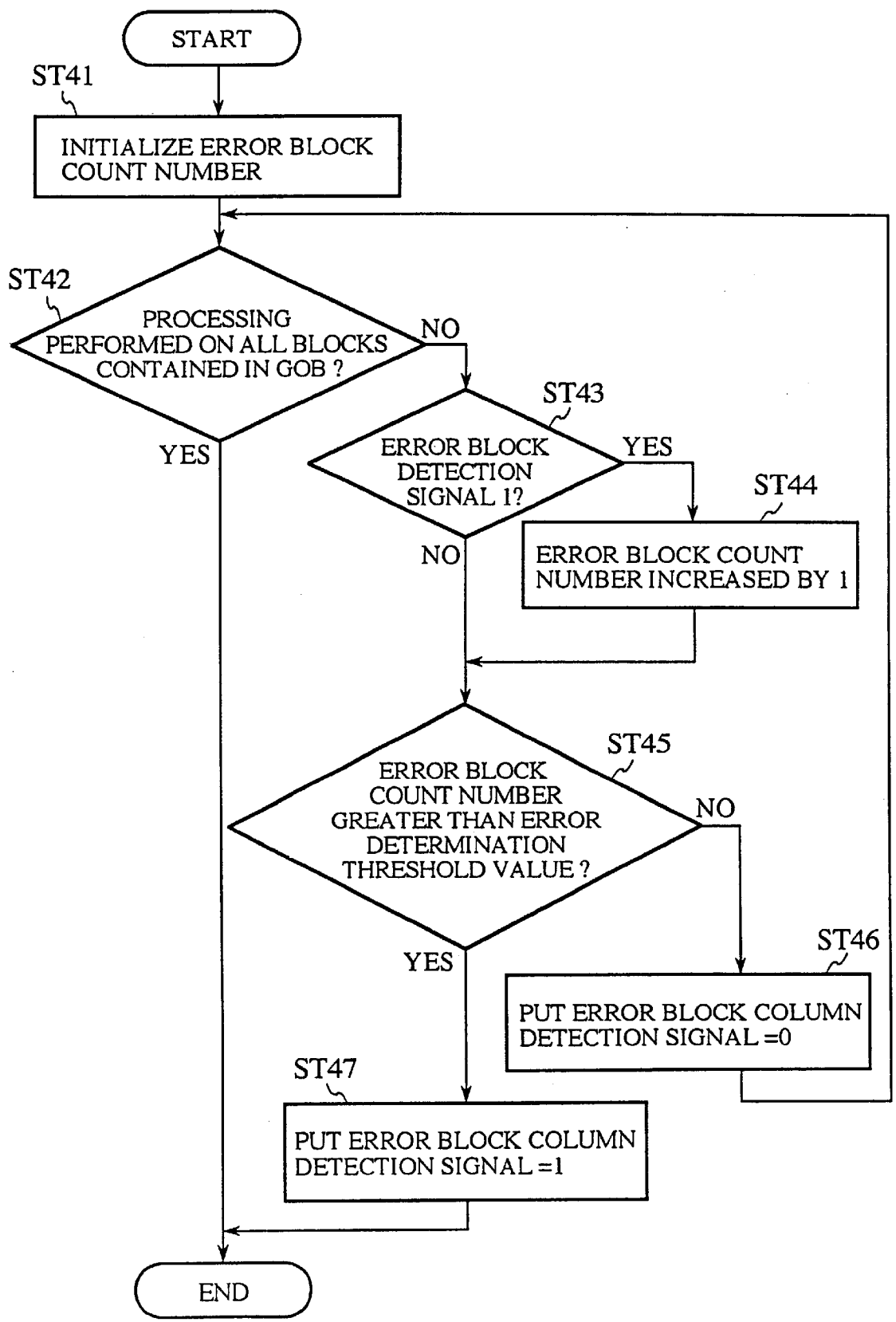
FIG. 45 shows a flowchart of the processing of an error block column detection section shown in embodiment 9 of the present invention.

FIG. 45 is a flowchart showing the processing performed in the error block column detection section 10.

Firstly the error block column detection section 10 determines whether or not a block is a block contained at the GOB header based on the GOB number $1g$ input from the syntax analysis section 1. When the determination is performed, the error block count number is initialized (step ST41).

The determination is performed as to whether the input error block detection signal $4a$ is "1" (step ST42 "No", step ST43) and only when it is determined that the value is "1" (step ST43 "Yes"), the error block count number is incremented by 1 (step ST44). Thus when the error block detection signal $4a$ is "0" (step ST43 "No"), the error block count number is not incremented by step ST44.

Next the comparison of the error block count number and the externally set error determination threshold value $10b$ is performed (step ST45). As a result of the comparison, when the error block count number is less than or equal to the error determination threshold value $10b$ (step ST45 "No"), the value "0" is output to the switching section 8 as an error block column detection signal $10a$ (step ST46). On the other hand, when the error block count number is greater than the error determination threshold value $10b$ (step ST45 "Yes"), the value "1" is output to the switching section 8 as an error block column detection signal $10a$ (step ST47).

The above process (step ST42~step ST 47) is performed with respect to all blocks contained in the GOB while referring to the GOB number $1g$ input from the syntax analysis section 1. When all blocks contained in the GOB have been processed (step ST42 "Yes"), the above process is terminated.

The switching section 8 outputs a quantization index column $1a$ of block unit to the reverse quantization processor 5 when the error block column detection signal $10a$ is "0". On the other hand, when the error block column detection signal is "1", the switching section 8 outputs a quantization index column $1a$ of the block unit to the error processor 7.

Since other operations of the present embodiment are the same as those described with reference to embodiments 1, 2, 5 and 6, additional description will be omitted.

Thus according to embodiment 9, the determination as to whether errors are contained in an encoded bit stream which is to be decoded is performed twice in an error block column detection section 10 and an error block detection section 4 of the image decoding device. Thus it is possible to suppress the possibility that error determination is performed which determines that errors are contained in blocks which actually do not contain errors. It is also possible to generate a decoded image with little influence of errors contained in encoded bit streams.

Figure 46:
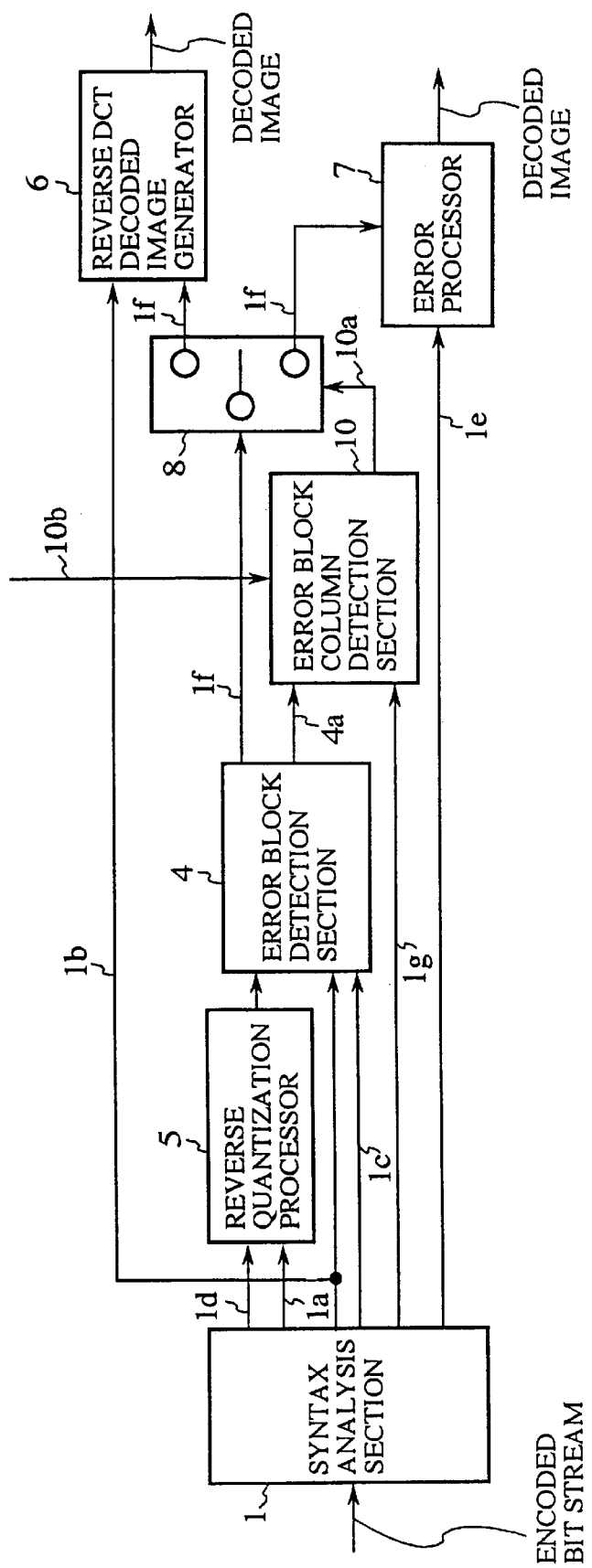
FIG. 46 is a block diagram showing another arrangement of an image encoding device according to a ninth embodiment of the present invention.

In embodiment 9, the image decoding device was comprised as shown in FIG. 44. However the device may be comprised as shown in FIG. 46 and adapted so that the DCT coefficient column $1f$ of a block unit on which a reverse quantization process is performed in the reverse quantization processor 5 may be input into the error block detection section 4.

Embodiment 10

In embodiment 10, another arrangement of the syntax multiplexing section 49 shown in embodiment 4 or embodiment 8 is shown. That is to say, in embodiment 10, an example is given of an image encoding device which generates an encoded bit stream which allows the rapid detection of errors contained in an encoded bit stream in an image decoding device by multiplexing a weighted coefficient $1h$ used in an encoded data value limiting section 43 into an encoded bit stream as header information.

Figure 47:
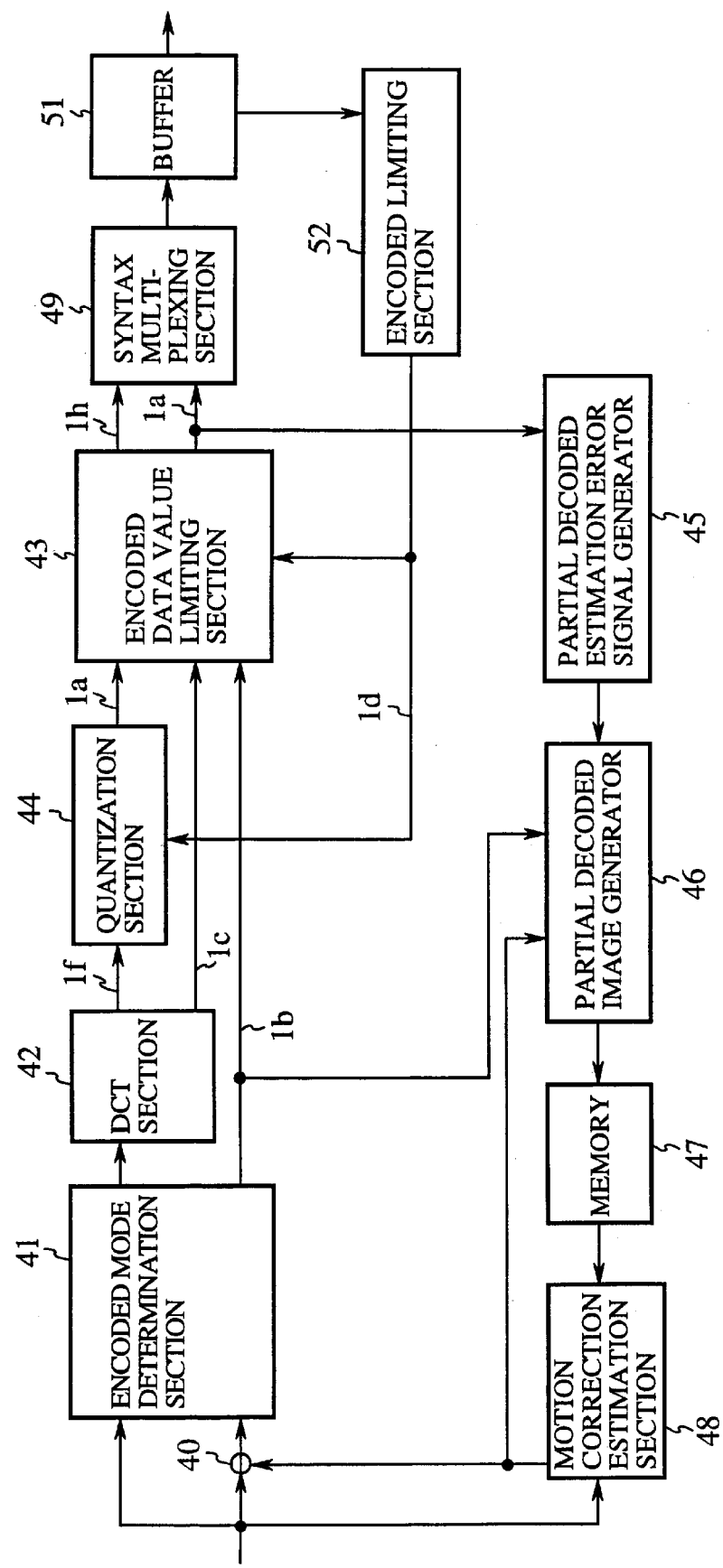
FIG. 47 is a block diagram showing an image encoding device according to a tenth embodiment of the present invention.

FIG. 47 is a block diagram of an image encoding device according to a tenth embodiment of the present invention. As shown in FIG. 47, all components of the image encoding device according to embodiment 10 are the same as those components as shown in embodiment 4 in FIG. 24 or embodiment 8 in FIG. 42 and are designated by the same numerals. Thus additional description will be omitted.

Figure 48:
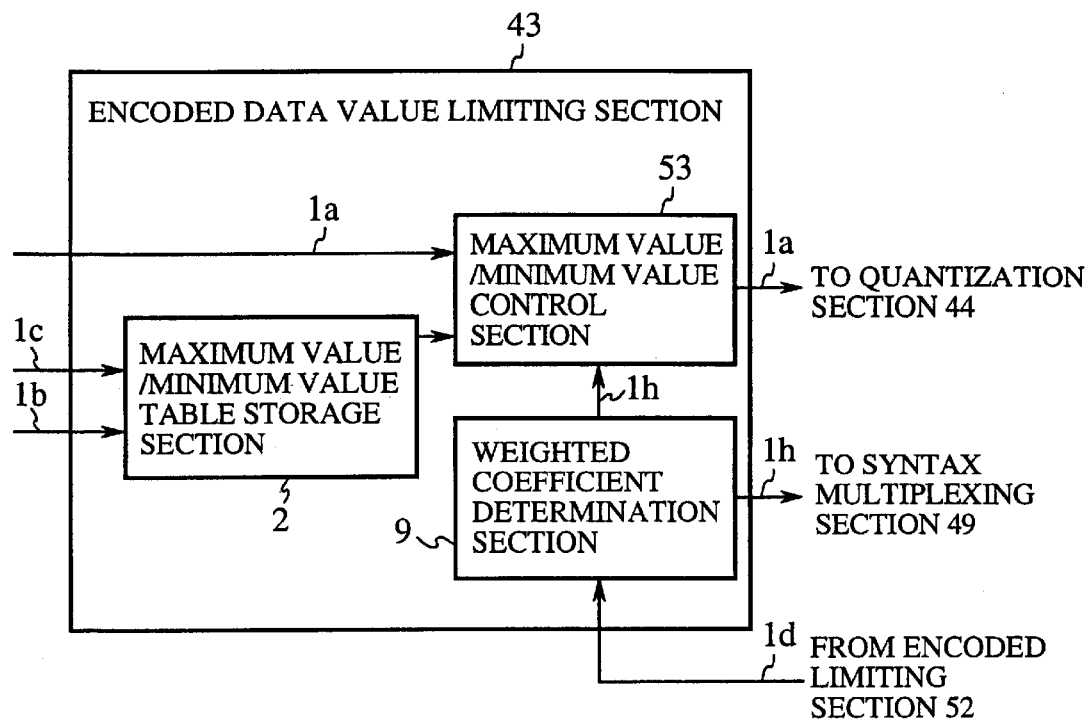
FIG. 48 is a block diagram showing an encoded data value limiting section according to a tenth embodiment of the present invention.
Figure 49:
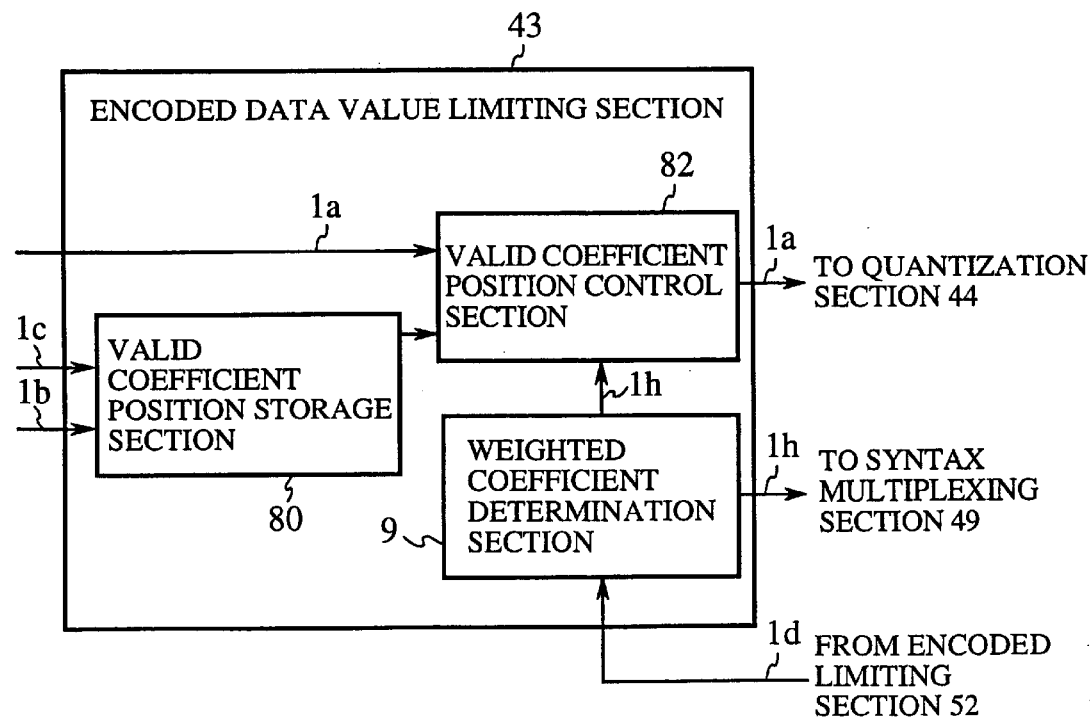
FIG. 49 is a block diagram showing another arrangement of an encoded data value limiting section according to a tenth embodiment of the present invention.

The encoded data value limiting section 43 in FIG. 47 may be comprised as shown in FIG. 48 for example, in the same way as the encoded data value limiting section 43 of the image encoding device in embodiment 4 in FIG. 24 or FIG. 26. Otherwise it may be comprised as shown in FIG. 49 for example, in the same way as the encoded data value limiting section 43 of the image encoding device in embodiment 8 in FIG. 42 or FIG. 43.

However in embodiment 10, the weighted coefficient $1h$ is determined in the same way as embodiment 4 or embodiment 8 in the weighted coefficient determination section 9 of the encoded data value limiting section 43. The determined weighted coefficient $1h$ is output not only to the valid coefficient position control section 82 and the maximum value/minimum value control section 53 but also to the syntax multiplexing section (multiplexing means) 49.

The operation of the syntax multiplexing section 49 will be described below.

FIG. 50 is a block diagram of a syntax multiplexing section 49 and describes the situation in which an encoding language for a weighted coefficient $1h$ is multiplexed by the picture layer multiplexing section. In FIG. 50, 60 is a picture layer multiplexing section, 61 is a GOB layer multiplexing section, 62 is a macroblock layer multiplexing section and 63 block data multiplexing section.

The operation of the invention will be described below.

Multiplexing of a picture layer code (PSC) which shows the start of picture layer information is performed by the picture layer multiplexing section 60. Thereafter the encoding language which corresponds to the weighted coefficient $1h$ input from the weighted coefficient determination section 9 of the encoded data value limiting section 43 and the picture layer information are multiplexed.

FIG. 51 shows the relationship of weighted coefficient $1h$ and the encoded language which corresponds to each weighted coefficient $1h$ in embodiment 10. For example, if the weighted coefficient $1h$ has a value of "0.8", the value "110" is multiplexed as an encoded language. If the weighted coefficient $1h$ has a value of "0.9", the value "10" is multiplexed as an encoded language. If the weighted coefficient $1h$ has a value of "1.0", the value "1" is multiplexed as an encoded language. If the weighted coefficient $1h$ has a value of "1.1", the value "11" is multiplexed as an encoded language.

The encoded bit stream with multiplexed encoding language with respect to the weighted coefficient $1h$, the picture layer information, picture start code (PSC) in the picture layer multiplexing section 60 are input into the GOB layer multiplexing section 61. The GOB layer multiplexing section 61 multiplexes the GOB start code (GBSC) showing the start of the GOB layer information and the GOB layer information and inputs the result into the macroblock layer multiplexing section 62.

The macroblock layer multiplexing section 62 multiplexes the macroblock (MB) layer information in the encoded bit stream input from the GOB layer multiplexing section 61 and outputs the result to the block data multiplexing section 63.

In the block data multiplexing section 63, the quantization index column $1a$ which is a two dimensional block unit is transformed into a one dimensional quantization index column $1a$ by a zigzag scan order (refer to FIG. 22). Variable length encoding is performed on the one dimensional quantization index column $1a$ and using the obtained variable length encoding language as block data, the encoded bit stream is multiplexed. Thereafter the encoded bit stream is output to the buffer 51.

As shown above, the encoded bit stream output from the syntax multiplexing section 49 as shown above is shown by example in FIG. 52.

Figures 53, 54:
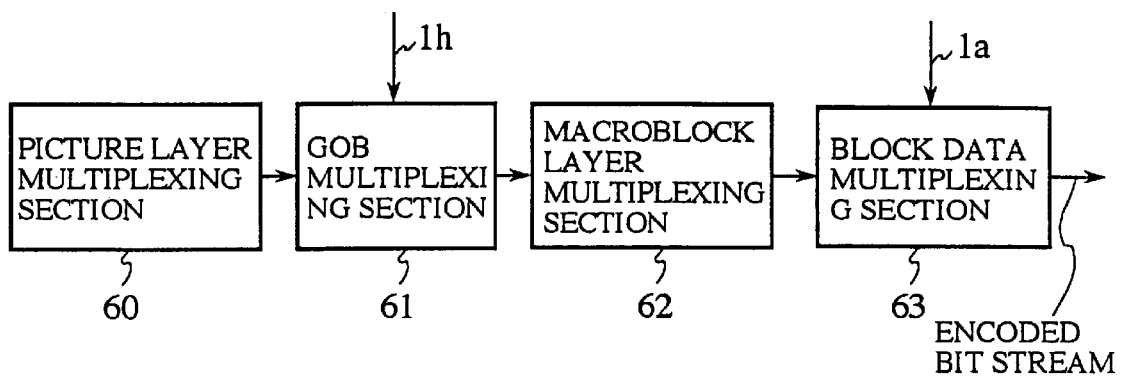
FIG. 53 is a block diagram of another arrangement of a syntax multiplexing section according to a tenth embodiment of the present invention.
FIG. 54 shows an example of an encoded bit stream output from the syntax multiplexing section shown in FIG. 53.

FIG. 53 is a block diagram of another arrangement of the syntax multiplexing section 49. The arrangement shown in FIG. 53 differs from that shown in FIG. 50 in that the encoding language of the weighted coefficient $1h$ is not multiplexed by the picture layer multiplexing section 60 and is multiplexed by the GOB layer multiplexing section 61.

The picture layer multiplexing section 60 multiplexes the picture layer start code (PSC), showing the start of the picture layer information, and the picture layer information and outputs the result into the GOB layer multiplexing section 61.

The GOB layer multiplexing section 61 multiplexes the GOB start code (GBSC) showing the start of the GOB layer information, the encoding language which corresponds to the weighted coefficient $1h$ input from the weighted coefficient determination section 9 and the GOB layer. The weighted coefficient $1h$ is encoded using the table shown in FIG. 51 as described above and is multiplexed to the encoded bit stream as weighted coefficient information.

The operation of the macroblock layer multiplexing section 62 and the block data multiplexing section 63 is the same as that described above with reference to FIG. 50 and thus additional description will be omitted. The encoded bit stream output from the syntax multiplexing section 49 is show for example in FIG. 54.

Other operations of the present embodiment are the same as those described with reference to embodiment 4 or embodiment 8 and therefore additional description will be omitted.

As shown above with reference to embodiment 10, the image encoding device multiplexes a weighted coefficient 1$h$ used in an encoded data value limiting section 43 as threshold value updating information to an encoded bit stream as a section of header information. Thus when using in combination with the invention as described with reference to embodiment 11 which is described below, it is possible to perform effective detection of errors in the image decoding device and to generate an encoded bit stream which allows the generation of a decoded image with little influence of errors contained in the encoded bit stream.

Figure 55:
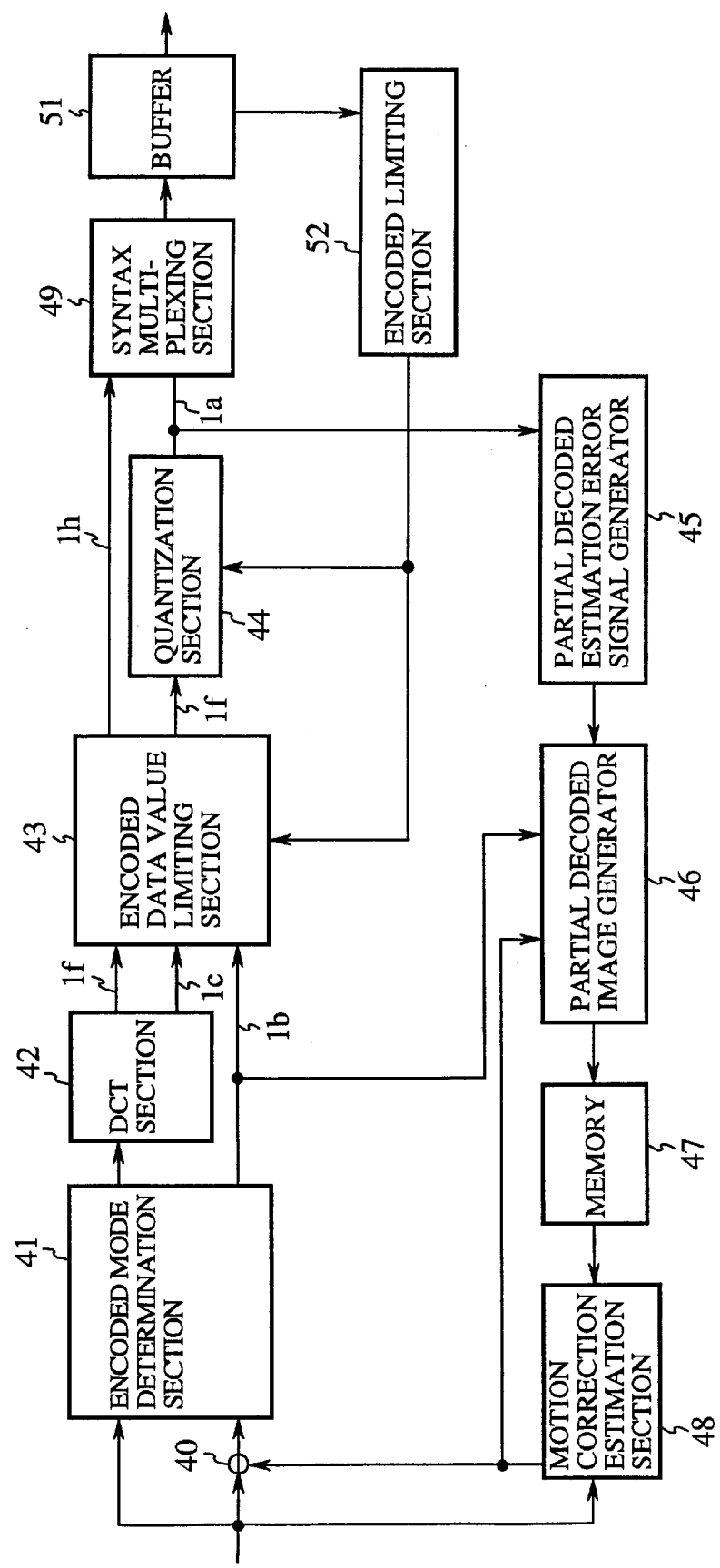
FIG. 55 is a block diagram of another arrangement of an image encoding device according to a tenth embodiment of the present invention.

In embodiment 10, an image encoding device is comprised as shown in FIG. 47 and a quantization index column 1$a$ of a block unit is input into the encoded data value control section 43. However as shown in FIG. 55, the DCT coefficient column 1$f$ of the block unit may be input into the encoded data value limiting section 43. In this case, the DCT coefficient column 1$f$ of the block unit output from the DCT section 42 is into the encoded data value control section 43.

The encoded data value control section 43 may be comprised as shown in FIG. 48 as shown above or may be comprised as shown in FIG. 49.

The maximum value/minimum value table storage section 2 shown in FIG. 48 has a maximum value table and a minimum value table such as shown in FIGS. 12($a$)–($d$) and FIGS. 13($a$)–($d$).

The DCT coefficient column 1$f$ of the block unit output from the encoded data value control section 43 is output to the quantization section 44.

Embodiment 11

In embodiment 11, another arrangement of the syntax analysis section 1 shown in embodiment 2 or embodiment 6 is shown. That is to say, in embodiment 11, an example is given of performing analysis of weighted coefficient information used in an error block detection section 4 by an encoded bit stream which is generated by the image encoding device in embodiment 10.

Figure 56:
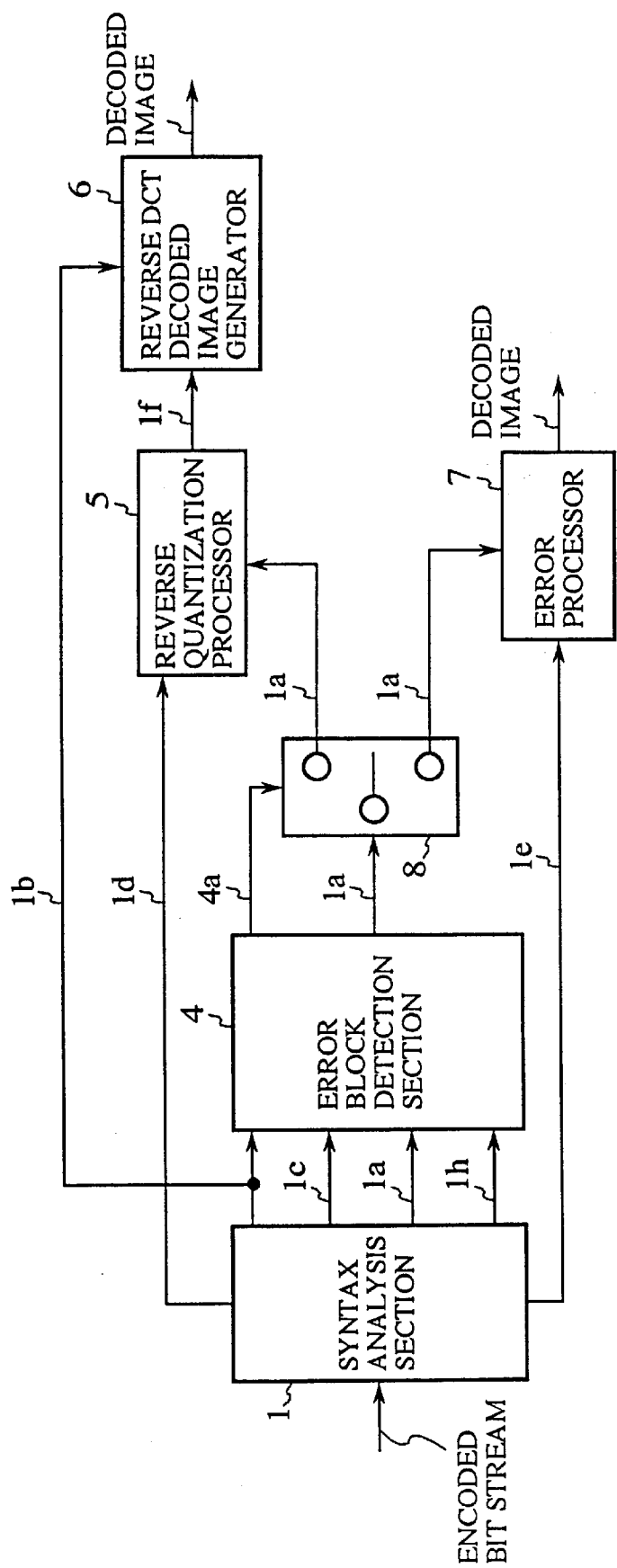
FIG. 56 is a block diagram of the overall structure of an image decoding device according to an eleventh embodiment of the present invention.

FIG. 56 is a block diagram of the overall structure of an image decoding device according to embodiment 11 of the present invention. As shown in FIG. 56, since the structure of the image decoding device according to embodiment 11 is the same as those components as shown in embodiment 2 in FIG. 14 or embodiment 6 in FIG. 33, components are designated by the same numerals. Thus additional description will be omitted.

Figure 57:
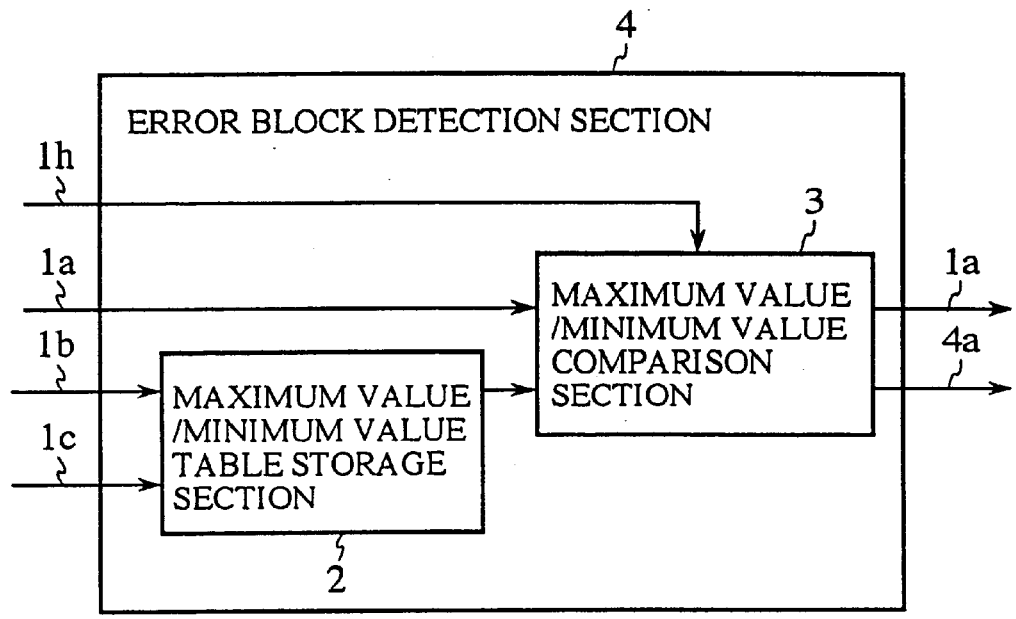
FIG. 57 is a block diagram of an error block detection section according to an eleventh embodiment of the present invention.

The error block detection section (error block detection means) 4 in embodiment 11 may be comprised as shown in FIG. 57 for example, from a maximum value/minimum value table storage section 2 and a maximum value/minimum value table comparison section 3. Otherwise as shown in FIG. 58, it may be comprised of a valid coefficient position storage section 80 and a valid coefficient position comparison section 81.

That is to say, the error block detection section 4 in embodiment 11 comprises the weighted coefficient determination section 9 removed from the error block detection section 4 of embodiment 2 as shown in FIG. 14 or from the error block detection section 4 in embodiment 6 as shown in FIG. 33.

In embodiment 11, since an encoded bit stream generated by the image encoding device in embodiment 10 is handled, as shown in FIG. 52 or FIG. 54, the weighted coefficient information is multiplexed beforehand to the encoded bit stream and this encoded bit stream is input into the syntax analysis section (analysis means) 1. Thus it is assumed that the weighted coefficient 1$h$ is input into the error block detection section 4 by the syntax analysis section 1. Thus a weighted coefficient determination section 9 becomes redundant.

Figure 58:
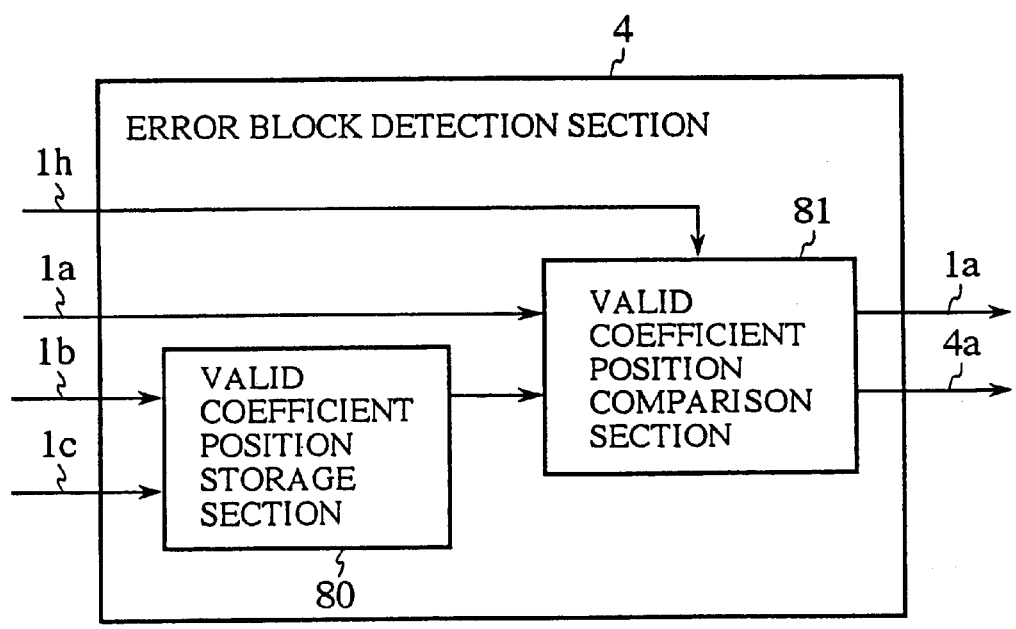
FIG. 58 is a block diagram of another arrangement of an error block detection section according to an eleventh embodiment of the present invention.

That is to say, the maximum value/minimum value comparison section 3 shown in FIG. 57 and the valid coefficient position comparison section 81 shown in FIG. 58 perform processing using a weighted coefficient 1$h$ input from the syntax analysis section 1.

Figure 59:
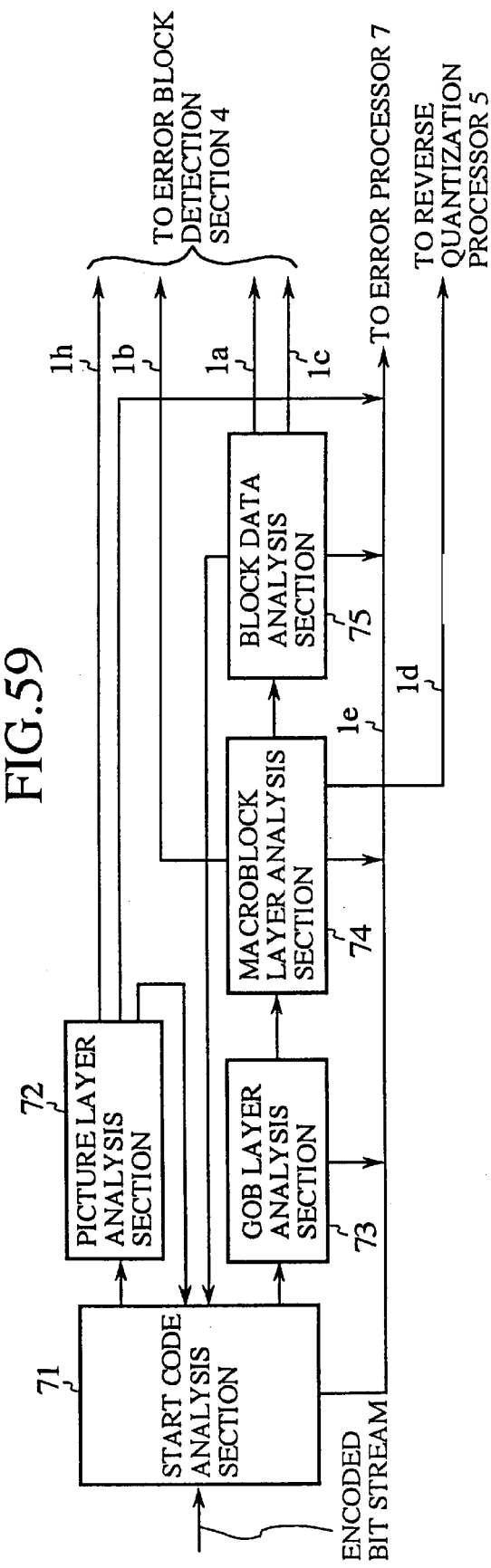
FIG. 59 is a block diagram of a syntax analysis section according to an eleventh embodiment of the present invention.

FIG. 59 is a block diagram showing the structure of a syntax analysis section 1 in embodiment 11. Analysis is performed of multiplexed weighted coefficient information in a picture layer. In FIG. 59, 71 denotes a start code analysis section, 72 is a picture layer analysis section, 73 is a GOB layer analysis section, 74 is a macroblock layer analysis section and 75 is a block data analysis section.

The operation of the syntax analysis section 1 shown in FIG. 59 which analyzes multiplexed weighted coefficient information in the picture layer will be described below.

The start code analysis section 71 performs analysis of a start code contained in an input encoded bit stream. If the analyzed start code shows a picture layer, the encoded bit stream is output to the picture layer analysis section 72. If the analyzed start code shows a GOB layer, the encoded bit stream is output to the GOB layer analysis section 73. When a start code is analyzed which does not match a fixed syntax, an error syntax detection signal 1$e$ is output to the error processor 7 to that effect.

Analysis of the weighted coefficient information and the picture layer information is performed by the input encoded bit stream in the picture layer analysis section 72. The analyzed encoded bit stream is output to the start code analysis section 71. The decoded weighted coefficient 1$h$ is output to the error block detection section 4.

Analysis of the GOB layer information is performed in the GOB layer analysis section 73 and the analyzed encoded bit stream is output to the macroblock layer analysis section 74.

Analysis of the macroblock layer information is performed in the macroblock layer analysis section 74 and the analyzed encoded bit stream is output to the block data analysis section 75. The encoded mode 1$b$ contained in the analyzed macroblock layer is output to the error block detection section 4 and the quantization step size 1$d$ is output to the reverse quantization processor 5.

The block data analysis section 75 performs analysis of block data information and outputs the analyzed encoded bit stream to the start code analysis section 71. Quantization index column 1$a$ contained as block data information and the block number 1$c$ are output to the error block detection section 4.

When information is analyzed which does not match a fixed syntax in the picture layer analysis section 72, the GOB layer analysis section 73, the macroblock layer analysis section 74 or the block data analysis section 75, an error syntax detection signal 1$e$ is output to the error processor 7 to that effect.

Figure 60:
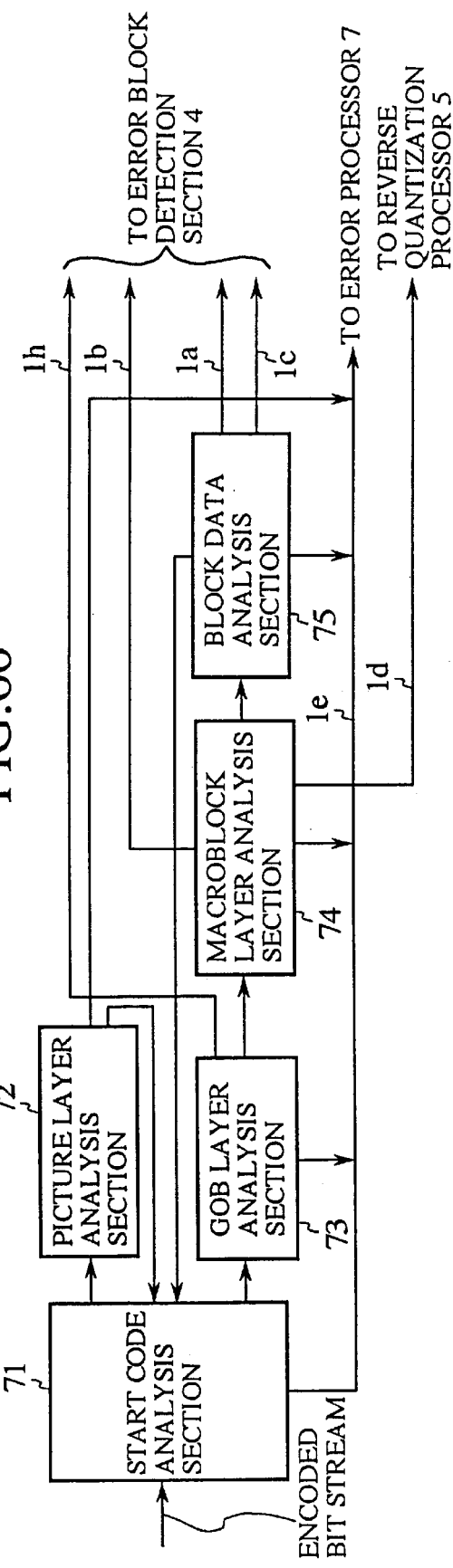
FIG. 60 is a block diagram of another arrangement of a syntax analysis section according to an eleventh embodiment of the present invention.

FIG. 60 is a block diagram of another arrangement of the syntax analysis section 1 shown in embodiment 11 and shows the situation in which multiplexed weighted coefficient information is analyzed in the GOB layer.

The operation of the syntax analysis section 1 in FIG. 60 which analyzes multiplexed weighted coefficient information is analyzed in the GOB layer will be discussed below.

The start code analysis section 71 analyzes the start code which is contained in the input encoded bit stream. When the analyzed start code shows a picture layer, an encoded bit stream is output to the picture layer analysis section 72 and when the analyzed start code shows a GOB layer, an encoded bit stream is output to the GOB layer analysis section 73.

The picture layer analysis section 72 analyzes picture layer information by the input encoded bit stream and outputs the analyzed encoded bit stream to the start code analysis section 71.

The GOB layer analysis section 73 performs analysis of the weighted coefficient and the GOB layer information and outputs the analyzed encoded bit stream to the picture layer analysis section 74. The decoded weighted coefficient $1h$ is output to the error block detection section 4.

The operation of the macroblock layer analysis section 74 and the block data analysis section 75 is the same as described above and additional description will be omitted.

When information is analyzed which does not match a fixed syntax in the picture layer analysis section 72, the GOB layer analysis section 73, the macroblock layer analysis section 74 or the block data analysis section 75, an error syntax detection signal $1e$ is output to the error processor 7 to that effect.

As shown above with reference to embodiment 11, the image decoding device performs decoding and analysis of weighted coefficient information as threshold value updating information from an encoded bit stream and updates a threshold value used in obtained weighted coefficient $1h$. It is determined whether or not an error is contained in an encoded bit stream to be decoded based on the updated threshold value. Thus it is possible to perform rapid detection of errors matching a fixed syntax and to generate a decoded image with little influence of error contained in the encoded bit stream.

Figure 61:
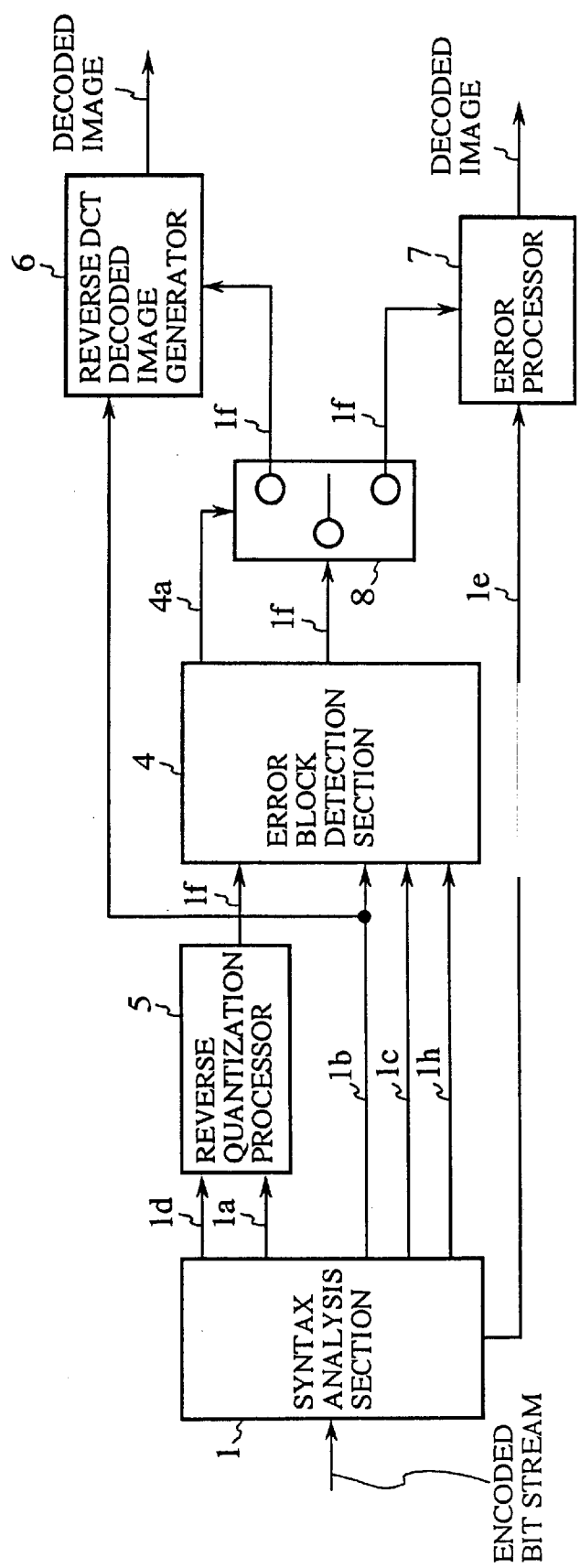
FIG. 61 is a block diagram of another arrangement of the overall structure of an image decoding device according to an eleventh embodiment of the present invention.

In embodiment 11, an image decoding device is comprised as shown in FIG. 56. However as shown in FIG. 61, the DCT coefficient column $1f$ of the block unit output from the reverse quantization processor 5 may be input into the error block detection section 4.

The error block detection section 4 may be comprised as shown in FIG. 57 as shown above or may be comprised as shown in FIG. 58.

The maximum value/minimum value table storage section 2 shown in FIG. 57 has a maximum value table and a minimum value table such as shown of the error block detection section 4 in FIGS. 12($a$)–($d$) and FIGS. 13($a$)–($d$).

The DCT coefficient column $1f$ of the block unit is output to the reverse DCT/decoding image generator 6 when the error block detection signal $4a$ is "0" by the switching section 8 and is output to the error processor 7 when the error block detection signal $4a$ is "1".

Embodiment 12

In embodiment 12, another arrangement of the syntax multiplexing section as shown in embodiment 7 or embodiment 8 is shown. That is to say, in embodiment 12, an example is given of an image encoding device which generates an encoded bit stream which allows the rapid detection of errors contained in an encoded bit stream in an image decoding device by the multiplexing of a valid coefficient threshold value used in an encoded data value limiting section 43 to an encoded bit stream as a header information.

Figure 62:
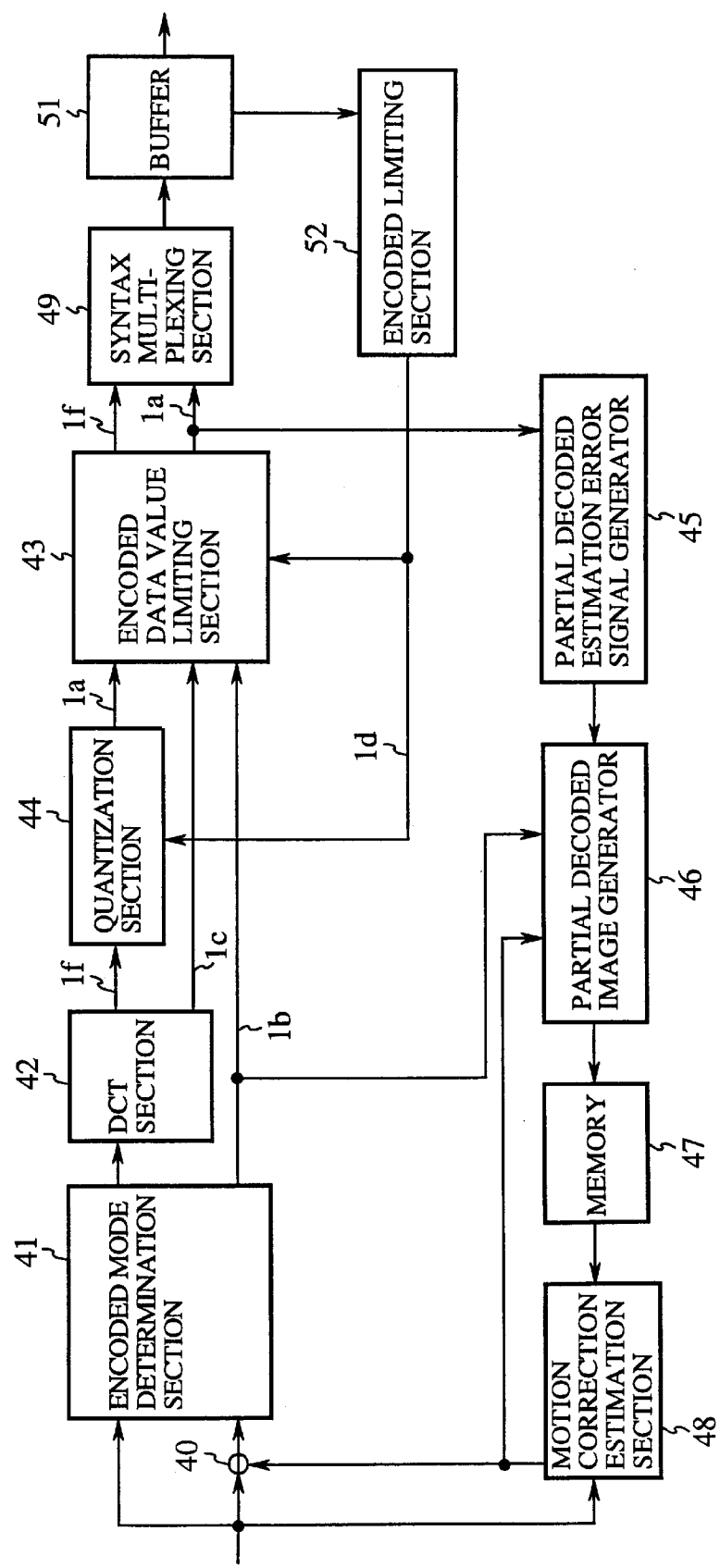
FIG. 62 is a block diagram of the overall structure of an image encoding device according to a twelfth embodiment of the present invention.

FIG. 62 is a block diagram of the overall structure of an image encoding device according to embodiment 12 of the present invention. The structure of the image encoding device according to embodiment 12 may be the same as those components as shown in embodiment 7 in FIG. 37 or embodiment 8 in FIG. 42. Thus similar components are designated by the same numerals and additional description will be omitted.

The encoded data value limiting section 43 (encoded data value limiting means) in embodiment 12 may be comprised as shown in FIG. 41 for example, from an encoded data value limiting section 43 as in embodiment 7. Otherwise as shown in FIG. 42, it may be comprised of the encoded data value limiting section 43 as shown in embodiment 8.

In either case, in embodiment 12, the valid coefficient position storage section 80 contained in the encoded data value limiting section 43 outputs the four types of valid coefficient threshold value $1i$ in the valid coefficient position storage section 80 to the syntax multiplexing section (multiplexing means) 49 in operations other than those described with respect to embodiment 7 or embodiment 8.

The operation of the syntax multiplexing section 49 will be described below.

FIG. 63 is a block diagram of the structure of a syntax multiplexing section 49. A valid coefficient threshold value $1i$ is shown as multiplexed in the picture layer multiplexing section 60 and has the same structure as embodiment 10 as shown in FIG. 50.

The operation of the invention will be described below.

Multiplexing of a picture layer code (PSC) which shows the start of picture layer information is performed by the picture layer multiplexing section 60. Thereafter the encoding language which corresponds to the effective weighted coefficient $1i$ input from the encoded data value limiting section 43 and the picture layer information are multiplexed.

FIG. 64 shows the relationship of effective weighted coefficient $1i$ and the encoded language which corresponds to each effective weighted coefficient $1i$. Basically the valid coefficient threshold value $1i$ (0–63) is shown in binary display. When the valid coefficient threshold value $1i$ takes value of "54" (refer to FIG. 28, intra-encoded, luminance component), "110110" is multiplexed as an encoding language. When the valid coefficient threshold value $1i$ takes value of "28" (inter-encoded, color difference component), "011100" is multiplexed as an encoding language. When the valid coefficient threshold value $1i$ takes value of "36" (inter-encoded, luminance component), "100100" is multiplexed as an encoding language. When the valid coefficient threshold value $1i$ takes value of "21" (inter-encoded, color difference component), "0101011" is multiplexed as an encoding language.

The operation of the GOB layer multiplexing section 61, the macroblock layer multiplexing section 62 and the block data multiplexing section 63 is the same as that described with respect to embodiment 10 above and additional description will be omitted.

FIG. 65 shows an encoded bit stream of embodiment 12 output from a syntax multiplexing section 49. As shown in FIG. 65, an encoded language for a valid coefficient threshold value $1i$ for luminance components and color difference components is multiplexed as valid coefficient threshold value information at each inter and intra encoded mode together with picture layer information.

Other operations are the same as those described with reference to embodiment 7, 8 and 10 and additional description will be omitted.

As shown above, according to embodiment 12, the image encoding device multiplexes a valid coefficient value $1i$ of a valid coefficient position storage section 80 used in an encoded data value limiting section 43 as threshold information. The information is multiplexed to an encoded bit stream as a section of header information. Thus it is possible to perform effective detection of errors in an image decoding device when used in combination with the image decoding device as shown above with reference to embodiment 13. It is possible to generate an encoded bit stream which allows the generation of a decoded image with little influence of errors contained in the encoded bit stream.

In embodiment 12 above, the valid coefficient threshold value $1i$ of the valid coefficient position storage section 80 used in the encoded data value limiting section 43 is multiplexed as threshold value information to an encoded bit stream as a section of header information. When the encoded data value limiting section 43 uses a value from a maximum value/minimum value table of the maximum value/minimum value table storage section 2 as a threshold value, the value from the maximum value/minimum value table may be multiplexed to the encoded bit stream as threshold information.

Embodiment 13

In embodiment 13, another arrangement of the syntax analysis section 1 shown in embodiment 5 or embodiment 6 is shown. That is to say, in embodiment 13, an example is given of an image decoding device performing analysis of valid coefficient threshold value information by an encoded bit stream which is generated in an image encoding device according to embodiment 12. Detection of errors contained in an encoded bit stream is performed based on the obtained valid coefficient threshold value $1i$.

Figure 66:
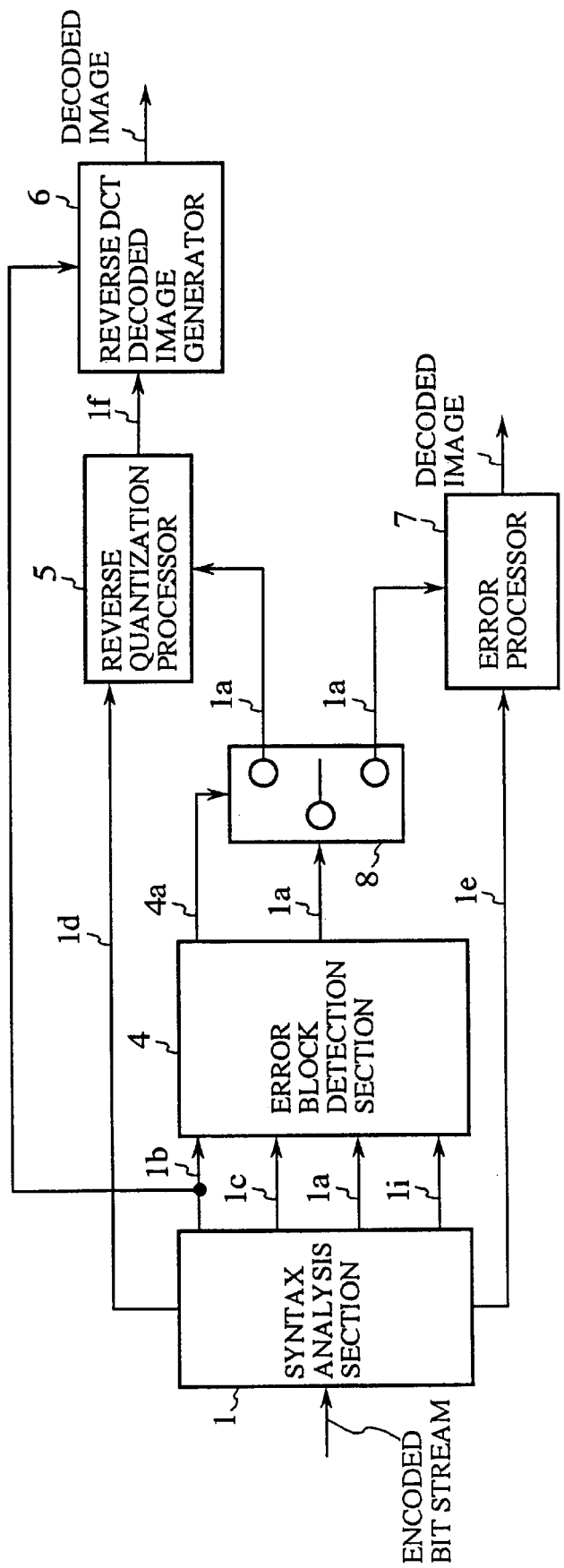
FIG. 66 is a block diagram of an image decoding device according to a thirteenth embodiment of the present invention.

FIG. 66 is a block diagram of the overall structure of an image decoding device according to embodiment 13 of the present invention. Since the structure of the image decoding device according to embodiment 13 is the same as that shown in embodiment 5 in FIG. 27 or embodiment 6 in FIG. 33, components are designated by the same numerals. Thus additional description will be omitted.

Figure 67:
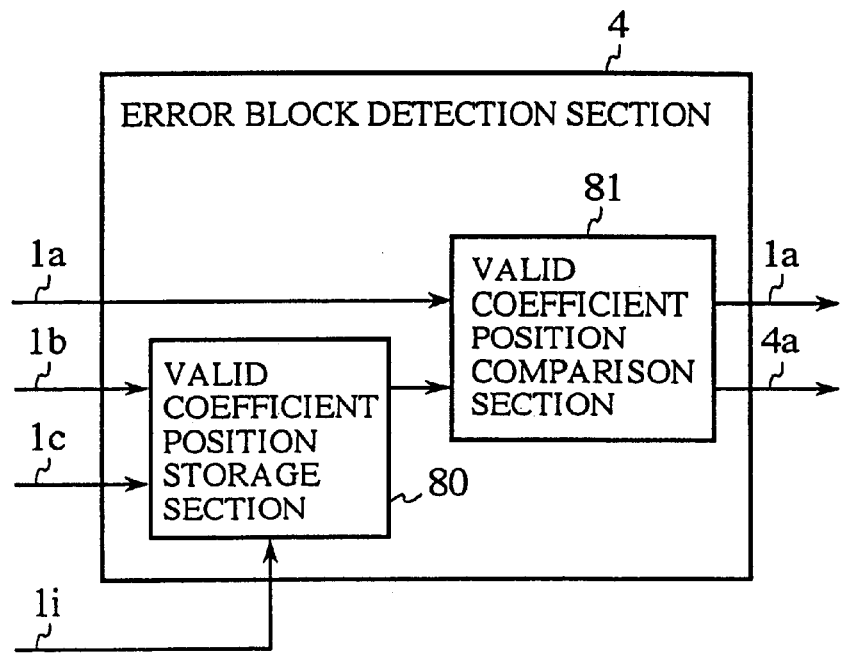
FIG. 67 is a block diagram of an error block detection section according to a thirteenth embodiment of the present invention.
Figure 68:
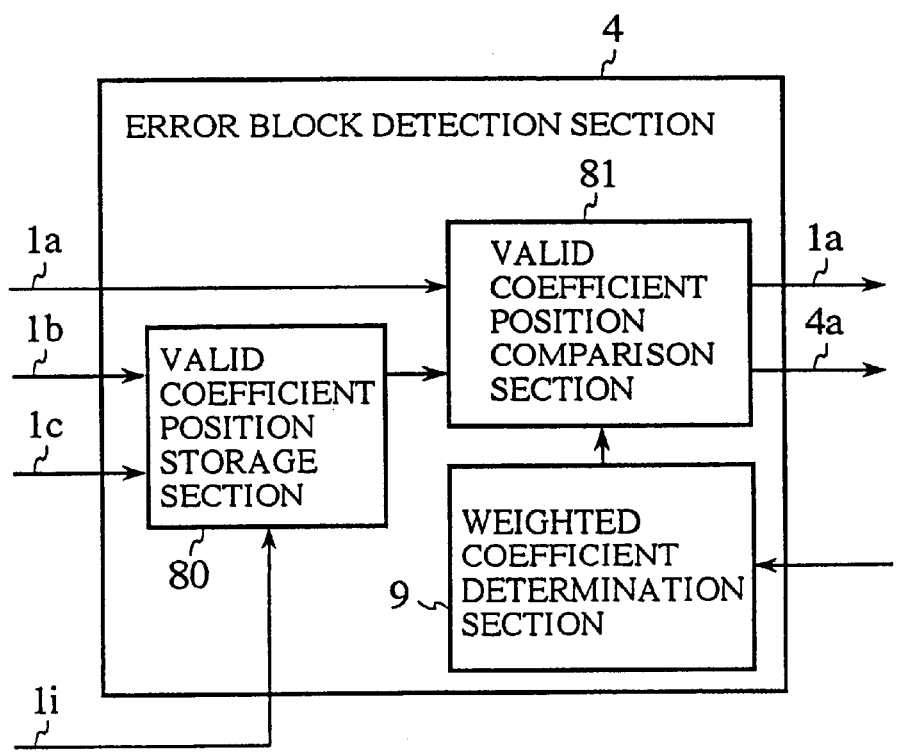
FIG. 68 is a block diagram of another arrangement of an error block detection section according to a thirteenth embodiment of the present invention.

In embodiment 13, the error block detection section (error block detection means) 4 may be comprised as shown in FIG. 67 for example, in the same manner as the error block detection section 4 in embodiment 5 (refer to FIG. 27). Otherwise it may be comprised as shown in FIG. 68, it may be comprised as the error block detection section 4 in embodiment 6 (refer to FIG. 33). The valid coefficient position storage section 80 maintains the valid coefficient threshold value $1i$ analyzed from the encoded bit stream input from the syntax analysis section (analysis means) 1 in the picture unit without storing a pre-set effective threshold value $1i$.

Figure 69:
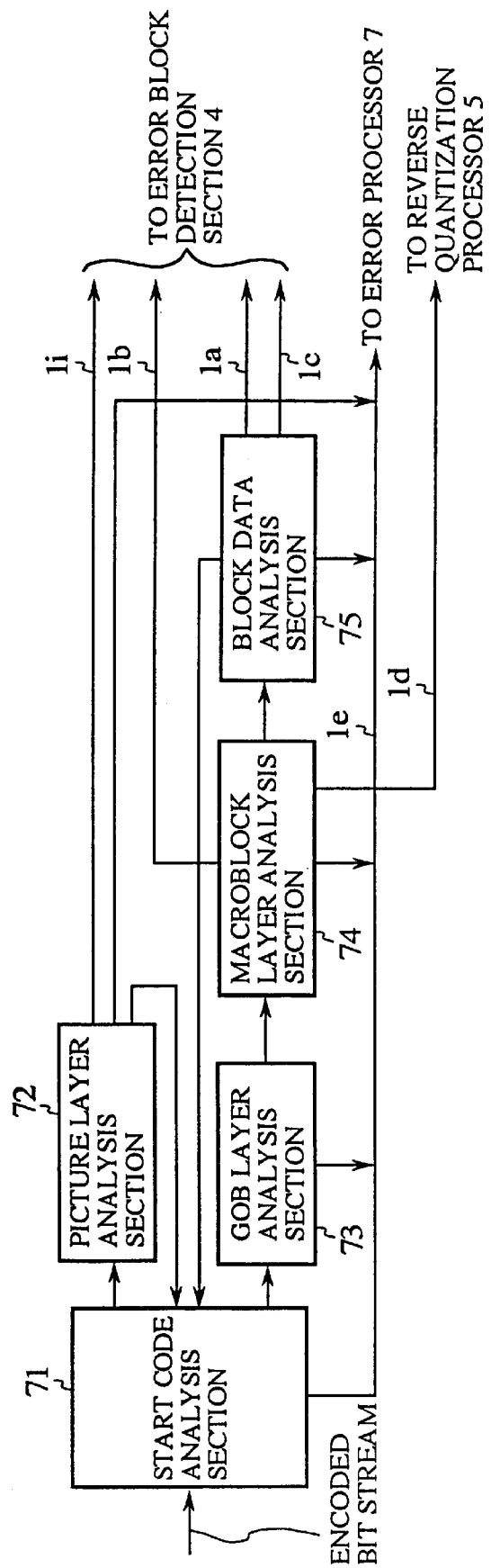
FIG. 69 is a block diagram of a syntax analysis section according to a thirteenth embodiment of the present invention.

FIG. 69 is a block diagram showing the structure of a syntax analysis section 1 and shows analysis performed with respect to a multiplexed valid coefficient threshold value information in a picture layer. Apart from the operation of the picture layer analysis section 72, the arrangement of the syntax analysis section 1 is the same as that described with reference to embodiment 11 in FIG. 59.

The operation of the syntax analysis section 1 which analyzes multiplexed valid coefficient threshold value information in the picture layer will be described below.

The picture layer analysis section 72 performs analysis of valid coefficient threshold value information and picture layer information in an input encoded bit stream and outputs the analyzed encoded bit stream to the start code analysis section 71. The decoded valid coefficient threshold value $1i$ is output to the error block detection section 4. When layer information is analyzed in the picture layer analysis section 72 which does not match a fixed syntax, an error syntax detection signal $1e$ is output to the error processor 7 to that effect.

The operation of the start code analysis section 71, the GOB layer analysis section 73, the macroblock layer analysis section 74 and the block data analysis section 75 is the same as the operation of that described with reference to embodiment 11 as shown in FIG. 59. Thus additional description will be omitted.

As shown above according to embodiment 13, the image decoding device performs decoding and analysis of valid coefficient threshold value information as threshold value updating information by an encoded bit stream and updates a threshold value used in an obtained effective weighted coefficient $1i$. It is determined whether or not an error is contained in an encoded bit stream to be decoded based on the updated threshold value. Thus it is possible to perform rapid detection of errors matching a fixed syntax and to generate a decoded image with little influence of error contained in the encoded bit stream.

Embodiment 14

In embodiment 14, another arrangement of the image encoding device as shown in embodiment 3, 4, 7 or 8 is shown. That is to say, in embodiment 14, an example is given of an image encoding device performing encoding based on coefficient distribution limiting operation control information and a syntax multiplexing section which multiplexes information (hereafter coefficient distribution limiting operation control information) which indicates whether an image signal distribution is limited or not in a frequency domain.

That is to say, embodiment 14 is characterized in that when coefficient distribution limiting operation control information indicates that a limit is applied to an image signal distribution in a frequency domain, encoding is performed with an added limit with respect to the distribution of the DCT coefficient. When coefficient distribution limiting operation control information indicates that a limit is not applied to an image signal distribution in a frequency domain, encoding as in the conventional example is performed.

Figure 70:
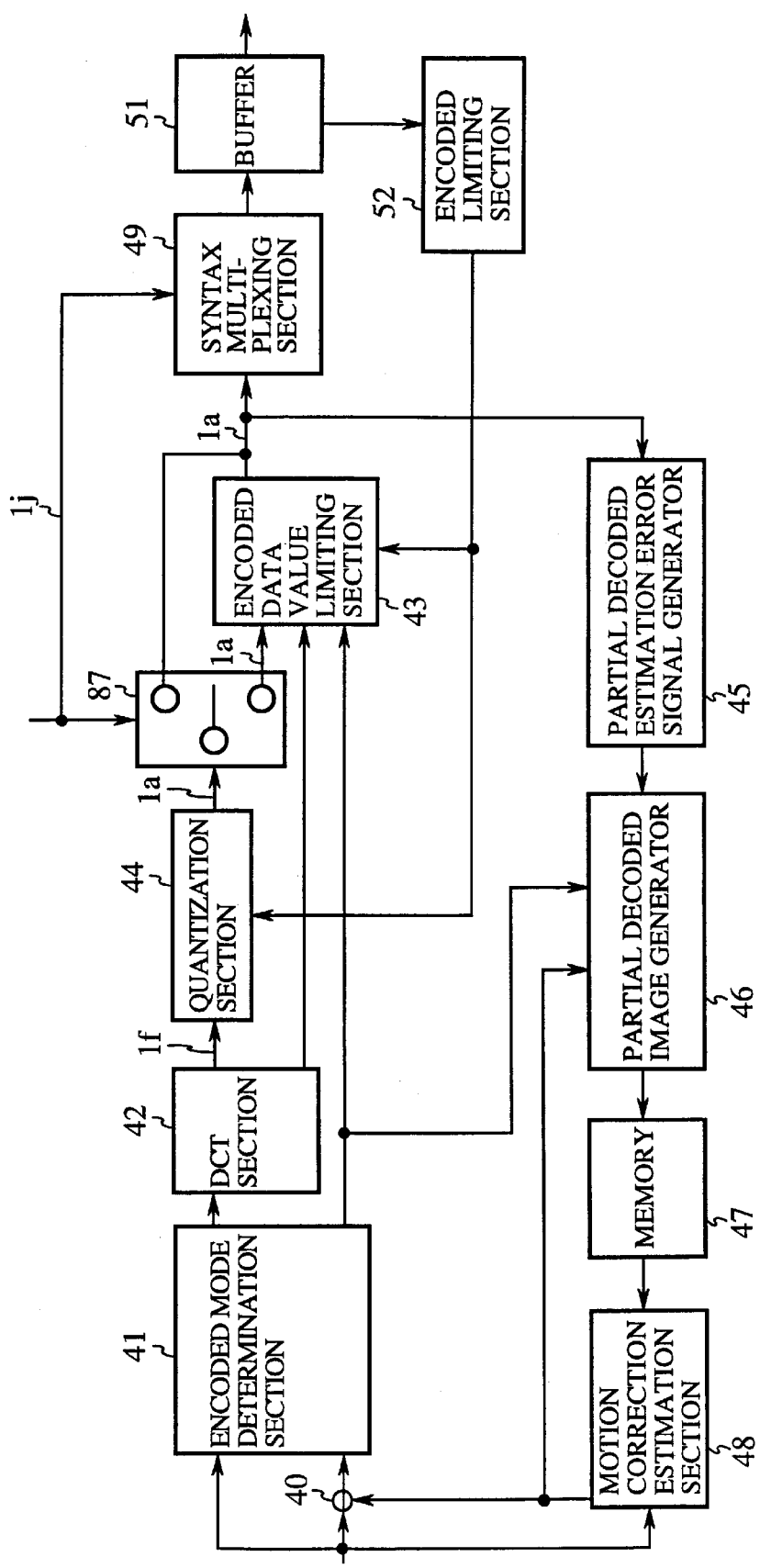
FIG. 70 is a block diagram of an image encoding device according to a fourteenth embodiment of the present invention.

FIG. 70 is a block diagram of the overall structure of an image encoding device according to embodiment 14 of the present invention. The points of difference in the structure of the image encoding device according to embodiment 14 from that shown in embodiment 3, 4, 7 or 8 will be described below.

In FIG. 70, 87 is a switching section and $1j$ is coefficient distribution limiting operation control information. The encoded data value limiting section (encoded data value limiting means) 43 may be as that shown in embodiment 3 with reference to FIG. 18. It may be as that shown in embodiment 4 with reference to FIG. 24. It may be as that shown in embodiment 7 with reference to FIG. 37. Or it may be as that shown in embodiment 8 with reference to FIG. 42.

The operation of the invention will be described below.

A quantization index column $1a$ of a block unit output from the quantization section 44 is input to the switching section 87. The switching section 87 outputs the quantization index column $1a$ to the encoded data value limiting section 43 when the coefficient distribution limiting operation control information $1j$ indicates that a limit is applied to an image signal distribution in a frequency domain. When this is not the case, the switching section 87 outputs the quantization index column 1*a* to the syntax multiplexing section (multiplexing means) 49 and the partial decoding estimation error signal generator 45 without passing through the encoding data value limiting section 43.

The operation of the syntax multiplexing section 49 will be described below.

Figures 71, 72:
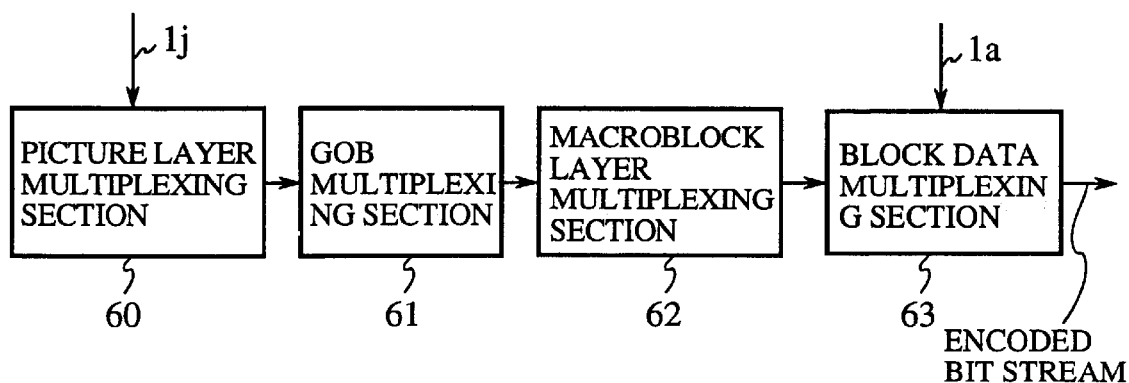
FIG. 71 is a block diagram of a syntax multiplexing section according to a fourteenth embodiment of the present invention.
FIG. 72 shows an example of an encoded bit stream output from the syntax multiplexing section according to a fourteenth embodiment of the present invention.

FIG. 71 is a block diagram of the structure of a syntax multiplexing section 49 which multiplexes coefficient distribution limiting operation control information 1*j* in the picture layer multiplexing section 60.

The picture layer multiplexing section 60 performs multiplexing on a picture start code (PSC) which shows the start of picture layer information, an encoding language, which corresponds to the coefficient distribution limiting operation control information 1*j* which is externally given, and the picture layer information.

The multiplexing of the coefficient distribution limiting operation control information 1*j* consists of multiplexing a value of "1" to the encoded bit stream to when the coefficient distribution limiting operation control information 1*j* indicates that a limit exists on the image signal distribution in the frequency domain and multiplexing a value of "0" when there is no limit on the image signal distribution in the frequency domain.

The operation of the GOB layer multiplexing section 61, the macroblock layer mulitplexing section 62 and the block data multiplexing section 63 is the same as that described with reference to embodiment 12 and thus additional description will be omitted.

FIG. 72 shows an example of an encoded bit stream output from a syntax multiplexing section 49 in embodiment 14. As shown in FIG. 72, the coefficient distribution limiting operation control information 1*j* is multiplexed together with the picture layer information.

Since this operation is the same as that described with reference to embodiment 3, 4, 7, 8 and 12, additional description will be omitted.

As shown above with reference to embodiment 14, since the image encoding device is adapted to multiplex coefficient distribution limiting operation control information 1*j* to header information, the image decoding device can determine, based on the coefficient distribution limiting operation control information 1*j*, whether or not error detection should be performed. Therefore, it is possible to perform the error detection efficiently, thereby to generate an encoded bit stream which enables to obtain decoded images with little influence of errors contained in the encoded bit stream.

Figure 73:
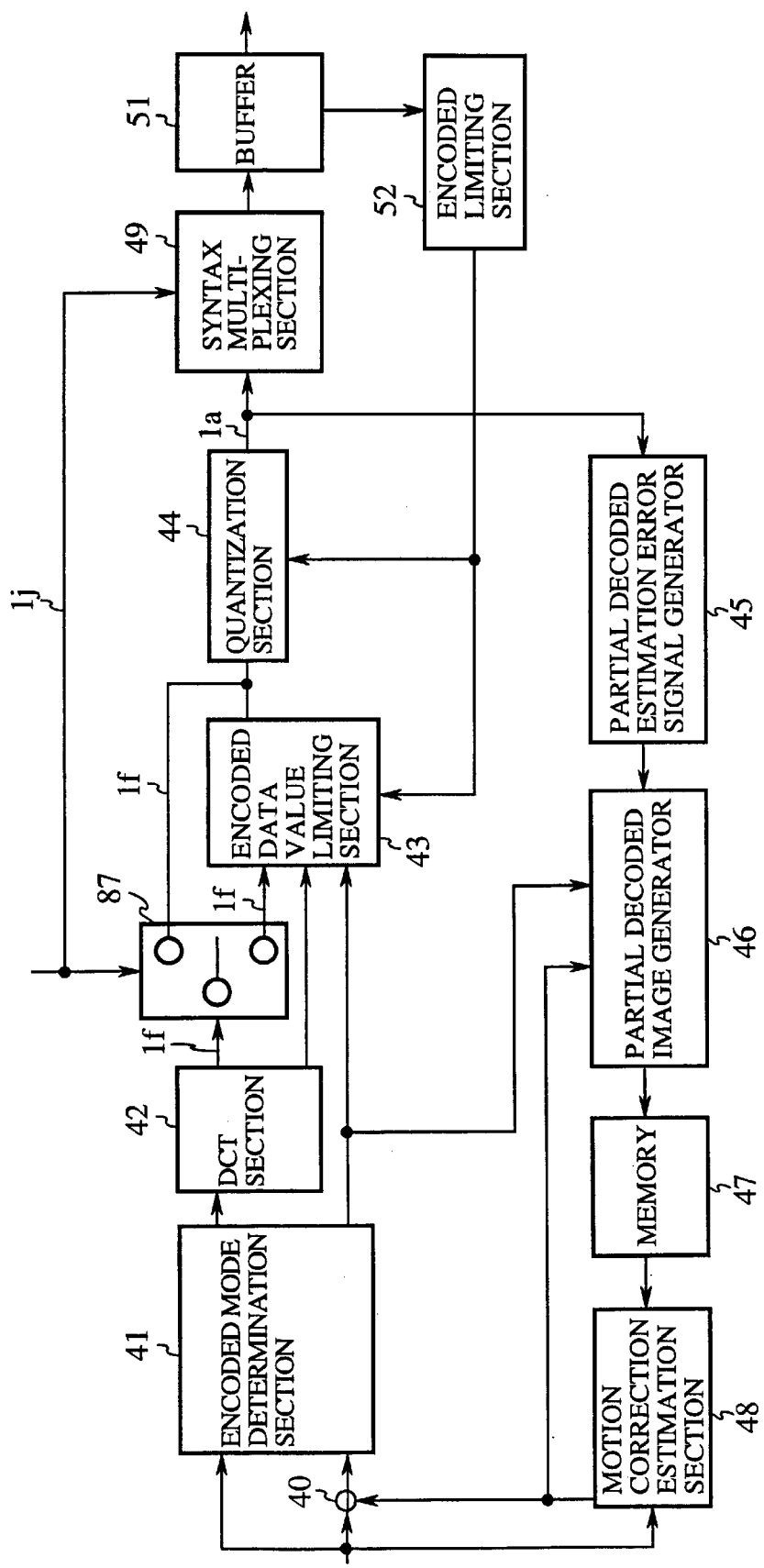
FIG. 73 is a block diagram of another arrangement of an image encoding device according to a fourteenth embodiment of the present invention.

The image encoding device in embodiment 14 is comprised as shown in FIG. 70 but may be comprised as shown in FIG. 73. In this case, the DCT coefficient column 1*f* of the block unit output by the DCT section 42 is input to the switching section 87. The switching section 87 outputs the DCT coefficient column 1*f* of the block unit to the encoded data value limiting section 43 based on the coefficient distribution limiting operation control information 1*j* when the coefficient distribution limiting operation control information 1*j* indicates a limit on the image signal distribution in the frequency domain. When the coefficient distribution limiting operation control information 1*j* does not indicate a limit on the image signal distribution in the frequency domain, the switching section 87 outputs the DCT coefficient column 1*f* of the block unit to the quantization section 44 without passing through the encoded data value limiting section 43.

Embodiment 15

In embodiment 15, another arrangement of the image decoding device as shown in embodiment 1, 2, 5 or 6 is shown. That is to say, in embodiment 15, an example is given of an image decoding device which performs analysis of coefficient distribution limiting operation control information 1*j* from an encoded bit stream generated in the image encoding device as described in the embodiment 14 and determines, based on the coefficient distribution limiting operation control information 1*j*, whether or not an operation related to error detection of errors contained in the encoded bit stream should be performed.

Figure 74:
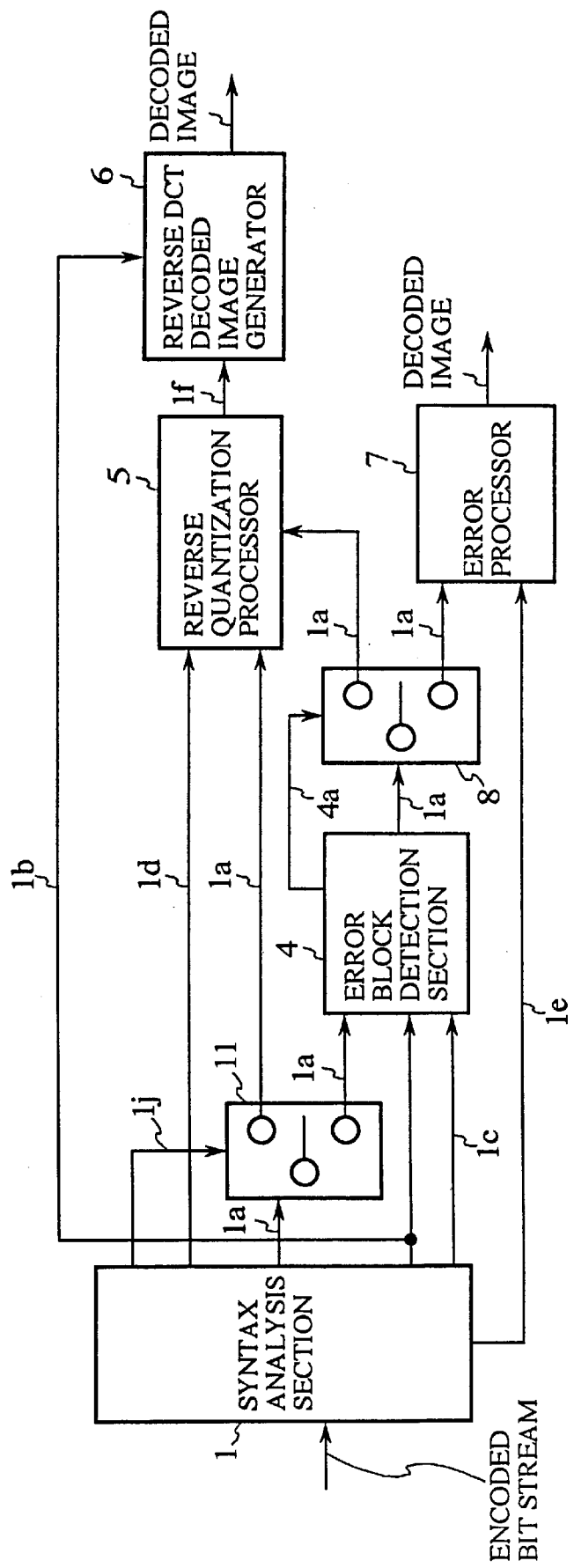
FIG. 74 is a block diagram of an image decoding device according to a fifteenth embodiment of the present invention.

FIG. 74 is a block diagram of the overall structure of an image decoding device according to embodiment 15 of the present invention. The points of difference in embodiment 15 from the aspects of the image decoding device as shown in embodiments 1, 2, 5 or 6 will be described below. In FIG. 74, reference numeral 11 denotes a switching section and 1*j* denotes coefficient distribution limiting operation control information.

The operation of the invention will be described below.

A quantization index column 1*a* of a block unit output from the syntax analysis section (analysis means) 1 is input to the switching section 11. The switching section 11 outputs the quantization index column 1*a* of the block unit to the error block detection section (error block detection means) 4 when the coefficient distribution limiting operation control information 1*j* indicates that a limit is applied to an image signal distribution in a frequency domain. When the coefficient distribution limiting operation control information 1*j* does not indicate that a limit is applied to an image signal distribution in a frequency domain, the switching section 11 outputs the quantization index column 1*a* of the block unit to the reverse quantization processor 5.

Figure 75:
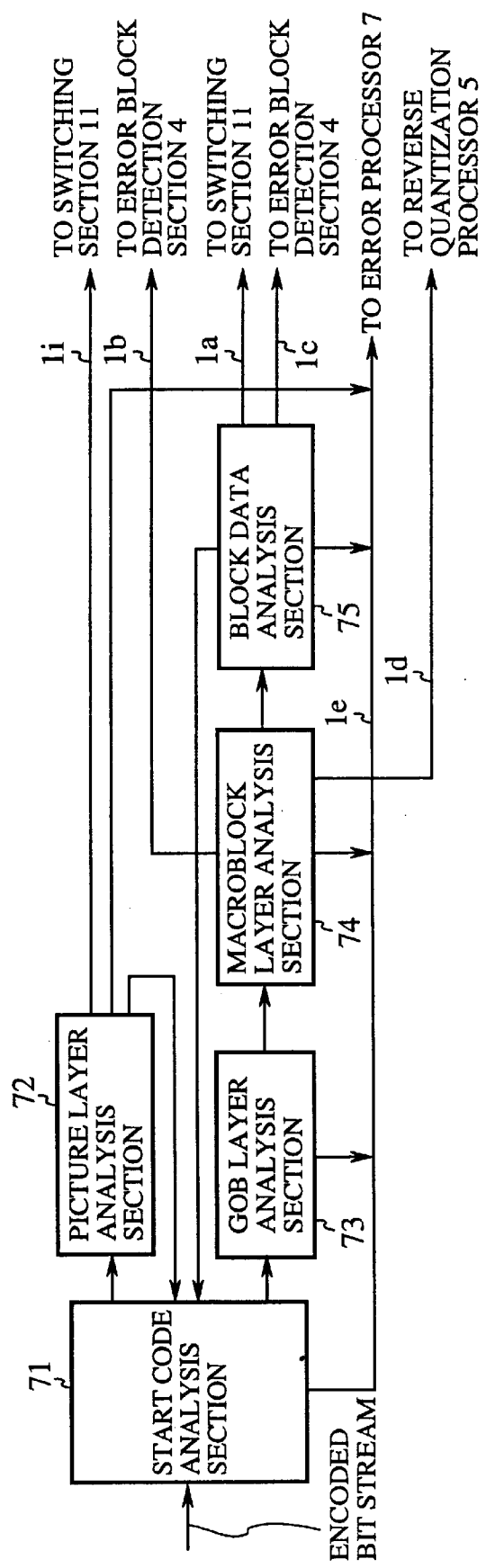
FIG. 75 is a block diagram of a syntax analysis section according to a fifteenth embodiment of the present invention.

FIG. 75 is a block diagram of the structure of a syntax analysis section 1 and shows the analysis of multiplexed coefficient distribution limiting operation control information 1*j* in the picture layer.

The operation of the syntax analysis section 1 which analyzes multiplexed coefficient distribution limiting operation control information 1*j* in the picture layer will be described below.

The operation of the start code analysis section 71, the GOB layer analysis section 73, the macroblock layer analysis section 74 and the block data analysis section 75 is the same as that described with reference to embodiment 11 and thus additional description will be omitted.

Analysis of coefficient distribution limiting operation control information 1*j* and picture layer information is performed by an input encoded bit stream in the picture layer analysis section 72 and an analyzed encoded bit stream is output to the start code analysis section 71. The decoded coefficient distribution limiting operation control information 1*j* is output to the switching section 11.

When layer information not matching a fixed syntax is analyzed in the picture layer analysis section 72, an error syntax detection signal 1*e* to that effect is output to the error processor 7.

As shown above with reference to embodiment 15, the image decoding device is adapted to decode and analyze coefficient distribution limiting operation control information 1*j* by an encoded bit stream and can determined whether or not error detection is performed based on the coefficient distribution limiting operation control information 1*j*. Therefore effective detection of errors can be performed and it is possible to generate a decoded image with little influence of errors contained in encoded bit streams.

Figure 76:
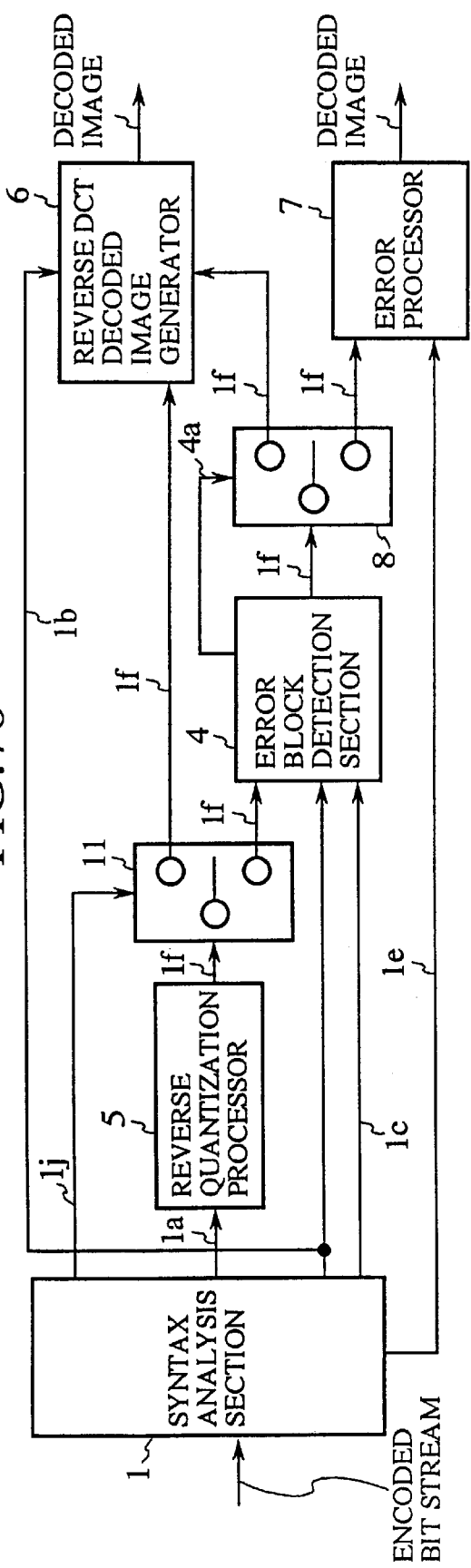
FIG. 76 is a block diagram of another arrangement of an image decoding device according to a fifteenth embodiment of the present invention.

The image decoding device in embodiment 15 is comprised as shown in FIG. 74 but may be comprised as shown in FIG. 76. In this case, the quantization index column 1a of the block unit output from the syntax analysis section 1 is such that DCT coefficient 1f is input to the switching section 11 after reverse quantization is performed in the reverse quantization section 5. Furthermore when the coefficient distribution limiting operation control information 1j from the syntax analysis section 1 indicates a limit on the image signal distribution in a frequency domain, it is output to the error block detection section 4 by the switching section 11. On the other hand, when the coefficient distribution limiting operation control information 1j does not indicate a limit on the image signal distribution in the frequency domain, the switching section 11 outputs the DCT coefficient column 1f to the reverse DCT/decoded signal generation section 6.

Embodiment 16

In embodiment 16, an image decoding device will be described in which the condition of a transmission pathway is monitored and control of an error block detection section 4 is performed based on a monitoring result.

Figure 77:
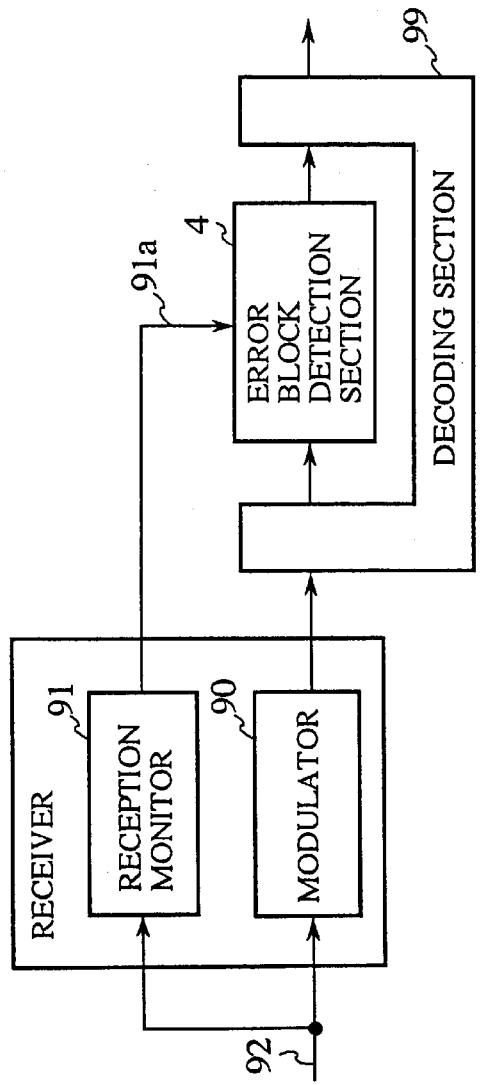
FIG. 77 is a block diagram of an image decoding device according to a sixteenth embodiment of the present invention.

FIG. 77 is a block diagram of an image decoding device according to embodiment 16 of the present invention. In FIG. 77, 4 is an error block detection section (error block detection means) which has a weighted coefficient determination section 9 as described with reference to embodiment 2 or 6 etc. Reference numeral 90 denotes a demodulator, 99 is a decoding section containing a syntax analysis section 1, reverse quantization section 5, reverse DCT/decoding image generator 6, error processor 7 and switching section 8 as described in the above embodiments. 91 is a reception monitor (monitoring means) which is provided again in embodiment 16, 91a is a threshold value control signal output from the reception monitor 91 and 92 is a transmission pathway.

The operation of the invention will be described below.

The reception monitor 91 monitors the level of reception based on the strength of a signal received through the transmission pathway 92. When the received signal strength is below a pre-set threshold value, it is determined that there is a high probability of errors being contained in the received signal and a threshold value control signal 91a for increased sensitivity to error detection is sent to the error block detection section 4.

Based on the threshold value control signal 91a, the error block detection section 4 reduces the weighted coefficient 1h output from the weighted coefficient determination section 9 and the reduced weighted coefficient 1h reduces the value of the maximum value/minimum value table or the valid coefficient threshold value, when the error block detection section 4 is comprised as in embodiment 2 shown in FIG. 14 or embodiment 6 shown in FIG. 33. In this way, error detection sensitivity is increased.

On the other hand, when the received signal strength is equal to or above a pre-set threshold value, it is determined that there is a low probability of errors being contained in the received signal and a threshold value control signal 91a for reduced sensitivity to error detection is sent to the error block detection section 4.

Based on the threshold value control signal 91a, the error block detection section 4 increases the weighted coefficient 1h output from the weighted coefficient determination section 9 and the increased weighted coefficient 1h increases the value of the maximum value/minimum value table or the valid coefficient threshold value, when, for example in the same manner as above, the error block detection section 4 is comprised as in embodiment 2 shown in FIG. 14 or embodiment 6 shown in FIG. 33. In this way, error detection sensitivity is reduced.

The demodulator 90 outputs the encoded binary digit string, that is to say, the signal after demodulation of a received signal is performed.

The error block detection section 4 detects error blocks with respect to quantization index columns 1a output from the syntax analysis section 1 contained in the decoder 99. This method of detection may be performed by error detection by a comparison of maximum values and minimum values by the maximum values/minimum value table as shown in the error block detection section 4 in embodiment 2 or may be performed by an error detection method of comparing the position of valid coefficients as shown in the error block detection section 4 in embodiment 6.

When the threshold value control signal 91a input by the reception monitor 91 is input into the weighted coefficient determination section 9 or the like in the error block detection section 4, the weighted coefficient determination section 9 varies the weighted coefficient 1h to a small value and varies the threshold value used on error detection to a further smaller value when the threshold value control signal 91a shows that error sensitivity is increased. When the threshold value control signal 91a shows that error sensitivity is decreased, the weighted coefficient determination section 9 varies the weighted coefficient 1h to a large value and varies the threshold value used on error detection to a further larger value.

Since the method of error detection using an updated threshold value and the operation of the device downstream of the error block detection section 4 is the same as that described with reference to embodiment 2 or 6, additional description will be omitted.

As shown above with reference to embodiment 16, reception monitor 91 of the image decoding device monitors the condition of the reception level in the reception pathway 92 and outputs a threshold value control signal 91a to the error block detection section 4 in response to that level. The error block detection section 4 makes appropriate regulation of error detection sensitivity based on the input threshold value control signal 91a. Thus when reception conditions are good, error detection is not performed by the error block detection section 4 and overall stable decoding operations can be performed.

In embodiment 16, the weighted coefficient 1h of the weighted coefficient determination section 9 is varied by a threshold value control signal 91a using an error block detection section 4 which has a weighted coefficient determination section 9 as described with reference to embodiment 2 or embodiment 6. However if the threshold value when compared with the maximum value/minimum value table storage section 2 or the valid coefficient position storage section 80 is varied directly by the threshold value control signal 91a, an error block detection section 4 which does not comprise a weighted coefficient determination section 9 as in embodiment 5 may also be used.

Embodiment 17

Embodiment 17 comprises an image decoding device comprising a decoding indication of a moving image which receives an encoded data string from a transmission pathway or a storage medium. When a generation frequency of bit errors is detected and found to be high, the image decoding device is adapted to reduce the error operation of the error block detection section 4 on activating the error block detection section 4 and to ensure suppression of picture quality deterioration due to decoded errors.

The error block detection section (error block detection means) 4 in each of the above embodiments is adapted to detect errors by estimating an error based on a steady state quality such as a maximum value/minimum value or a valid coefficient threshold value or the like of an image signal in a frequency domain before detecting fatal errors for video data such as those disabling decoding in the syntax analysis step or the decoding of incorrect data. Thus, in each of the above embodiments, there is a possibility of erroneous detection by the error block detection section 4.

In embodiment 17, the error block detection section 4 is only activated when bit errors are frequently generated during reception and heightens resistance to errors while allowing decoding operations to be performed in an overall stable manner.

That is to say, the image decoding device according to embodiment 17 is adapted not to perform error detection due to error detection being prevented when monitoring of the generation of errors contained in encoded bit streams is performed based on a block detection signal 4a output from the error block detection section 4 and shows a low probability of errors being contained in the encoded bit stream. When it is determined that there is a high probability of errors being contained in the bit stream, the image decoding device performs error detection.

Figure 78:
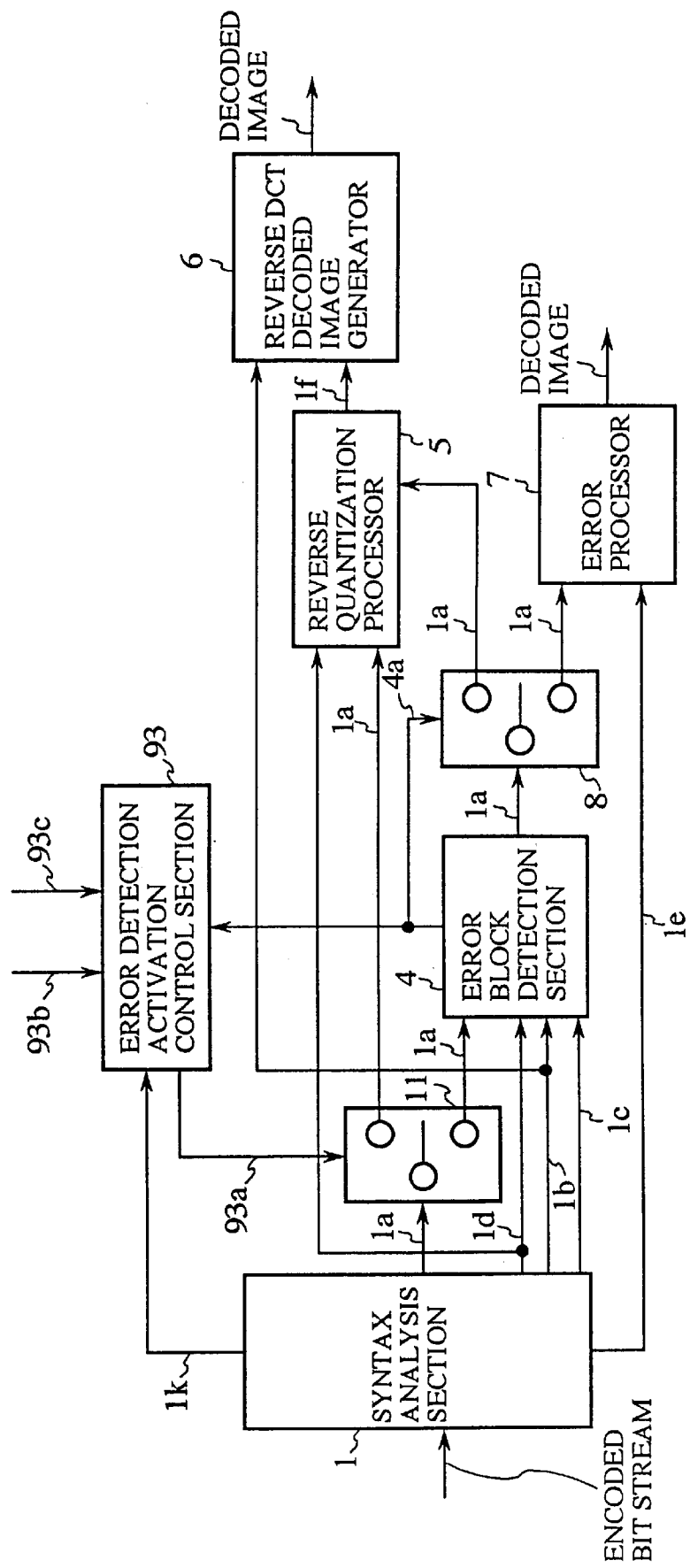
FIG. 78 is a block diagram of an image decoding device according to a seventeenth embodiment of the present invention.

FIG. 78 is a block diagram of an image decoding device according to embodiment 17 of the present invention. In FIG. 78, 93 is an error detection activation control section (monitoring means), 93a is an error detection operation indication signal, 93b is a scan picture number which determines whether or not externally set error block detection is performed or not. 93c is a unit picture number which acts as a unit when determining in the same way whether or not externally set error block detection is performed or not.

The error block detection section 4 as shown in FIG. 78 may comprise any of the error block detection sections 4 shown in embodiments 1, 2, 5, or 6.

The operation of the invention will be described below.

In the encoded bit stream, analysis and decoding of image data and layer information such as the picture layer, GOB layer, macroblock layer is performed by H.263 syntax.

As a result, the encoded mode (intra encoded model inter encoded mode) 1b is output to the error block detection section 4 and the reverse DCT/decoding image generator 6. The block number 1c which is block position information is output to the error block detection section 4. The quantization step size 1d is output to the error block detection section 4 and the reverse quantization processor 5. The picture start code 1k is output to the error detection activation control section 93.

The quantization index column 1a of the block unit output from the syntax analysis section 1 is input into the switching section 1. The switching section 11 outputs the quantization index column 1a of the block unit to the error block detection section 4 when the error detection operation indication signal 93a indicates that error detection is being performed.

When the error detection operation indication signal 93a indicates that error detection is not being performed, the switching section 11 outputs the quantization index column 1a of the block unit to the reverse quantization processor 5.

An error block detection signal 4a is generated by the same operation in each embodiment as described above in the error block detection section 4 and is output to the switching section 8 as well as the error detection activation control section 93.

The error detection activation control section 93 outputs an error detection operation indication signal 93a to the switching section 11 based on the error block detection signal 4a from the error block detection section 4.

Figure 79:
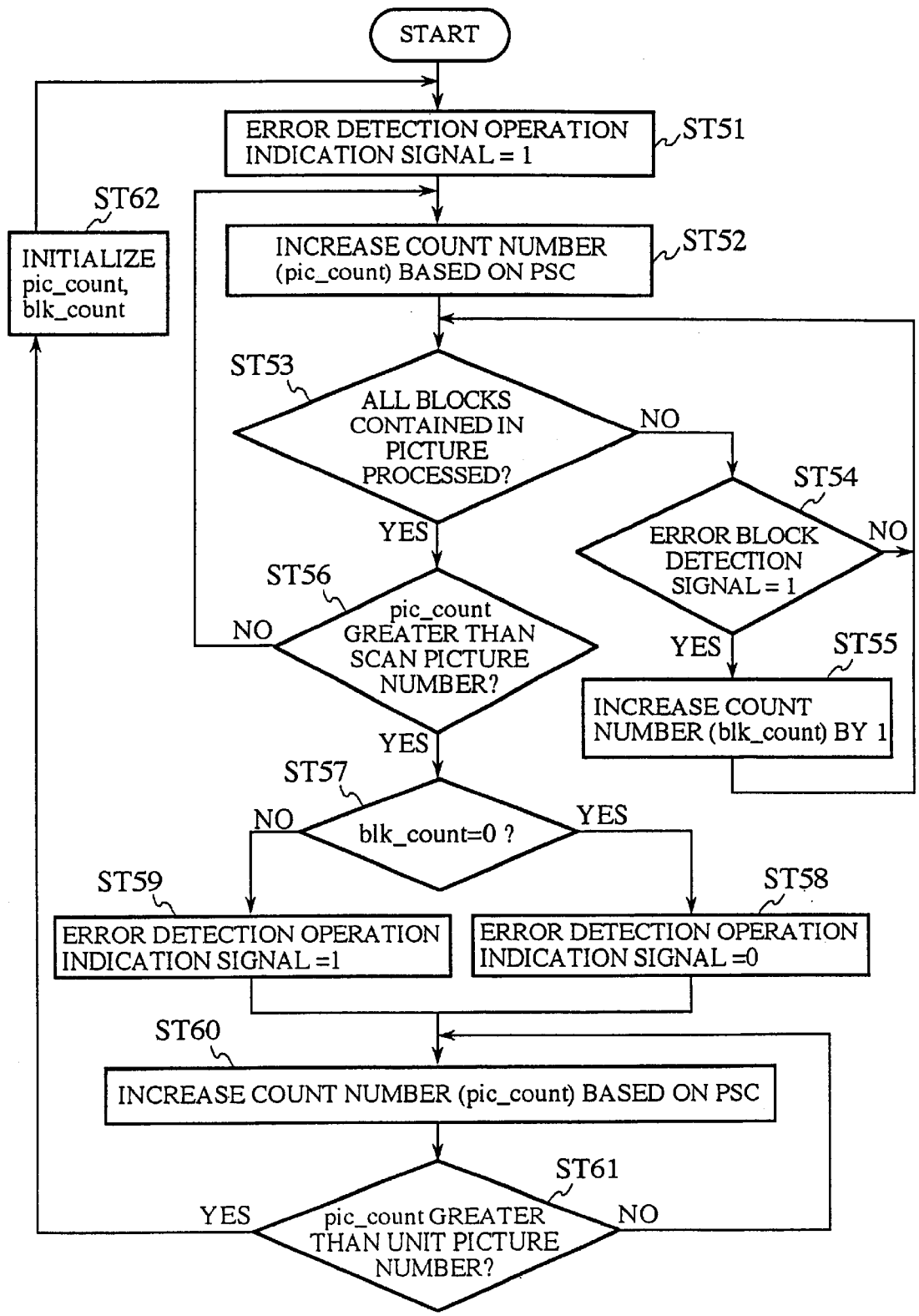
FIG. 79 is a flowchart of the processing of the error detection activation control section according to a seventeenth embodiment of the present invention.

FIG. 79 is a flowchart showing the processing of the error detection activation control section 93.

Firstly the error detection activation control section 93 outputs information (=1) representing the performance of error detection operations as an initializing operation as an error detection operation indication signal 93a with respect to the switching section 11 (step ST51). Then the count number (pic_count) showing the picture start code 1k input into the picture unit is incremented by the value "1" (step ST52).

Then it is determined whether this has been processed with respect to all blocks contained in the picture (step ST53). When it is found that it has not been processed with respect to all blocks contained in the picture (step ST53 "No"), it is determined whether an error block detection signal 4a input to the block unit has the value "1" or not (step ST54).

When the value is "1" (step ST54 "Yes"), the count number (blk_count) having a value showing that the input error block detection signal 4a has a value of "1" is incremented by a value of "1" (step ST55). The process returns to step ST53 and the above process is repeated.

When the above process is performed with respect to all blocks contained in the picture (step ST53 "Yes"), it is determined whether or not the pic_count counted by the process in step ST52 is greater than the scan picture number 93b which determines whether or not an externally set error block detection is performed (step ST56). The above process is performed until pic_count exceeds the scan picture number 93b for determining whether error block detection is performed (step ST56 "No").

When the pic_count exceeds the scan picture number 93b (step ST53 "Yes"), the error detection activation control section 93 outputs an error detection operation indication signal 93a based on the previously counted blk_count value.

That is to say, as a result of scanning the error block detection signal of the block contained in the picture of the scanned picture number 93b for determining whether or not the error block detection section 4 performs error block detection, the error detection activation control section 93 determines whether the blk_count value, that is to say, the input number of the error block detection signal 4a showing error block detection, has a value of zero or not (step ST57). When the blk_count value has a value of zero (step ST57 "Yes"), the error detection activation control section 93 outputs information (=0) showing that error detection operations are not performed to the switching section 11 as an error detection operation indication signal 93a (step ST58).

In this way, since the switching section 11 has an error detection operation indication signal 93a with a value (=0) showing that error detection is not performed, the quantization index column 1a of the block unit is output directly to the reverse quantization processor 5 without passing through the error block detection section 4.

Thereafter the error detection activation control section 93 increases the count number (pic_count) showing the number of the picture start code input to the picture unit by a value of "1" (step ST60) until the pic_count exceeds a unit picture number 93c (step ST61"No"). When the pic_count exceeds a unit picture number 93c (step ST61"Yes"), the count value of the blk_count and the pic_count, that is to say, the initializing setting process is set to zero (step ST62), the routine returns to the first step ST51 and the same process is performed with respect to the next unit picture.

As a result, when the result of the determination in step ST57 is "Yes", the error detection operation indication signal 93a output to the switching section 11 shows that an error detection operation is not performed in the interval after the value pic_count exceeds the scan picture number 93b (step ST56 "Yes") until the unit picture number 93c is exceeded (step ST61 "No"). During this period, the switching section 11 does not output the quantization index column 1a to the error block detection section 4 and the error block detection section 4 does not perform error block detection.

For example, when the scan picture number 93b is "5" and the unit picture number is "10", error block detection is performed for scanning the first five pictures. The error block detection of the remaining 95 pictures is suspended.

In contrast, when the blc_count value in the determination in step ST57 is determined to be a value other than zero (step ST 57 "No"), the error detection activation control section 93 outputs information (=1) representing the performance of error detection operations as an error detection operation indication signal 93a with respect to the switching section 11 (step ST59). Then in the same manner as described after step ST58 above, the count number (pic_count) showing the picture start code input into the picture unit is incremented by the value "1" (step ST60) until pic_count exceeds the unit picture number 93c (step ST61 "No"). When the pic_count exceeds a unit picture number 93c (step ST61"Yes"), the count value of the blc_count and the pic_count, that is to say, the initializing setting process is set to zero (step ST62), the routine returns to the first step ST51 and the same process is performed with respect to the next unit picture.

As a result, when the result of the determination in step ST57 is "No", the error detection operation indication signal 93a output to the switching section 11 shows that an error detection operation is performed in the interval after the value pic_count exceeds the scan picture number 93b (step ST56 "Yes") until the unit picture number 93c is exceeded (step ST61 "No"). During this period, the switching section 11 outputs the quantization index column 1a to the error block detection section 4 and the error block detection section 4 performs error block detection.

That is to say, for example, when the scan picture number 93b is "5" and the unit picture number is "100", error block detection is performed continuously not only for scanning the first five pictures but also with respect to decoding all remaining 95 pictures.

As shown above, the error detection activation control section 93 performs analysis of input encoded bit streams until completion of the above process with respect to each unit picture number 93c.

Since the operation after the above operation is the same as that described with reference to embodiments 1, 2, 5 and 6, additional description will be omitted.

As shown above with reference to embodiment 17, the image decoding device is adapted to operate the error block detection section 4 appropriately in response to the reliability of reading information from the storage medium or circuit quality in the transmission pathway. Thus under good reception conditions, it is possible to avoid error detection operations by the error block detection section 4 and to perform decoding operation with overall stability.

Figure 80:
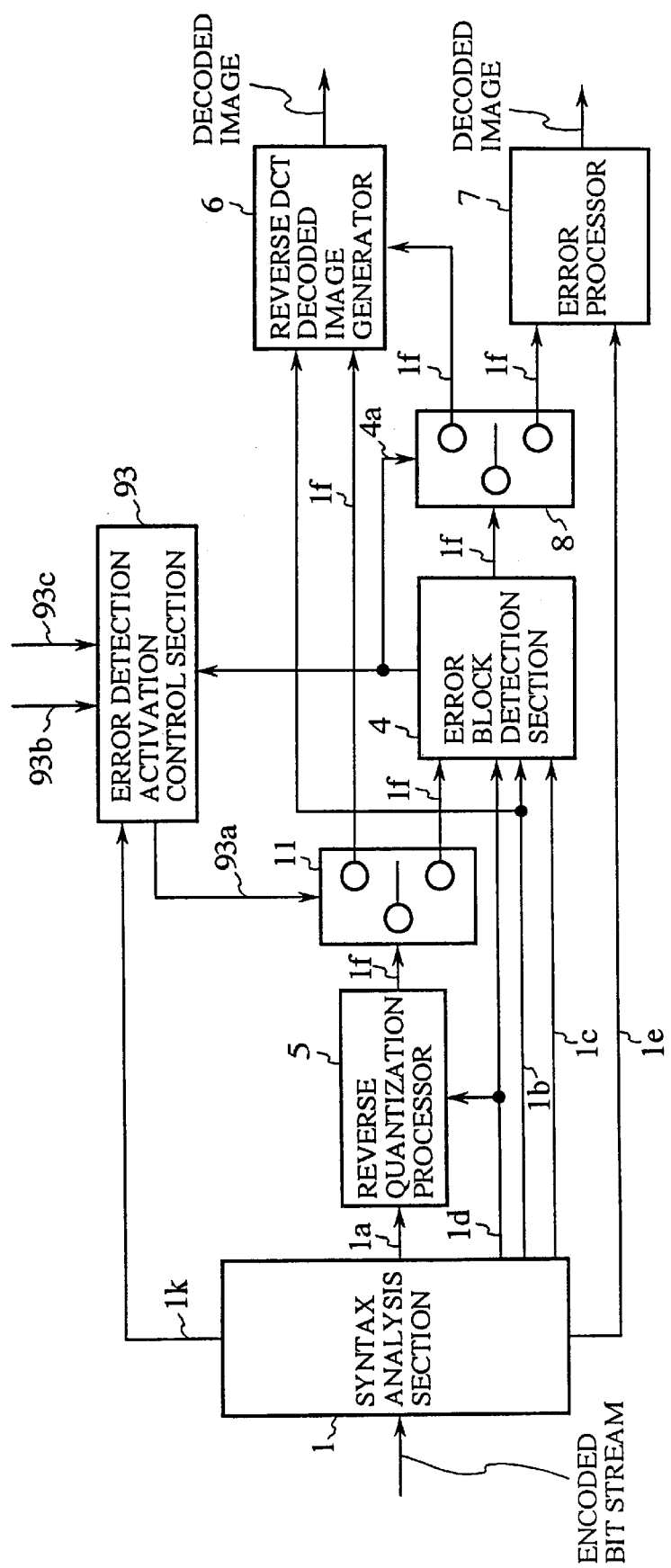
FIG. 80 is a block diagram of another arrangement of an image decoding device according to a seventeenth embodiment of the present invention.

In embodiment 17, the image decoding device was comprised as shown in FIG. 78 but may however be comprised as shown in FIG. 80.

In this case, the DCT coefficient column 1f of the block unit which output from the syntax analysis section 1 and reverse quantized by the reverse quantization processor 5 is input into the switching section 8. When the value of the error detection operation indication signal 93a is "1", it is output to the error block detection section 4 by being switched by the switching section 11. When the value of the error detection operation indication signal 93a is "0", it is output to the reverse DCT/decoding image generator 6 by being switched by the switching section 11.

In embodiment 17, the generated frequency of bit errors is detected based on the unit picture number 93c and the scanned picture number 93b. However detection of a generated frequency of bit errors may be performed by time and not by the picture number.

Embodiment 18

In embodiment 18, in same manner as the image decoding device in embodiment 16, the image decoding device is adapted to activate the error block detection section 4 only during reception conditions which frequently generate bit errors and heightens resistance to errors while allowing decoding operations to be performed in an overall stable manner.

Figure 81:
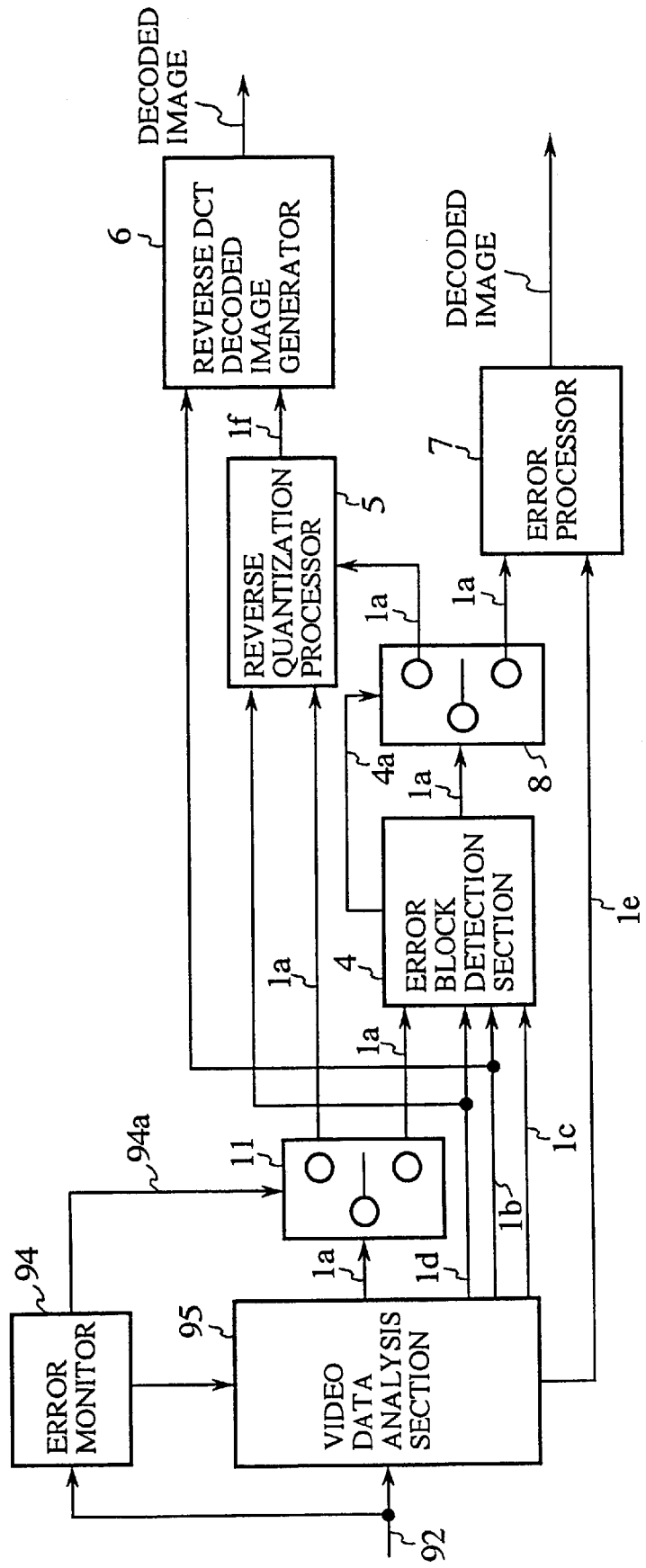
FIG. 81 is a block diagram of an image decoding device according to an eighteenth embodiment of the present invention.

FIG. 81 is a block diagram of an image decoding device according to embodiment 18 of the present invention. In FIG. 81, 94 is an error monitor (monitoring means), and 95 is an video data analysis section. The error block detection section (error block detection means) 4 shown in FIG. 81 may comprise any of the error block detection sections 4 shown in embodiments 1, 2, 5, or 6.

During normal reception operations in the image decoding device, the error monitor 94 monitors bit error generation frequency in the in the transmission pathway 92. In embodiment 18, an actual example of an error monitor 94 is given which comprises counting the bit number detected by error detection encoding added to the media packet.

Figure 82:
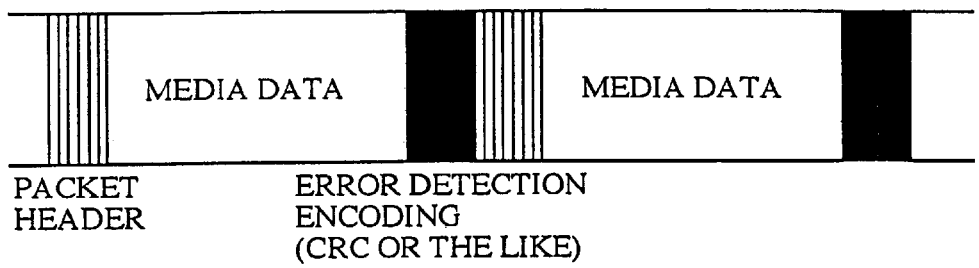
FIG. 82 shows the structure of a media packet.

FIG. 82 shows a media packet. A media packet is defined as a digital unit which, apart from video data to be decoded by the image decoding device of each of the above embodiments, packs various types of media such as designated audio data decoded in the same cycle, text, graphics, or still images which are formatted by the same fixed rule.

MPEG-2 (Moving Picture Experts Group-2; ISO/IEC 13818-1) Packetized Elementary Stream (PES), ITU-T H.263 AL-PDU may be given as an example.

In FIG. 82, the packet header is each type of header information discussed above such as various types of media or packet attributes. Media data is characteristic encoded data such as audio, video, data. Error detection encoding is an added bit for error detection such as CRC (Cyclic Redundancy Check) or the like. Each media data is transmitted to the image decoding device as shown in embodiment 18 in media packet form as shown in FIG. 82 and only video data is processed by the image decoding device as shown in embodiment 18.

Figure 83:
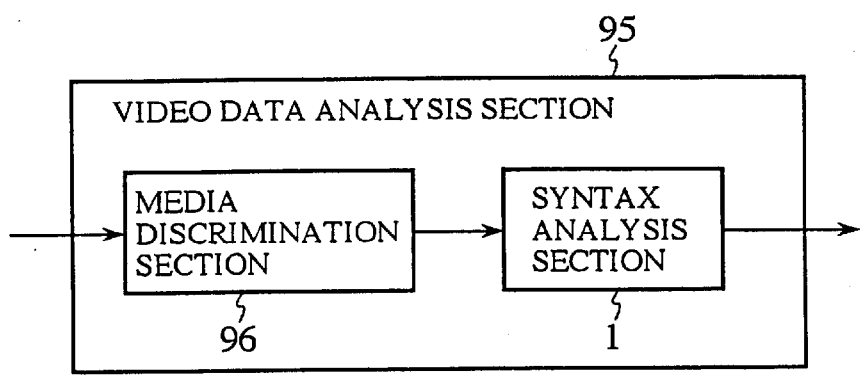
FIG. 83 is a block diagram of a video data analysis section according to an eighteenth embodiment of the present invention.

FIG. 83 is a block diagram of a video data analysis section 95. In the figure, 1 is a syntax analysis section as described in each of the above embodiments and 96 is a media discrimination section.

The operation of the invention will be described below.

When a media packet column is input into the video data analysis section 95, the media discrimination section 96 discriminates and outputs only the packet containing the video data from the packet header. The output video data is input into the syntax analysis section 1. The operation of the syntax analysis section 1 is the same as that described above and thus additional description will be omitted.

Figure 84:
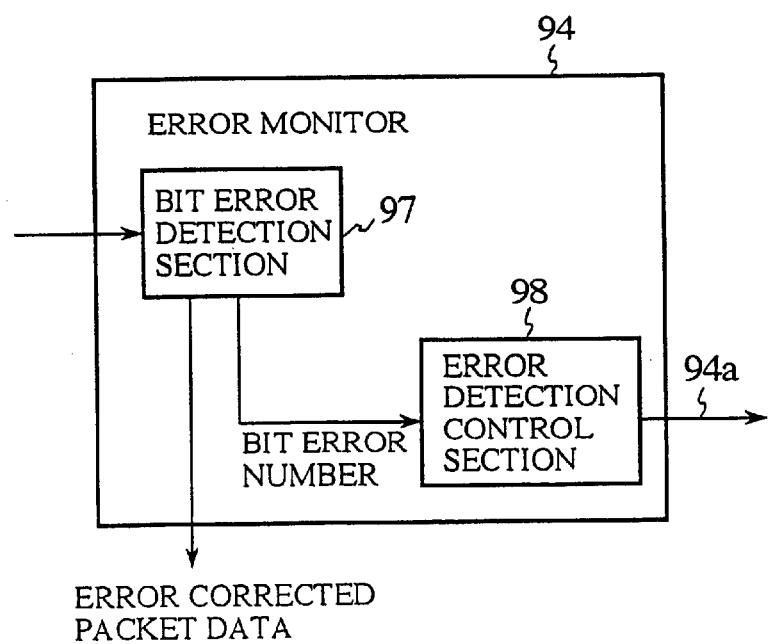
FIG. 84 is a block diagram of an error monitor section according to an eighteenth embodiment of the present invention

FIG. 84 is a block diagram of the error monitor 94 in embodiment 18. In FIG. 84, 97 is a bit error detection section and 98 is an error detection control section.

The operation of the error monitor 94 will be described below.

When a media packet column is input into the error monitor 94, firstly the bit error detection section 97 detects a bit error in the packet using the error detection encoding added to the packet unit. If possible, error correction is also performed. Then the packet data with corrected errors is returned to the video data analysis section 95 and the number of detected bit errors is output.

Then the error detection control section 98 totals the number of bit errors output from the bit error detection section 97 in the media packet unit. It is possible to monitor the middle error generation frequency read from the storage medium or the transmission due to the transmission pathway by monitoring the shift of bit error count values obtained in this way.

The error detection control section 98 of the monitoring section 94 performs control so that the error block detection section 4 is operated effectively based on the monitoring result. For example, a bit error count value representing the error monitoring result is checked in a fixed unit time interval. When the bit error count value in a fixed unit time interval is greater than a fixed threshold value, the bit error rate of the transmission pathway 92 is increased and reading from the storage medium becomes unstable. Thus it is determined that reception conditions have deteriorated. An error detection operation indication signal 94*a* is output to the switching section 11, and switching is performed so that the quantization index column 1*a* is output to the error block detection section 4 and the error block detection section 4 is activated.

The error block detection section 4 is comprised in various ways in each embodiment described above. When the block of the decoded error is detected rapidly and the error block is detected, the lost image band is suppressed by concealment processing in the error processor 7.

When the bit error count value in the unit time interval does not exceed the fixed threshold value, the error detection control section 98 of the error monitor 94 determines that reception conditions are stable and outputs an error detection operation indication signal 94*a* to the switching section 11. The quantization index column 1*a* is output directly to the reverse quantization processor 5. Thus the error block detection section 4 is not activated and error detection is not generated in the error block detection section 4.

As stated above according to embodiment 18, the image decoding device can operate an error block detection section 4 appropriately in response to the reliability of reading from a storage medium or circuit quality of the transmission pathway. Thus when reception conditions are good, it is possible to avoid error detection by the error block detection section 4 and to perform decoding operations in a stable overall manner.

In embodiment 18, the method of monitoring was based on a method of error correction encoding. However the monitoring method of course can obtain the same effect by a method of monitoring the field strength of the received signal or the phase information after the delayed demodulation of the wave conveying the media packet.

The same effect can of course be obtained by a monitoring method of monitoring the state of the bit errors in the media packets other than audio packets.

Control for effective operation of the error block detection section 4 can of course obtain the same effect only by ON/OFF control as discussed above but also by appropriate use of a method of updating the threshold value used in the error block detection section 4 shown in embodiment 6 or the error block detection section 4 shown in embodiment 2 based on the reception conditions.

Figure 85:
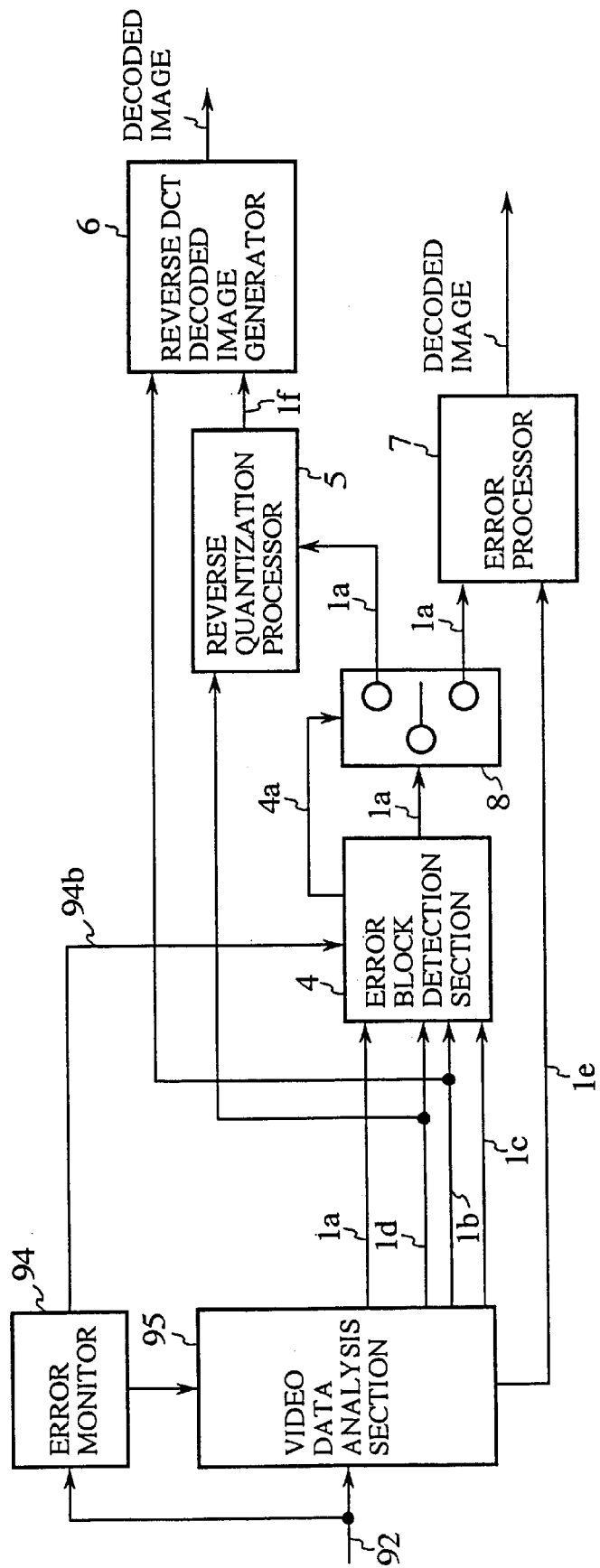
FIG. 85 is a block diagram of another arrangement of an image decoding device according to an eighteenth embodiment of the present invention.

Such an example is shown in FIG. 85. Precisely, when it is determined that the reception conditions have deteriorated by the error monitor 94, a control signal 94 for reducing the threshold value is output. When it is determined that the reception conditions are good, a control signal 94 for increasing the threshold value is output. The error block detection section 4 varies the weighted coefficient 1*h* of the weighted coefficient determination section 9 (refer to FIG. 14 and FIG. 33), varies the maximum value/minimum value stored in the maximum value/minimum value storage section 2 or the threshold value such as the position of the valid coefficient stored in the valid coefficient position storage section 80 based on the control signal 94*b*. The resulting values are compared with the maximum value/minimum value comparison section 3 or the valid coefficient position comparison section 81. Thus it is possible to reduce the possibility of error detection when reception conditions are good and to perform overall stable decoding operations.

As described above, an image encoding device and an image decoding device according to the present invention can detect error blocks matching a fixed syntax contained in an encoded bit stream. A decoded image is generated with little influence of errors contained in encoded bit streams and an encoded bit stream is generated which can effectively detect errors contained in an encoded bit stream in the image decoding device.

What is claimed is:

1. An image decoding device receiving a signal containing encoded and compressed image data, the image data compressed using block-by-block compression, through a transmission circuit and performing an expansion process on the encoded and compressed image data, the image decoding device comprising:

a monitoring means receiving a signal containing the image data, prior to expanding the image data using variable length decoding, monitoring a probability of an error in the received signal based on the intensity of the signal, and outputting a control signal; and an error block detection means detecting an error block in the received image data during expansion and controlling a sensitivity of the error block detection based on the control signal.

2. An image decoding device receiving a signal containing encoded and compressed image data the image data compressed using block-by-block compressing through a transmission circuit and performing an expansion process on the encoded and compressed image data, the image decoding device comprising:

an error block detection means detecting an error block in the image data during the expansion process, receiving from a source receiving from a source external to the image decoding device a control signal for controlling a sensitivity in error block detection based on an intensity of the signal containing the encoded, compressed image data prior to subjection to a variable length decoding process that constitutes the expansion process, and controlling a sensitivity in error block detection in accordance with the control signal.

3. An image encoding device dividing image data into block units, performing orthogonal conversion and compression coding on each block unit, comprising:

an encoded data value limiting means receiving a threshold value and an image signal in a frequency domain and outputting an image signal with an added limit in a frequency domain based on a predetermined threshold value and an image signal in a frequency domain, and an output means for outputting encoded, compressed image data with the limit imposed, obtained as a result of encoding the received image signal.

4. An image decoding device according to claim 1, wherein the error block detection means receives a threshold value defining a range of values of an image signal value in a frequency domain and an image signal in a frequency domain, the error block detection means performs error detection on block data based on whether an image signal value in a frequency domain is contained in the range of values or not and outputs an error detection state.

5. An image decoding device according to claim 1, wherein the error block detection means receives a threshold value variably defining a range of values of an image signal value in a frequency domain, performs error detection on block data based on whether an image signal value in a frequency domain is contained in the range of variable values and outputs an error detection state.

6. An image encoding device according to claim 3, wherein the encoded data value limiting means receives a threshold value defining a range of values of image signal values in a frequency domain and an image signal in a frequency domain, the encoded data value limiting means replaces an image signal value in the converted frequency domain with a value contained in the range of values based on whether an image signal value in the converted frequency domain is contained in the range of values and outputs encoded data.

7. An image encoding device according to claim 3, wherein the encoded data value limiting means receives a threshold value variably defining a range of values of an image signal value in a frequency domain and an image signal in a frequency domain, the encoded data value limiting means replaces an image signal value in the converted frequency domain with a value contained in the range of values based on whether an image signal value in the converted frequency domain is contained in the range of variable values and outputs encoded data.

8. An image decoding device according to claim 1, wherein the error block detection means receives a threshold value defining a range of frequencies of an image signal list in a frequency domain and an image signal in a frequency domain, and performs error detection in block data and outputs an error detection state based on whether or not a non-zero coefficient which corresponds to the highest frequency component of the coefficients contained in the image signal list in the frequency domains is contained in the frequency range given by the threshold value.

9. An image decoding device according to claim 1, wherein the error block detection means receives a threshold value variably defining a range of frequencies of an image signal list in a frequency domain, and performs error detection in block data and outputs an error detection state based on whether or not a non-zero coefficient which corresponds to the highest frequency component of the coefficients contained in the image signal list in the frequency domains is contained in the variable frequency range given by the threshold value.

10. An image encoding device according to claim 3, wherein the encoded data value limiting means receives a threshold value defining a range of frequencies of an image signal list in a frequency domain and an image signal in a frequency domain, and outputs encoded data which makes coefficient values, which correspond to frequencies above the threshold value, take a value of zero based on whether or not a non-zero coefficient which corresponds to the highest frequency component of the coefficients contained in the image signal list in the frequency domains is contained in the frequency range given by the threshold value.

11. An image encoding device according to claim 3, wherein the encoded data value limiting means receives a threshold value variably defining a range of frequencies of an image signal list in a frequency band and an image signal in a frequency domain, and outputs encoded data which makes coefficient values, which correspond to frequencies above the threshold value, take a value of zero based on whether or not a non-zero coefficient which corresponds to the highest frequency component of the coefficients contained in the image signal list in the frequency domains is contained in the frequency range variably given by the threshold value.

12. An image decoding device according to claim 1, further comprising a block column detection means which is given an error detection state output by the error block detection means, which counts the number of blocks determined to contain errors in the block data of the error detection states by a block column unit which is comprised by a plurality of blocks, which performs error detection of data in block columns based on that count number and a preset threshold value and which outputs an error detection state of data in block columns.

13. An image encoding device according to claim 7, further comprising a multiplexing means which receives threshold value control information which updates the threshold value and which multiplexes and outputs such threshold value control information to the encoded bit stream.

14. An image decoding device according to claim 5, further comprising an analyzing means which decodes and analyzes threshold value control information with an input encoded bit stream, the error block detection means inputs threshold value control information decoded and analyzed in the analyzing means, updates the threshold value based on the threshold value control information and performs error detection in the block data and outputs an error detection state based on the updated threshold value and the image signal in the frequency domain.

15. An image encoding device according to claim 3, further comprising a multiplexing means which receives threshold value information used when the encoded data value limiting means limits the image signal distribution in the frequency domain and which multiplexes and outputs such threshold value information to the encoded bit stream, the encoded data value control means outputs encoded data, in which the image signal distribution in the frequency domain is limited based on threshold value information.

16. An image decoding device according to claim 1, further comprising an analyzing means which decodes and analyzes threshold value information used when limiting the image signal distribution in the frequency domain by the encoded bit stream, the error block detection means performs error detection in the block data and outputs an error detection state based on the threshold value information decoded and analyzed by the analyzing means.

17. An image encoding device according to claim 3, further comprising a multiplexing means which multiplexes and outputs limiting operation control information showing whether or not the encoded data value limiting means will perform a limiting operation, the encoded data value control means performs a limiting operation based on the limiting operation control information.

18. An image decoding device according to claim 1, further comprising an analyzing means which analyzes limiting operation control information by the encoded bit stream, the error block detection means performs error detection on the block data and outputs an error detection state based on the limiting operation control information analyzed by the analyzing means.

19. An image decoding device according to claim 1, wherein a monitoring means monitors the strength of a received signal of encoded data as a transmission state and outputs a threshold value control signal for controlling a threshold value when the error block detection means performs error detection on block data based on a monitoring result, the error block detection means controls a threshold value when performing error block detection based on the threshold value control signal from the monitoring means.

20. An image decoding device according to claim 1, wherein the monitoring means monitors the generation of bit errors when receiving encoded data as a transmission state and outputs an activation control signal which activates or does not activate the error block detection means based on a bit error generation state, the error block detection means performs detection operations of error blocks based on the activation control signal from the monitoring means.

21. An image decoding device according to claim 1, further comprising a monitoring means which inputs a media packet column, detects bit errors in the packet based on error detection encoding added to the packet unit, counts the number of bit errors in a media packet unit, and outputs an activation control signal to activate or not activate the error block detection means or not based on a shift in the count value, the error block detection means performs an error block detection operation based on the activation control signal from the monitoring means.

22. An image decoding device according to claim 1, wherein the monitoring means determines the level of reception based on a strength of the signal received through the transmission circuit.

23. An image decoding device according to claim 1, wherein the monitoring means determines the level of reception based on bit errors detected in the signal received through the transmission circuit.

24. An image decoding device according to claim 1, wherein the error block detection means controls the sensitivity of error detection by becoming activated or deactivated in response to the control signal output form the monitoring means.

25. An image decoding device according to claim 2, wherein the threshold value is varied according to a quantization step size of the image compression data.

26. An image decoding device according to claim 4, wherein the error block detection means controls the sensitivity of error detection by varying the threshold value.

27. An image decoding device according to claim 5, wherein the range of values is varied according to the controlled sensitivity of error detection.

28. An image decoding device according to claim 5, wherein the range of values is varied according to header data within said received image compression data.

29. An image decoding device according to claim 28, wherein the header data includes a quantization step size of the image compression data.

30. An image encoding device according to claim 7, wherein the range of values is varied according to a determined quantization step size.

31. A method for decoding an encoded image signal the image signal including encoded and compressed image data the image data compressed using block-by-block compression, the method comprising:

monitoring a probability of an error being contained in the received signal, based on an intensity of the received signal, and outputting a control signal; and an error block detection means detecting an error block in the encoded, compressed image data during the expansion process, and controlling a sensitivity in error block detection in accordance with the control signal.

32. A method for decoding an encoded image signal according to claim 31, wherein the error detecting step compares image values of a frequency domain to threshold values corresponding to the same frequency domain.

33. A method for decoding an encoded image signal according to claim 31, wherein each threshold values defines a range of valid positions in a list of image values, and wherein the error detecting step determines whether an image value list within a data unit contains a non-zero image value in a position outside of the range of valid positions.

34. A method for encoding an image signal, comprising:

dividing image data into block units;

performing orthogonal conversion and compression coding on each block unit; and limiting a value of an image signal in a frequency domain based on a threshold value corresponding to the frequency domain.

35. A method for encoding an image signal according to claim 34, wherein the threshold value defines a range of image signal values in a frequency domain, and wherein an image signal in the frequency domain whose value falls outside the range of image signal values is replaced with a value inside the range of signal values.

36. A method for encoding an image signal according to claim 34, wherein the threshold value defines a range of valid positions in a list of image values of a block unit, and wherein each non-zero image signal value whose position within the list of image signal values of a block unit is outside the defined range of valid positions is set to zero.

37. A method for encoding an image signal according to claim 34, wherein the threshold value is varied according to a quantization step size used for the compression coding of the block unit.

\* \* \* \* \*

UNITED STATES PATENT AND TRADEMARK OFFICE
CERTIFICATE OF CORRECTION

PATENT NO.   : 6,385,343 B1                                       Page 1 of 1
DATED        : May 7, 2002
INVENTOR(S)  : Kuroda et al.

It is certified that error appears in the above-identified patent and that said Letters Patent is hereby corrected as shown below:

<u>Title page,</u>
Item [56], References Cited, FOREIGN PATENT DOCUMENTS, please delete reference "JP A-92007432  7/1997" and insert therefore the correct reference number -- JP A-9200743  7/1997 --.

OTHER PUBLICATIONS, please add the following reference to the References Cited:
-- Video Coding for Low Bitrate Communication" ITU-T Recommendation H. 263 pp. 1-27, 31-49 (1995). --

Signed and Sealed this

Fifteenth Day of April, 2003

JAMES E. ROGAN
*Director of the United States Patent and Trademark Office*